US012422777B2

(12) United States Patent
Dai et al.

(10) Patent No.: US 12,422,777 B2
(45) Date of Patent: Sep. 23, 2025

(54) PROCESSING CARTRIDGE

(71) Applicant: Ninestar Corporation, Zhuhai (CN)

(72) Inventors: Shuchun Dai, Zhuhai (CN); Geming Ding, Zhuhai (CN); Likun Zeng, Zhuhai (CN); Lianjun Wu, Zhuhai (CN); Qin Luo, Zhuhai (CN); Kun Li, Zhuhai (CN)

(73) Assignee: NINESTAR CORPORATION, Zhuhai (CN)

( * ) Notice: Subject to any disclaimer, the term of this patent is extended or adjusted under 35 U.S.C. 154(b) by 0 days.

(21) Appl. No.: 18/540,514

(22) Filed: Dec. 14, 2023

(65) Prior Publication Data

US 2024/0111245 A1 Apr. 4, 2024

Related U.S. Application Data

(63) Continuation of application No. 17/867,383, filed on Jul. 18, 2022, now abandoned, which is a (Continued)

(30) Foreign Application Priority Data

Sep. 18, 2018 (CN) ......................... 201821529092.2
Sep. 19, 2018 (CN) ......................... 201821535324.5
(Continued)

(51) Int. Cl.
*G03G 21/18* (2006.01)

(52) U.S. Cl.
CPC ..... *G03G 21/1842* (2013.01); *G03G 21/1814* (2013.01)

(58) Field of Classification Search
CPC ....................... G03G 21/1842; G03G 21/1814
See application file for complete search history.

(56) References Cited

U.S. PATENT DOCUMENTS

| | | | |
|---|---|---|---|
| 5,745,823 | A | 4/1998 | Goto et al. |
| 2009/0003875 | A1 † | 1/2009 | Toba |

(Continued)

FOREIGN PATENT DOCUMENTS

| | | | |
|---|---|---|---|
| CN | 101715570 A | | 5/2010 |
| CN | 201837835 U | | 5/2011 |

(Continued)

OTHER PUBLICATIONS

The World Intellectual Property Organization (WIPO) International Search Report for PCT/CN2020/080213 Jun. 4, 2020 6 Pages (including translation).

(Continued)

*Primary Examiner* — Stephanie E Bloss
*Assistant Examiner* — Michael A Harrison
(74) *Attorney, Agent, or Firm* — ANOVA LAW GROUP PLLC

(57) ABSTRACT

A processing cartridge can be detachably installed in an electronic image forming device, where a protrusion capable of extending and retracting along a vertical direction is disposed inside the electronic image forming device. The processing cartridge includes a toner container and a waste toner container; and a movable element disposed at the lower side of the processing cartridge. The processing cartridge further includes a detachment preventing portion; the movable element is disposed with an abutting portion; and the abutting portion is capable of being abutted against the detachment preventing portion to prevent the movable element being disengaged. The processing cartridge further includes an elastic element; and the elastic element is configured to move the movable element toward the lower side of the processing cartridge.

16 Claims, 57 Drawing Sheets

Related U.S. Application Data continuation of application No. 17/202,724, filed on Mar. 16, 2021, now abandoned, which is a continuation of application No. PCT/CN2020/080213, filed on Mar. 19, 2020, and a continuation of application No. PCT/CN2019/106289, filed on Sep. 17, 2019, and a continuation of application No. PCT/CN2019/103820, filed on Aug. 30, 2019.

(30) Foreign Application Priority Data

| | | |
|---|---|---|
| Sep. 20, 2018 | (CN) | 201821544074.1 |
| Sep. 21, 2018 | (CN) | 201821557706.8 |
| Jan. 14, 2019 | (CN) | 201920060079.5 |
| Feb. 20, 2019 | (CN) | 201920230183.4 |
| Mar. 22, 2019 | (CN) | 201920379083.8 |
| Mar. 26, 2019 | (CN) | 201920396676.5 |
| Mar. 29, 2019 | (CN) | 201920419854.1 |
| May 29, 2019 | (CN) | 201920791621.4 |
| May 31, 2019 | (CN) | 201920811604.2 |
| Jun. 24, 2019 | (CN) | 201910547647.9 |
| Aug. 13, 2019 | (CN) | 201921313025.1 |

(56) References Cited

U.S. PATENT DOCUMENTS

| | | | |
|---|---|---|---|
| 2009/0003876 | A1 | 1/2009 | Maeshima et al. |
| 2009/0169249 | A1 | 7/2009 | Watanabe et al. |
| 2016/0179051 | A1 | 6/2016 | Kim et al. |

FOREIGN PATENT DOCUMENTS

| | | | | |
|---|---|---|---|---|
| CN | 102193476 | A | | 9/2011 |
| CN | 102540842 | A | | 7/2012 |
| CN | 102768487 | A | | 11/2012 |
| CN | 203358050 | U | | 12/2013 |
| CN | 104111598 | A | | 10/2014 |
| CN | 104345625 | A | | 2/2015 |
| CN | 204790320 | U | * | 11/2015 |
| CN | 205353581 | U | | 6/2016 |
| CN | 105807594 | A | | 7/2016 |
| CN | 106597825 | A | † | 4/2017 |
| CN | 206664001 | U | | 11/2017 |
| CN | 108227447 | A | | 6/2018 |
| CN | 207601519 | U | | 7/2018 |
| CN | 108398870 | A | | 8/2018 |
| JP | 2006039596 | A | | 2/2006 |
| JP | 2012027449 | A | | 2/2012 |
| JP | 2016161714 | A | | 9/2016 |
| JP | 2018097285 | A | | 6/2018 |
| WO | 2017115971 | A1 | | 7/2017 |

OTHER PUBLICATIONS

The World Intellectual Property Organization (WIPO) International Search Report for PCT/CN2019/106289 Dec. 18, 2019 10 Pages (including translation).

The World Intellectual Property Organization (WIPO) International Search Report for PCT/CN2019/103820 Nov. 27, 2019 8 Pages (including translation).

* cited by examiner
† cited by third party

PROCESSING CARTRIDGE

CROSS-REFERENCE TO RELATED APPLICATIONS

This application is a continuation application of U.S. patent application Ser. No. 17/867,383, filed on Jul. 18, 2022, which is a continuation application of U.S. patent application Ser. No. 17/202,724, filed on Mar. 16, 2021, which claims the priority of PCT Patent Application No. PCT/CN2019/103820, filed on Aug. 30, 2019, which claims the priority to Chinese patent application Nos. 201821557706.8, filed on Sep. 21, 2018, 201920230183.4, filed on Feb. 20, 2019, 201920419854.1, filed on Mar. 29, 2019, 201920791621.4, filed on May 29, 2019, 201920811604.2, filed on May 31, 2019, and 201910547647.9, filed on Jun. 24, 2019; the priority of PCT Patent Application No. PCT/CN2019/106289, filed on Sep. 17, 2019, which claims the priority to Chinese patent application Nos. 201821529092.2, filed on Sep. 18, 2018, 201821535324.5, filed on Sep. 19, 2018, 201821544074.1, filed on Sep. 20, 2018, and 201920060079.5, filed on Jan. 14, 2019; and the priority of PCT Patent Application No. PCT/CN2020/080213, filed on Mar. 19, 2020, which claims the priority to Chinese patent application Nos. 201920379083.8, filed on Mar. 22, 2019, 201920396676.5, filed on Mar. 26, 2019, and 201921313025.1, filed on Aug. 13, 2019. The content of all of the above applications is incorporated herein by reference in entirety.

TECHNICAL FIELD

The present disclosure generally relates to the field of image-forming technology and, more particularly, relates to a processing cartridge and its installation method.

BACKGROUND

An electronic image forming device is a device that forms an image on a recording material by an electrophotographic image forming technique. Such device may include an electrophotographic copier, a laser printer, an electrophotographic printer, a facsimile machine, a word processor, and the like. The electronic image forming devices may include a monochrome electronic image forming device and a color electronic image forming device.

An existing electronic image forming device may include a main body and a processing cartridge detachably installed in the main body. Sidewalls may be included at both ends of the processing cartridge along its length direction. Rotating elements may be included inside the processing cartridge. The rotating elements may be one or more of a photosensitive element, a developing element, a charging element, a toner feeding element, and a gear element. The rotating elements may be connected to a force receiving element and may receive the driving force from the force receiving element. The force receiving element may be disposed at a sidewall of the processing cartridge to receive the driving force from the main body of the electronic image forming device.

When the processing cartridge does not perform the electronic image forming operation, in order to protect the developing element and the photo-sensitive element, both elements may be separated. That is, the developing element and the photo-sensitive element may not be in contact with each other when the electronic image forming is not performed.

In the existing technology (e.g., as in a Chinese patent application publication CN101963779A), as shown in FIGS. 1-2, the force receiving element may be disposed at the housing of the processing cartridge. For example, the processing cartridge may include a first housing 1101 and a second housing 1102, and the force receiving element may include a first force receiving element 1110 and a second force receiving element 1120. The first force receiving element 1110 may have two states: a standby position and a protruding position. At the standby position (the processing cartridge is not installed or in the position of the installation process), the first force receiving element 1110 may be disposed inside the first housing 1101 at this point; at the protruding position (the processing cartridge is at a working position after installation), the first force receiving element 1110 may be disposed by protruding from the first housing 1101 at this point (referring to FIGS. 1-2). The second force receiving element 1120 may receive a first pushing force from the electronic image forming device, and also push the first force receiving element 1110 to rotate to the position protruding the processing cartridge externally. When the electronic image forming device execute a printing job, the electronic image forming device may provide a second pushing force to act on the first force receiving element 1110, and also enable the first housing of the processing cartridge to rotate relative to the second housing of the processing cartridge. Referring to FIG. 2, in the existing technology, the first force receiving element 1110 may rotate around an axle after being pushed by the second force receiving element 1120, and the first force receiving element 1110 may automatically retract after the second force receiving element 1120 is no longer abutted against the first force receiving element 1110. An axis L1 is perpendicular to the length direction of the processing cartridge.

FIG. 6 illustrates an electronic image forming device 900, including a processing cartridge tray 910, a first force applying device 920, and a second force applying device 930. The first force applying device 920 may apply the pushing force onto the second force receiving element 1120, and the second force applying device 930 may apply the pushing force onto the first force receiving element 1110. When the processing cartridges are installed in the electronic image forming device, four different color cartridges may be sequentially installed on the processing cartridge tray 910. After the processing cartridge tray 910 is pushed into the electronic image forming device 900 and also when the electronic image forming device completes the installation operation to be in the standby state, the first force applying device 920 may act on the second force receiving element 1120, and then push the first force receiving element 1110 to be protruded through the second force receiving element 1120, thereby pressing the first force receiving element 1110 by the second force applying portion 930 and also enabling the first housing 1101 to rotate relative to the second housing 1102.

In the existing technology, during the process installing a toner cartridge on the processing cartridge tray 910 on the electronic image forming device 900, since the first force receiving element 1110 is disposed inside the first housing 1101 when the processing cartridge is not installed or in the position of the installation process, normal installation operations may not be affected. However, after the connecting part matching the first force receiving element 1110 is used for multiple times, it may cause that the first force receiving element 1110 is not accurately located in the first housing 1101. That is, it may cause the first force receiving element 1110 to protrude outside unexpectedly. Therefore, the processing cartridge tray 910 may be jammed which may not be normally pushed into the electronic image forming device 900, and normal electronica image forming operations may not be performed. Meanwhile, the second force receiving element 1120 and the first force receiving element 1110 may be connected in the existing technology, which may cause the problem that the processing cartridge may not be removed if the inside parts in the electronic image forming device 900 are jammed. Therefore, there is a need to design a new force receiving device to replace the original force receiving device.

In addition, a fixing element may be disposed at the bottom of the processing cartridge; and the fixing element may frequently collide with a protrusion inside the electronic image-forming device during the process of installing the processing cartridge on the electronic image-forming device. The protrusion inside the electronic image-forming device may be connected to an elastic element, such that the protrusion may extend and retract along the vertical direction.

However, as the number of installing and removing the processing cartridge from the electronic image-forming device increases, the protrusion and the elastic element at the bottom of the protrusion may both be greatly worn for such design. There is a need to design an element which enables the protrusion inside the electronic image-forming device not to retract along the vertical direction (e.g., retract downwardly along the vertical direction) due to the installation of the processing cartridge.

SUMMARY

The present disclosure provides a processing cartridge which may solve the problem that the processing cartridge is often jammed in the electronic image forming device due to the unexpected protrusion of the first force receiving element.

One aspect of the present disclosure provides a processing cartridge. The processing cartridge, detachably installed in an electronic image forming device that includes a first pushing element and a second pushing element. The processing cartridge includes a developing roller and a first housing supporting the developing roller; a photo-sensitive drum and a second housing supporting the photo-sensitive drum; a first force receiving element, configured to be abutted against the second pushing element to separate the developing roller from the photo-sensitive drum; and a second force receiving element, configured to be abutted against the first pushing element for enabling the second force receiving element to push the first force receiving element to rotate about an axis. A rotation axis of the first force receiving portion is substantially perpendicular to a direction in which the processing cartridge is installed into or taken out of the electronic image forming device.

Another aspect of the present disclosure provides a processing cartridge. The processing cartridge, detachably installed in an electronic image forming device that includes a first pushing element and a second pushing element. The processing cartridge includes a developing roller and a first housing supporting the developing roller; a photo-sensitive drum and a second housing supporting the photo-sensitive drum; a first force receiving element, configured to be abutted against the second pushing element to separate the developing roller from the photo-sensitive drum; and a second force receiving element, configured to be abutted against the first pushing element for enabling the second force receiving element to push the first force receiving element to rotate about an axis. A rotation axis of the first force receiving portion is substantially perpendicular to a length direction of the processing cartridge, an axial direction of the photo-sensitive drum, or an axial direction of the developing roller.

Another aspect of the present disclosure provides a processing cartridge. The processing cartridge is detachably installed in an electronic image forming device which includes a first force applying element. The processing cartridge includes:

- a developing roller and a first housing supporting the developing roller;
- a photo-sensitive drum and a second housing supporting the photo-sensitive drum; and
- a first force receiving element, contactable with the first force applying element.

The first force receiving element has a plurality of position states including a first position state and a second position state; when being in the first position state, the first force receiving element protrudes relative to the first housing; and when being in the second position state, the first force receiving element is closer to the first housing compared with the first position state.

The processing cartridge further includes a first elastic element, configured to maintain the first force receiving element in the first position state.

Optionally, when the first force applying element pushes the first force receiving element to separate the developing roller from the photo-sensitive drum, the first force receiving element is in the first position state.

Optionally, the processing cartridge further includes a locking element. When the developing roller being separated from the photo-sensitive drum in the processing cartridge, the locking element is configured to restrain a movement of the first force receiving element.

Optionally, the locking element is a second force receiving element.

Optionally, the electronic image forming device further includes a second force applying element. The second force receiving element is contactable with the second force applying element for enabling the second force receiving element to restrain the movement of the first force receiving element.

Optionally, the processing cartridge further includes a second elastic element, configured to enable the second force receiving element to be separated from the first force receiving element.

Another aspect of the present disclosure provides a processing cartridge. The processing cartridge is detachably installed in an electronic image forming device which includes a first force applying element. The processing cartridge includes:

- a developing roller and a first housing supporting the developing roller;
- a photo-sensitive drum and a second housing supporting the photo-sensitive drum; and
- a first force receiving element, contactable with the first force applying element.

The first force receiving element has a plurality of position states including a first position state, a second position state, and a third position state; when being in the first position state, the first force receiving element which protrudes and is rotatable relative to the first housing; when being in the second position state, the first force receiving element protrudes relative to the first housing, and is not capable to move relative to the first housing; and when being in the third position state, the first force receiving element is closer to the first housing compared with the first position state and the second position state.

The processing cartridge further includes a first elastic element, configured to maintain the first force receiving element in the first position state.

When the first force applying element pushes the first force receiving element to separate the developing roller from the photo-sensitive drum, the first force receiving element is in the second position state.

Optionally, the processing cartridge further includes a locking element. When the first force receiving element is in the second position state, the locking element is configured to restrain a movement of the first force receiving element.

Optionally, the locking element is a second force receiving element.

Optionally, the electronic image forming device further includes a second force applying element. The second force receiving element is contactable with the second force applying element for enabling the second force receiving element to restrain the movement of the first force receiving element.

Optionally, the processing cartridge further includes a second elastic element, configured to enable the second force receiving element to be separated from the first force receiving element.

Optionally, the processing cartridge further includes a swing restraining element. The swing restraining element includes a first end and a second end, and the first force receiving element rotates between the first end and the second end; when being in the first position state or the second position state, the first force receiving element is between the first end and the second end; and when being in the third position state, the first force receiving element is contactable with the first end or the second end.

Optionally, the first force receiving element includes:

- a pushing rod, rotatable between the first end and the second end and contactable with the first force applying element; and
- an abutting element, configured outside of the first end and the second end, and contactable with the locking element, where when the first force receiving element is in the second position state, the locking element is configured to restrain a movement of the abutting element.

Optionally, the locking element is a second force receiving element including: an abutting end, configured to abut against the abutting element; and

- a pushing end, connected to the abutting end and contactable with a second force applying element, where the second force applying element is capable of pushing the pushing end to enable the abutting end to restrain the movement of the abutting element.

Optionally, the second force receiving element further includes a contacting end, contactable with a second elastic element, where the second elastic element is configured to separate the abutting end from the abutting element.

Another aspect of the present disclosure provides a processing cartridge. The processing cartridge is detachably installed in an electronic image forming device which includes a first force applying element. The processing cartridge includes:

- a developing roller and a first housing supporting the developing roller;
- a photo-sensitive drum and a second housing supporting the photo-sensitive drum; and
- a first force receiving element, contactable with the first force applying element.

The first force receiving element is capable of rotating to a plurality of position states, including a first position state and a second position state, along a rotating axis in parallel with a length direction of the processing cartridge; when being in the first position state, the first force receiving element protrudes relative to the first housing; and when being in the second position state, the first force receiving element is closer to the first housing compared with the first position state.

When the first force applying element pushes the first force receiving element to separate the developing roller from the photo-sensitive drum, the first force receiving element is in the first position state.

Optionally, the processing cartridge further includes a locking element. When the first force receiving element is in the first position state, the locking element is configured to restrain a movement of the first force receiving element.

Optionally, the locking element is a second force receiving element.

Optionally, the electronic image forming device further includes a second force applying element, contactable with the second force applying element for enabling the second force receiving element to restrain the movement of the first force receiving element.

Optionally, the processing cartridge further includes a first elastic element, configured to maintain the first force receiving element in the first position state.

Optionally, the processing cartridge further includes a second elastic element, configured to enable the second force receiving element to be separated from the first force receiving element.

Another aspect of the present disclosure provides a processing cartridge. The processing cartridge is detachably installed in an electronic image forming device which includes a first force applying element. The processing cartridge includes:

- a developing roller and a first housing supporting the developing roller;
- a photo-sensitive drum and a second housing supporting the photo-sensitive drum; and
- a first force receiving element, contactable with the first force applying element.

The first force receiving element is capable of rotating to a plurality of position states, including a first position state and a second position state, along a rotating axis; when being in the first position state, the first force receiving element protrudes relative to the first housing; and when being in the second position state, the first force receiving element is closer to the first housing compared with the first position state.

The processing cartridge further includes a first elastic element, configured to maintain the first force receiving element in the first position state.

The processing cartridge further includes a locking element, when the first force receiving element is in the second position state, the locking element is configured to at least restrain a movement of the first force receiving element along one rotating axis.

Optionally, the locking element is a second force receiving element.

Optionally, the electronic image forming device further includes a second force applying element, contactable with the second force applying element for enabling the second force receiving element to restrain the movement of the first force receiving element.

Optionally, the processing cartridge further includes a second elastic element, configured to enable the second force receiving element to be separated from the first force receiving element.

Another aspect of the present disclosure provides a processing cartridge. The processing cartridge includes a developing unit and a photosensitive unit, where the developing unit includes a developing element, and the photosensitive unit includes a photosensitive element; and a control unit, including a control element, where when the control element is close to or away from the developing unit, the developing element is away from or close to the photosensitive element.

Optionally, the control element in the control unit is configured to move between a first position and a second position; when the control element is in the first position, the control element is away from the developing unit, and at this point, the photosensitive element is in contact with the developing element; and when the control element is in the second position, the control element is closer to the developing unit than when the control element is in the first position, and at this point, the developing element is not in contact with the photosensitive element.

Optionally, the control element in the control unit is configured to move between a first position and a second position; when the control element is in the first position, the control element is away from the developing unit, and at this point, the photosensitive element is close to the developing element; and when the control element is in the second position, the control element is closer to the developing unit than when the control element is in the first position, and at this point, the developing element is away from the photosensitive element.

Optionally, the control element is disposed on the developing unit and extends out of the developing unit to receive an external force.

Optionally, the control element includes a swing rod, and the control unit includes a first gear element, a second gear element, and a third gear element, which are disposed in the developing unit; the first gear element, the second gear element, and the third gear element are all disposed with gears; the first gear element is disposed with the swing rod configured to control a rotation of the first gear element; a gear on the second gear element meshes with a gear on the first gear element to transmit force; a gear on the third gear element meshes with a gear on the second gear element to transmit force; the third gear element is disposed with a cam portion which rotates with the third gear element; and a rotation of the swing rod controls the cam portion to be abutted or be not abutted against the photosensitive unit, thereby controlling the developing element to be close to or away from the photosensitive element.

Optionally, the control unit includes a pushing rod and an ejection rod; the pushing rod is the control element; the pushing rod is provided with a rotating axle, the ejection rod is provided with a rotating axle, and the pushing rod and the ejection rod are connected with each other by a hinge; the pushing rod and the ejection rod are both disposed on the developing unit; one end of the ejection rod is connected to the pushing rod, and the other end of the ejection rod extends toward a direction of the photosensitive unit; the pushing rod extends out of the developing unit; a rotation of the pushing rod around the rotating axle of the pushing rod controls a rotation of the ejection rod, such that the ejection rod is not abutted against or does not press the photosensitive unit, thereby making the developing element close to or away from the photosensitive element.

Optionally, the control unit includes a first pressing rod, a second gear element, and a third gear element; the first pressing rod is disposed with a rack portion which meshes with the second gear element, and the second gear element meshes with the third gear element; the third gear element is disposed with a cam portion; the first pressing rod, also disposed with an inclined surface, extends out of the developing unit; the first pressing rod is the control element; and the first pressing rod receives an external force to make the first pressing rod close to or away from the developing unit, such that the cam portion meshes with or does not mesh with the photosensitive unit, thereby making the developing element close to or away from the photosensitive element.

Optionally, the control unit includes a first pressing rod and a second ejection rod; the first pressing rod is the control element; the first pressing rod is capable of moving on the developing unit; an inclined surface is disposed on the first pressing rod; the second ejection rod is configured to rotate around a rotating axle disposed on the developing unit; and the first pressing rod receives an external force to make the first pressing rod close to or away from the developing unit, such that the second ejection rod is abutted or not abutted against the photosensitive unit, thereby making the developing element close to or away from the photosensitive element.

Another aspect of the present disclosure provides a processing cartridge. The processing cartridge includes a toner container and a waste toner container, where the processing cartridge is detachably installed in an electronic image-forming device, and a protrusion capable of extending and retracting along a vertical direction is disposed inside the electronic image-forming device; and a movable element, where the movable element is movably disposed at the processing cartridge and is capable of moving relative to the protrusion during a process of installing the processing cartridge.

Optionally, the movable element has a first position and a second position; during the process of installing the processing cartridge, the movable element receives a force from the electronic image-forming device, such that the movable element retracts into the processing cartridge to the first position; and after the installation of the processing cartridge is completed, the movable element is capable of moving from the first position to the second position; and when in the second position, the movable element is capable of receiving a pushing force from the electronic image-forming device, such that the toner container moves relative to the waste toner container.

Optionally, the movable element in the second position is closer to a lower side of the processing cartridge than the movable element in the first position; and after the installation of the processing cartridge is completed, the movable element, at least relying on gravity, moves toward the lower side of the processing cartridge from the first position to the second position.

Optionally, the processing cartridge is disposed with an accommodation container; the accommodation container is disposed with a detachment preventing portion; the movable element is disposed with an abutting portion; and the movable element is capable of moving relative to the accommodation container, and the abutting portion is capable of being abutted against the attachment preventing portion, thereby preventing the movable element from being separated from the accommodation container.

Optionally, the accommodation container is disposed with an elastic element; and the movable element, relying on gravity and an elastic force of the elastic element, moves toward the lower side of the processing cartridge from the first position to the second position.

Optionally, the processing cartridge is disposed with a rotating portion; and one end of the movable element is rotatably connected with the rotating portion, and the other end of the movable element relies on gravity and the elastic force of the elastic element to make the abutting portion being abutted against the detachment preventing portion.

Optionally, the movable element is disposed with a trench, and one end of the elastic element is abutted against inside the trench.

Optionally, the movable element has a pushing surface; and the pushing surface is capable of receiving a pushing force from the protrusion of the electronic image-forming device.

Optionally, the pushing surface is perpendicular to a horizontal plane; and/or the pushing surface is disposed with an engaging portion which matches the protrusion.

Optionally, the processing cartridge further includes a first pushing element, and a second pushing element, where the first pushing element receives a force of the movable element along the vertical direction, and the second pushing element receives a force of the movable element along a horizontal direction;

- when the movable element is in the first position, the first pushing element receives the force of the movable element along the vertical direction; and
- when the movable element is in the second position, the first pushing element receives the force of the movable element along the vertical direction, and the second pushing element receives the force of the movable element along the horizontal direction.

Optionally, the processing cartridge further includes a locking element, where when the movable element is in the second position, the movable element is fixed, along the horizontal direction, with the processing cartridge through the locking element.

Another aspect of the present disclosure provides an installation method of the processing cartridge, where the processing cartridge is configured to be installed in an electronic image-forming device, and the electronic image-forming device is disposed with a protrusion capable of extending and retracting along a vertical direction. The method includes:

- installing the processing cartridge into the electronic image-forming device along an installation direction; and
- moving a movable element of the processing cartridge relative to the protrusion, where the movable element retracts into the processing cartridge.

Optionally, the movable element has a first position and a second position; during a process of installing the processing cartridge, the movable element receives a force from the electronic image-forming device, such that the movable element retracts into the processing cartridge to the first position; and

- after the installation of the processing cartridge is completed, the movable element moves from the first position to the second position; and when in the second position, the movable element receives a pushing force from the electronic image-forming device, such that the toner container of the processing cartridge moves relative to the waste toner container of the processing cartridge.

Other aspects of the present disclosure can be understood by those skilled in the art in light of the description, the claims, and the drawings of the present disclosure.

The embodiments in the present disclosure may achieve at least the following beneficial effects.

The first force receiving element in the processing cartridge provided in the present disclosure may have the plurality of position states. When the first force receiving element is in the second position state, the first force receiving element is closer to the first housing compared with the first position state. Therefore, the problem that the processing cartridge is jammed in the electronic image forming device due to the unexpected protrusion of the first force receiving element may be avoided.

The processing cartridge provided by the present application may replace the fixed element by the movable element. During the process of installing the processing cartridge, the movable element may move relative to the protrusion, such that the protrusion inside the electronic image-forming device may no longer be retracted along the vertical direction due to the installation of the processing cartridge.

It should be understood that the above-mentioned general description and the following detailed description may only be exemplary, which may not limit the present application.

BRIEF DESCRIPTION OF THE DRAWINGS

In order to clearly illustrate the technical solutions in various embodiments of the present disclosure, the drawings, which are required to be used in the description of the disclosed embodiments, are briefly described hereinafter. It should be understood that the following drawings are merely some embodiments of the present disclosure and are not to be considered as the scope limitation. Other drawings derived from such drawings may be obtained by those skilled in the art without creative work.

FIGS. 82*a*-83*a* illustrate enlarged schematics of a movable element in corresponding states of FIGS. 82-83;

DETAILED DESCRIPTION

Figure 1:
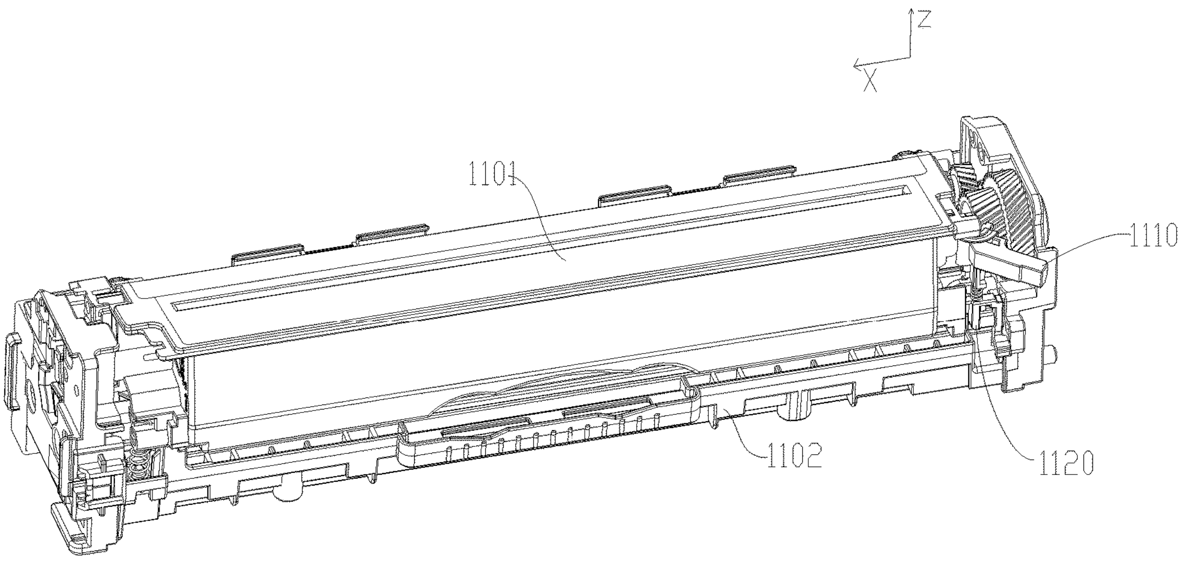
FIG. 1 illustrates a stereoscopic view of a processing cartridge (when the first force receiving element is in a protruding position) in the existing technology.

In order to clearly illustrate the purpose, technical solutions, and advantages of the present disclosure, the present application is further described in detail with reference to the accompanying drawings and embodiments. It should be understood that the embodiments described herein may merely be used to explain the present application and may not be used to limit the present application.

In the description of the present application, unless explicitly specified and limited otherwise, the terms "first" and "second" may merely be used for the purpose of description, and may not be understood as indicating or implying relative importance; unless otherwise specified or stated, the term "plurality" may refer two or more; and the terms "connection" and "fixation" should be understood in a broad sense, for example, the "connection" may be a fixed connection, a detachable connection, an integral connection, an electrical connection, or a direct connection or an indirect connection through an intermediate medium. For those skilled in the art, the specific meanings of the above-mentioned terms in present application may be understood according to specific situations.

In the description of the present specification, it should be understood that the terminology such as "on" and "below" described in the embodiments of the present application may be described from the angle shown in the drawings and should not be understood as the limitation to the embodiments of the present application. Furthermore, in the context, it also needs to be understood that when it is mentioned that an element is connected "on" or "below" another element, it may not only be directly connected "on" or "below" another element, but also may be indirectly connected "on" or "below" another element through an intermediate element.

Exemplary Embodiment One

Figure 3:
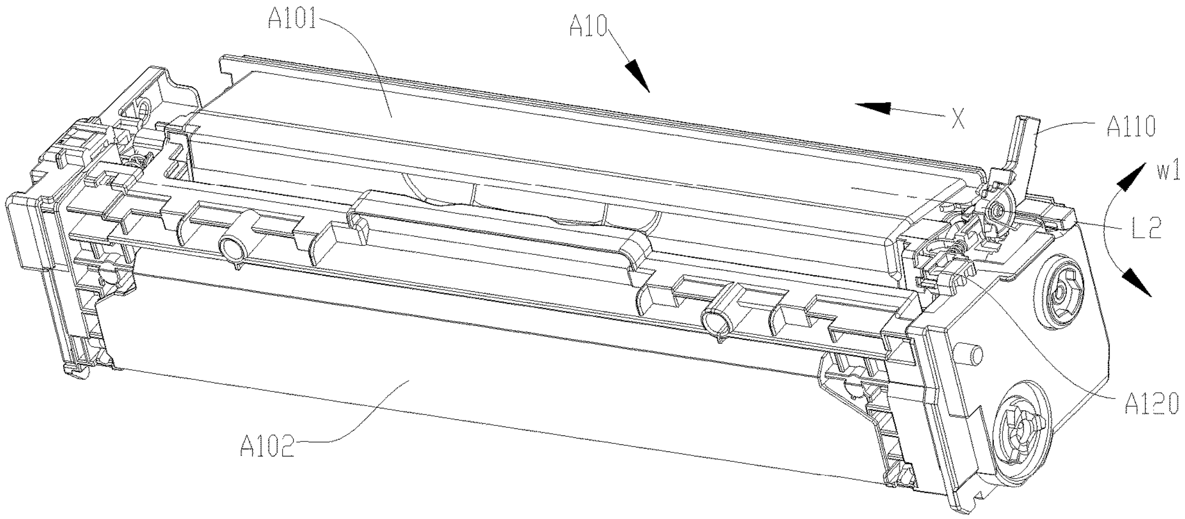
FIG. 3 illustrates a processing cartridge according to various embodiments of the present disclosure.
Figure 4:
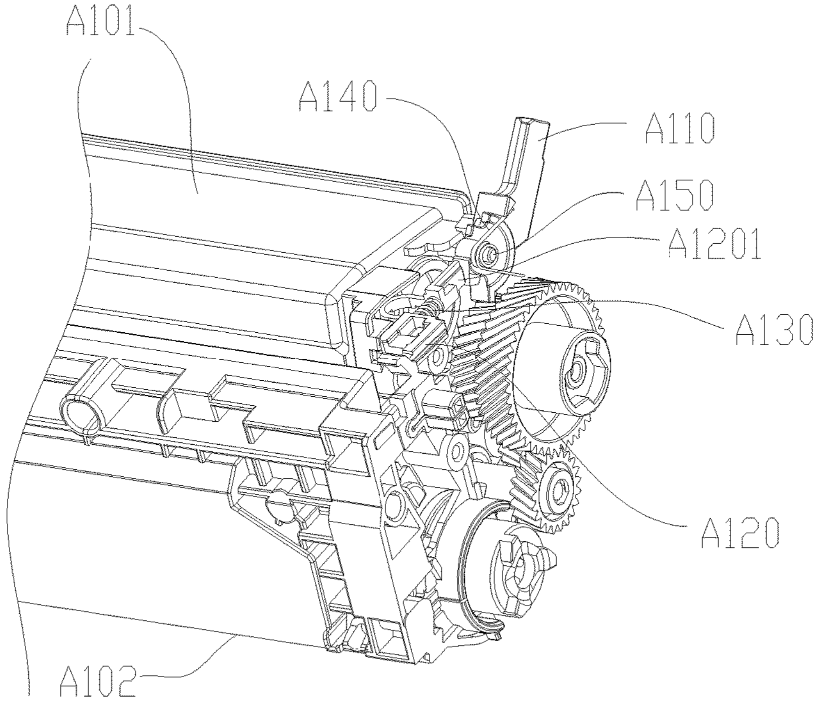
FIG. 4 illustrates a partial structural view of a processing cartridge according to various embodiments of the present disclosure.

Referring to FIG. 3 and FIG. 4, a force receiving device is provided in one embodiment.

As shown in FIG. 3, the force receiving device of the processing cartridge may include a second force receiving element A120, a first force receiving element A110, and a first elastic element A140. The first elastic element A140 may be abutted against a component of the first force receiving element A110 which may be relatively fixed to the housings of the processing cartridge (including a first housing A101 and a second housing A102) or the processing cartridge itself. The first force receiving element A110 may be constantly maintained at the position outwardly protruding from the housing of the processing cartridge under the action of the elastic element, the second force receiving element A120 may rotate around an axis L2 along the direction of W1, and the rotating axis L2 may be in parallel with the length direction (a X direction) of the processing cartridge. The second force receiving element A120 may slide on the housing of the processing cartridge, and the sliding direction may be perpendicular to the length direction (the X direction) of the processing cartridge, that is, be perpendicular to the rotating axis of the first force receiving element A110. For example, as shown in FIG. 4, the first housing A101 and the second housing A102 of the processing cartridge may move relatively, and the force receiving device may be disposed on the first housing A101. Furthermore, the first elastic element A140 may be a torsion spring, a tension spring, or a compression spring, where the torsion spring is the preferable form. When the first elastic element A140 is the torsion spring, one end of the first elastic element A140 may be abutted against a portion of the first force receiving element A110, and the other end of the first elastic element A140 may be abutted against at least a portion of the first housing A101 of the processing cartridge, or be abutted against other component disposed on the processing cartridge, such as an end cover disposed at an end portion of the processing cartridge along the length direction (the X direction). The second force receiving element A120 may be disposed on the second housing A102 and slide relative to the first housing A101. A second elastic element A130 may be disposed between the second force receiving element A120 and the second housing A102, which may enable the second force receiving element A120 to be rebounding. Obviously, the second elastic element A130 may also be disposed on a component, such as the end cover, of the second force receiving element which is relatively fixed to the processing cartridge.

Figure 5:
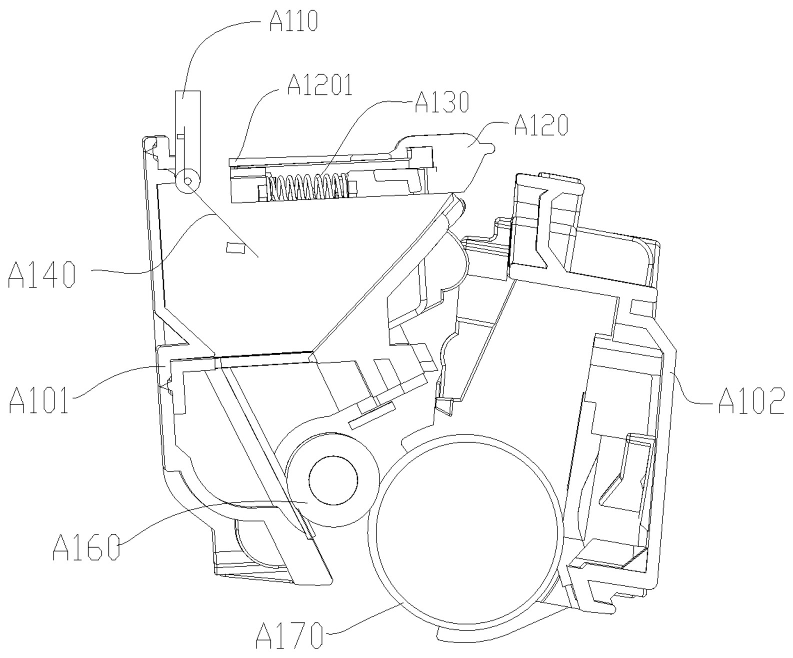
FIG. 5 illustrates a cross-sectional view of a processing cartridge according to various embodiments of the present disclosure.

Furthermore, FIG. 5 illustrates a cross-sectional view of the processing cartridge along the direction perpendicular to the length direction (the X direction) of the processing cartridge. A developing element A160 may be disposed at the first housing A101, and a photosensitive element A170 may be disposed at the second housing A102. In one embodiment, the force receiving device may be disposed at the first housing A101. Obviously, the force receiving device may not be limited to be disposed at the first housing A101; and similarly, the force receiving device may also be disposed at the second housing A102.

Furthermore, during the process of the processing cartridge from installation to printing task execution, the cooperation process between the force receiving device and the electronic image forming device may refer to FIGS. 7-10.

Figure 7:
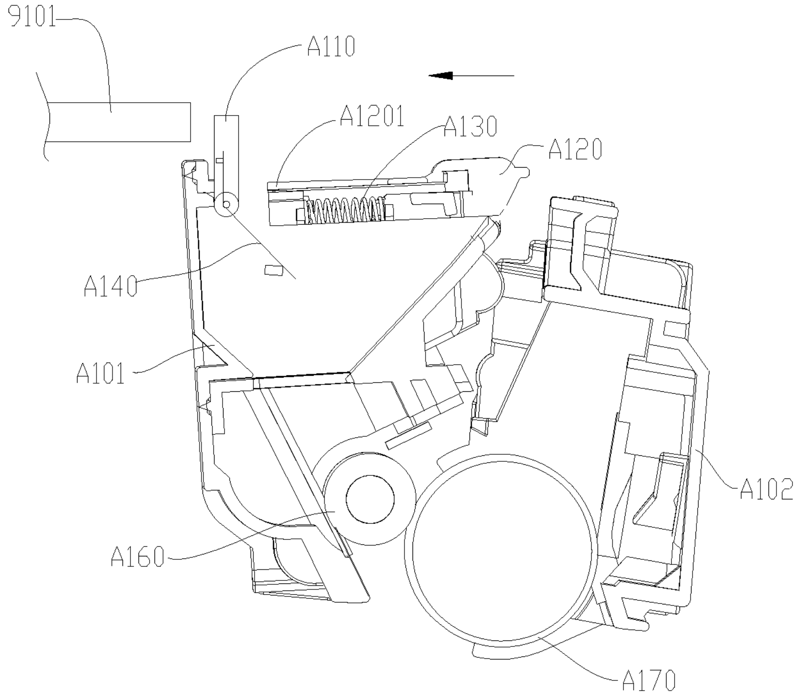
FIG. 7 illustrates a schematic of an installation process of a processing cartridge according to various embodiments of the present disclosure.
Figure 8:
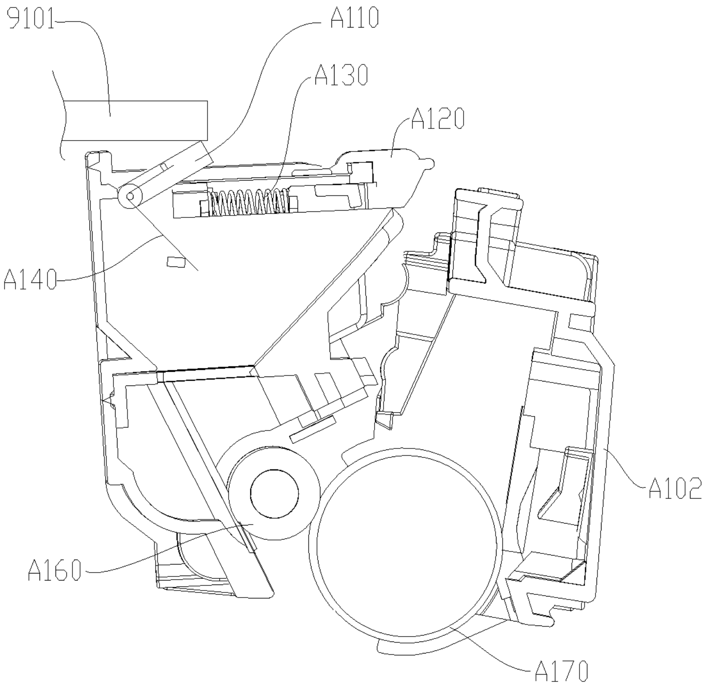
FIG. 8 illustrates a schematic of another installation process of a processing cartridge according to various embodiments of the present disclosure.

For example, FIGS. 7-8 illustrate the installation process of the processing cartridge. One or more processing cartridges may be on an installing frame of the electronic image forming device. As shown in FIG. 7, when the processing cartridge is not pushed into the electronic image forming device, the first force receiving element A110 may be maintained at an initial position by the first elastic element A140, and the initial position may be a position protruding outwardly relative to the housing of the processing cartridge. At this point, no force is between the second force receiving element A120 and the first force receiving element A110. As shown in FIG. 8, when the processing cartridge is installed in the electronic image forming device along the arrow direction shown in FIG. 7, the first force receiving element A110 may contact a protruding portion 9101 disposed in the electronic image forming device. In addition, under the action of the protruding portion 9101, the first force receiving element A110 may rotate around the axis L2, and the portion of the first force receiving element A110 protruding outwardly from the processing cartridge may rotate toward the inside of the processing cartridge, that is, move toward a position close to the first housing A101 until the protruding portion 9101 of the electronic image forming device is avoided, thereby facilitating the processing cartridge installation. Obviously, when the protruding portion 9101 in the electronic image forming device does not apply force on the first force receiving element A110, the first force receiving element A110 may return to the initial position under the action of the first elastic element A140. Compared with the existing technology, in the installation process of the processing cartridge, the problem that the processing cartridge is jammed in the electronic image forming device due to the unexpected ejection of the first force receiving element A110 may not occur in the above-mentioned configuration manner.

Figure 9:
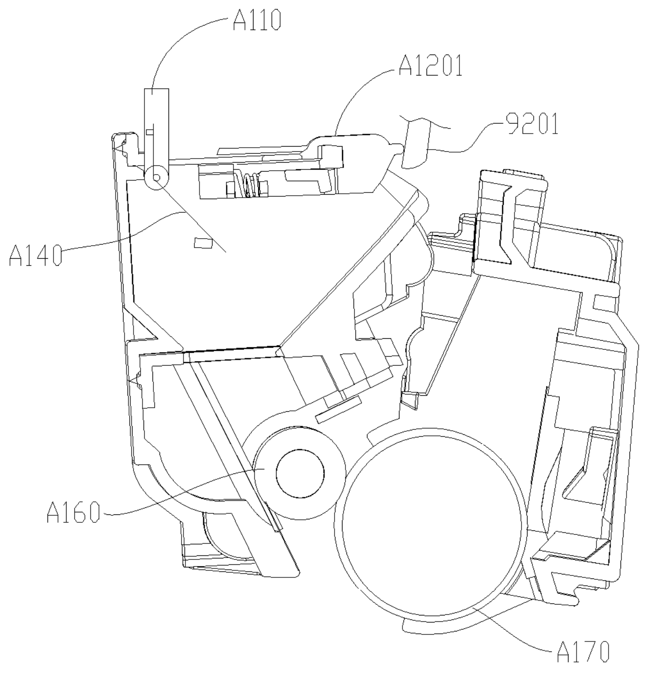
FIG. 9 illustrates a schematic of a working process of a force receiving device according to various embodiments of the present disclosure.

As shown in FIG. 9, after the processing cartridge is installed, the door cover of the electronic image forming device may be closed, and a printing task may start. Before the electronic image forming device executes the printing task, the first force receiving element A110 may be in the initial position. When the electronic image forming device executes the printing task, the first force applying element 9201 at the first force applying device 920 disposed in the electronic image forming device may act on the second force receiving element A120, which may enable the second force receiving element A120 to slide relative to the first housing A101, and also enable an abutting element A1201 at the second force receiving element A120 to be abutted against the first force receiving element A110, thereby stabilizing the first force receiving element A110 at the initial position.

Figure 10:
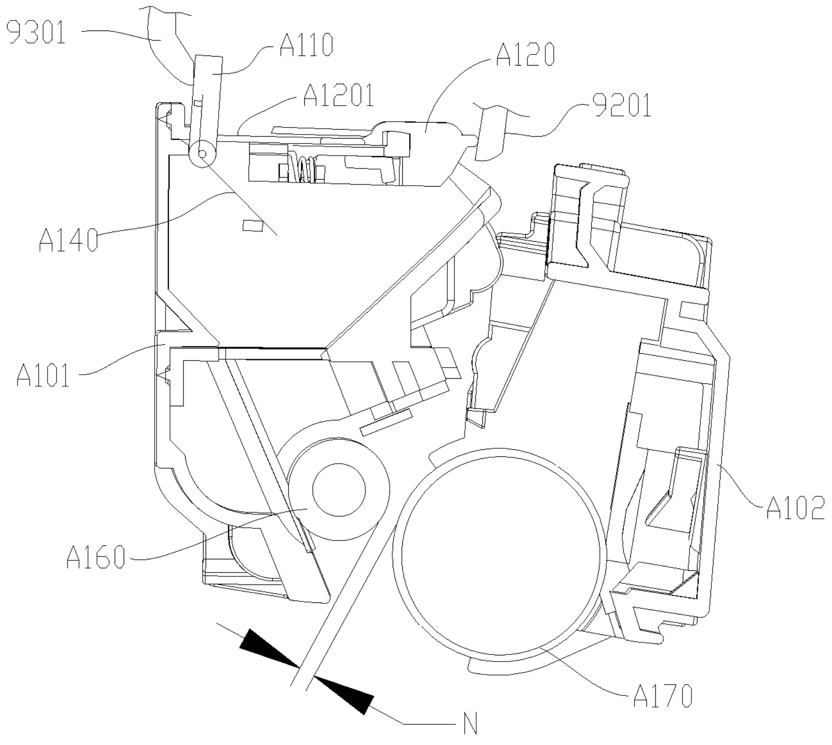
FIG. 10 illustrates a schematic of another working process of a force receiving device according to various embodiments of the present disclosure.

As shown in FIG. 10, when the processing cartridge does not perform the electronic image forming operation, the roller and drum (e.g., a developing roller and a photosensitive drum) separation operation may be required. The second force applying device 930 may also include a second force applying element 9301. The second force applying element 9301 may act on the left side of the first force receiving element A110 (relative to FIG. 10) along the direction perpendicular to the length direction (the X direction) of the processing cartridge, thereby enabling the first housing A101 to rotate relative to the second housing A102, and also enabling the developing element A160 and the photo-sensitive element A170 to move from a contact position to a separation position. At this point, a gap D may be formed between the surfaces of the developing element A160 and the photo-sensitive element A170, that is, the roller drum separation operation may be implemented.

Exemplary Embodiment Two

In the first embodiment, if the first force receiving element A110 is relatively close to the inner top surface of the machine after the processing cartridge is installed in the processing cartridge tray 910 disposed in the electronic image forming device, during the process of pulling the processing cartridge tray 910 out of the main body of the electronic image forming device, the first force receiving element A110 may not rotate along the direction close to the inside of the processing cartridge housing due to that the entering direction and the pulling direction of the processing cartridge tray 910 are opposite. As a result, the first force receiving element A110 may easily contact or interfere with the inner surface of the electronic image forming device.

Figure 11:
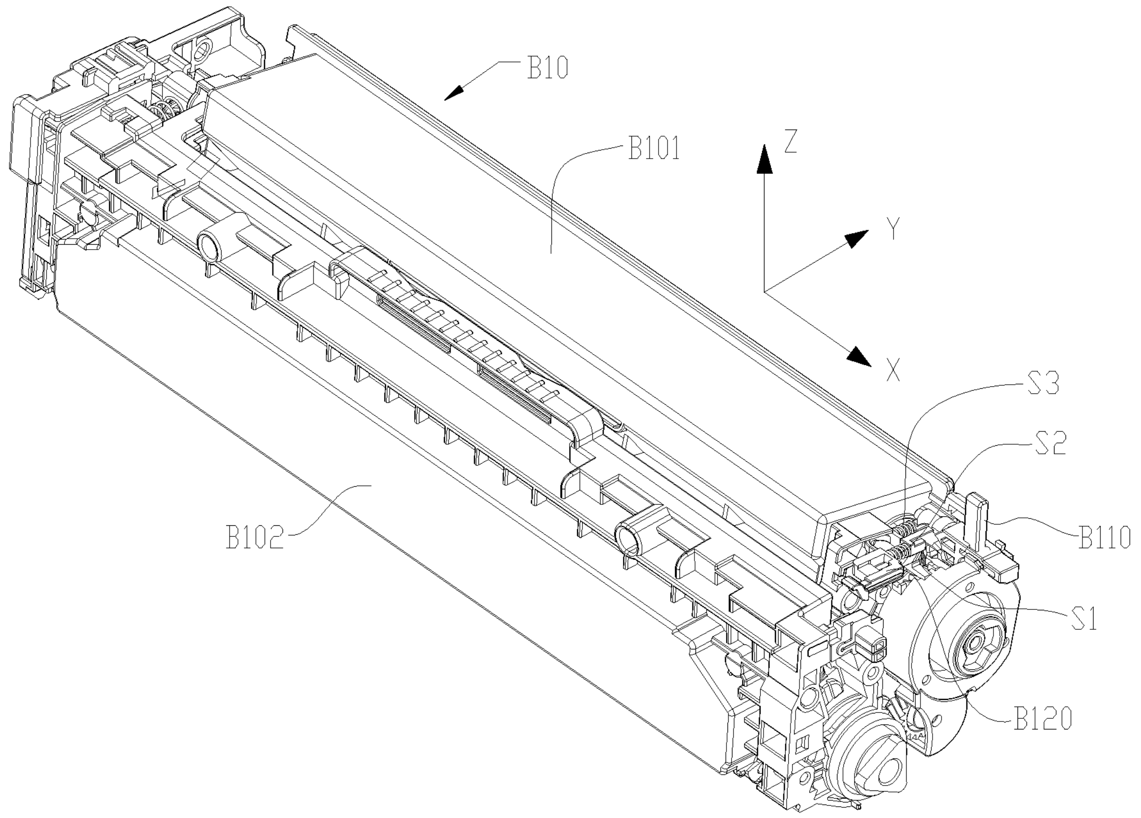
FIG. 11 illustrates a stereoscopic view of another processing cartridge.

One embodiment may be a further improved embodiment, referring to FIGS. 11-15 for the description of one embodiment. FIG. 11 illustrates a stereoscopic view of the processing cartridge provided in one embodiment, where, as shown in the view, the X direction is the length direction of the processing cartridge, and the Y and Z directions are directions perpendicular to the X direction, respectively. As shown in FIG. 11, the processing cartridge G10 may include a first housing G101 and a second housing G102. A force receiving device may be disposed on the processing cartridge G10. The force receiving device may include a first force receiving element G110 and a second force receiving element G120, which are respectively configured to cooperate with the first force applying element 9201 and the second force applying element 9301 disposed in the electronic image forming device.

Figure 12:
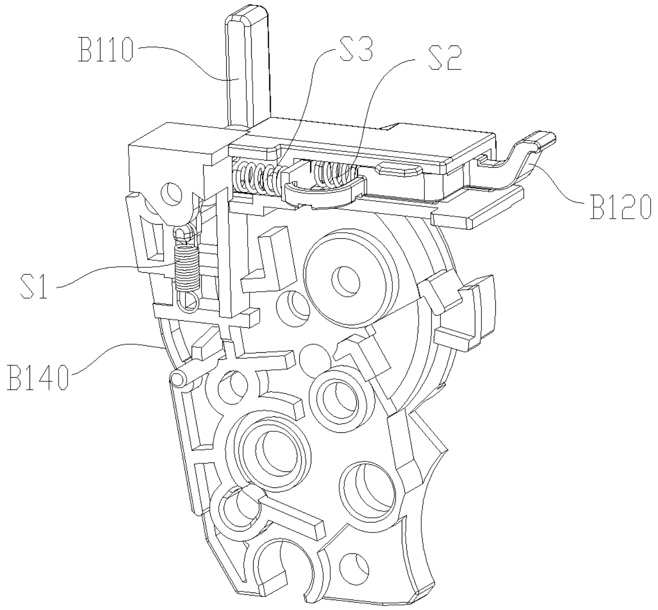
FIG. 12 illustrates a structural view of another force receiving device according to various embodiments of the present disclosure.

For example, referring FIG. 12, the first force receiving element G110 and the second force receiving element G120 may be respectively disposed on a frame G140 which may be relatively fixed to the first housing G101 or the second housing G102, or may be disposed on the first housing G101 or the second housing G102.

The force receiving device may further include a first elastic element S1. The first elastic element S1 may optionally be a torsion spring component, and may also be a tension spring, or a compression spring, which may not be limited in detail according to various embodiments of the present disclosure. The first elastic element S1 may enable the first force receiving element G110 to be at the position protruding from the first housing G101 without being affected by other external forces.

Figure 13:
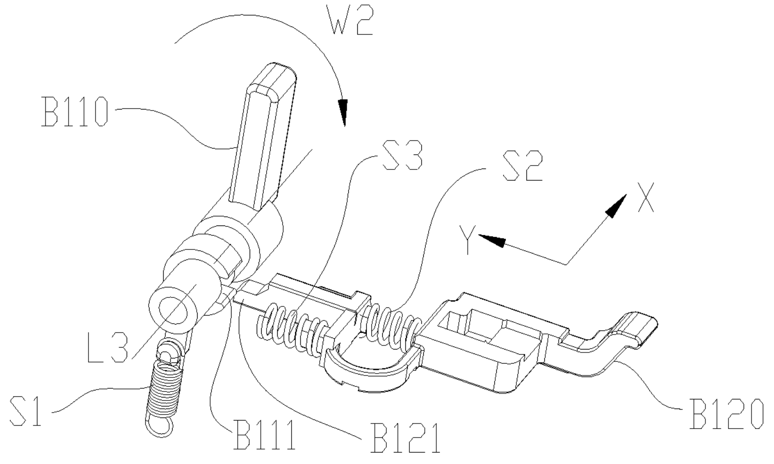
FIG. 13 illustrates a structural view of another force receiving device according to various embodiments of the present disclosure.

As shown in FIG. 12, such position may optionally be a position of the portion of the first force receiving element G110 protruding outwardly from the processing cartridge housing. Referring to FIGS. 12-13, under the action of the first elastic element S1, the first force receiving element G110 may be in the position protruding outwardly from the processing cartridge housing. Meanwhile, the first force receiving element G110 may be configured to be capable of rotating around the axis L3, where the direction of the axis L3 may be in parallel with the length direction (the X direction) of the processing cartridge housing. When the processing cartridge tray 910 is installed along the direction perpendicular to the length direction of the processing cartridge (e.g., installed along the Y direction), the portion of the first force receiving element G110 protruding outwardly from the processing cartridge housing may rotate around the W2 direction when interfering with the portion inside the electronic image forming device. When the processing cartridge tray 910 is removed along the direction opposite to the Y direction, the first force receiving element G110 may also rotate around the direction opposite to the W2 direction due to the interference between the first force receiving element G110 and the portion inside the electronic image forming device. During the installation and removal process, the first force receiving element G110 may be closer to the first housing G101 compared with the position in FIGS. 12-13. Compared with the first embodiment, in the technical solution provided in various embodiments of the present disclosure, the problem that the first force receiving element G110 does not rotate oppositely along the direction close to the inside of the processing cartridge housing during the process of pulling the processing cartridge tray 910 out of the main body of the electronic image forming device may not occur. That is, the processing cartridge in the first embodiment may not implement the effect of being removed from the electronic image forming device; however, the processing cartridge of the present disclosure may not only implement the entrance into the electronic image forming device but also implement the effect of being removed from the electronic image forming device.

In one embodiment, the processing cartridge may include a locking member which is optionally the second force receiving element G120. Obviously, the locking member may also be other locking portion or a self-locking structure. The following describes the action of the second force receiving element G120 on the first force receiving element G110.

The second force receiving element G120 may be disposed on the processing cartridge along the Y direction and move along the Y direction under the action of an external force. The second force receiving element G120 may be configured to receive the force of the first force applying element 9201 in the electronic image forming device, such that the force may act on the first force receiving element G110 through the second force receiving element G120. In order to avoid the rigid contact between the second force receiving element G120 and the first force receiving element G110, a second elastic element S2 and a U-shaped structure may be disposed at the second force receiving element G120. The second elastic element S2 may be disposed in the U-shaped structure to enable the second force receiving element G120 to have a certain elasticity.

Figure 14A:
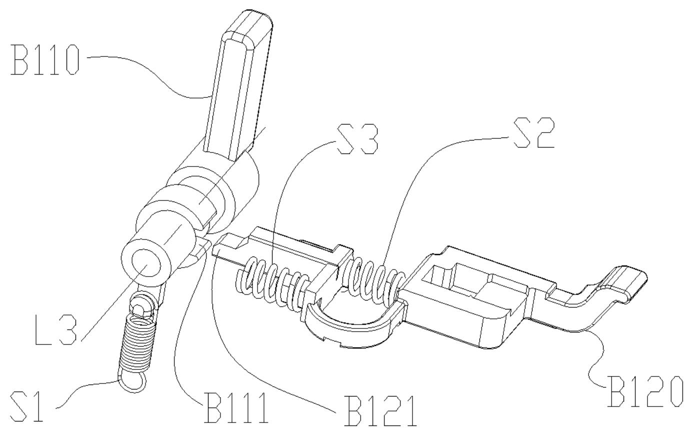
FIG. 14*a* illustrates a state view of another force receiving device according to various embodiments of the present disclosure.
Figure 14B:
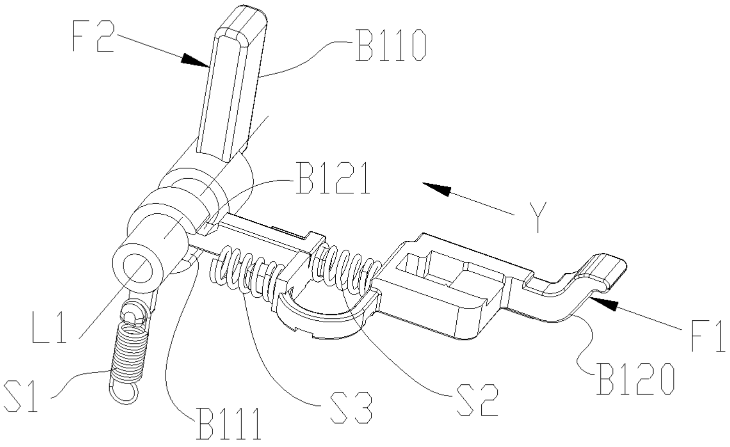
FIG. 14*b* illustrates another state view of another force receiving device according to various embodiments of the present disclosure.

FIGS. 14*a*-14*b* illustrate the interaction between the second force receiving element G120 and the first force receiving element G110. Referring to FIG. 14*a*, when the force of the first force applying member 9201 of the electronic image forming device is not be applied on the second force receiving element G120 at this point, the first force applying portion G120 may not be in contact with the first force receiving element G110; meanwhile, the first force receiving element G110 may be at the position protruding outwardly from the processing cartridge housing under the action of the first elastic element S1 and may rotate around the axis L3 under the action of the external force. Referring to FIG. 14*b*, when a force F6 of the first force applying member 9201 of the electronic image forming device is applied on the second force receiving element G120, the first force receiving element G110 may slide along the Y direction; and the second force receiving element G120 may be in contact with the first force receiving element G110 and restrict the rotation of the first force receiving element G110, that is, the first force receiving element G110 may not rotate along the direction close to the second housing G102. Optionally, an end portion G121 of the second force receiving element G120 may be inserted into a trench portion G111 of the first force receiving element G110 to stabilize the first force receiving element G110 at the position protruding outwardly from the processing cartridge housing, such that there is no relative movement between the first force receiving element G110 and the first housing G101. At this point, the second force applying element 9301 may apply a second force F7 onto the first force receiving element G110 to rotate the first housing G101 of the processing cartridge relative to the second housing G102.

Figure 15:
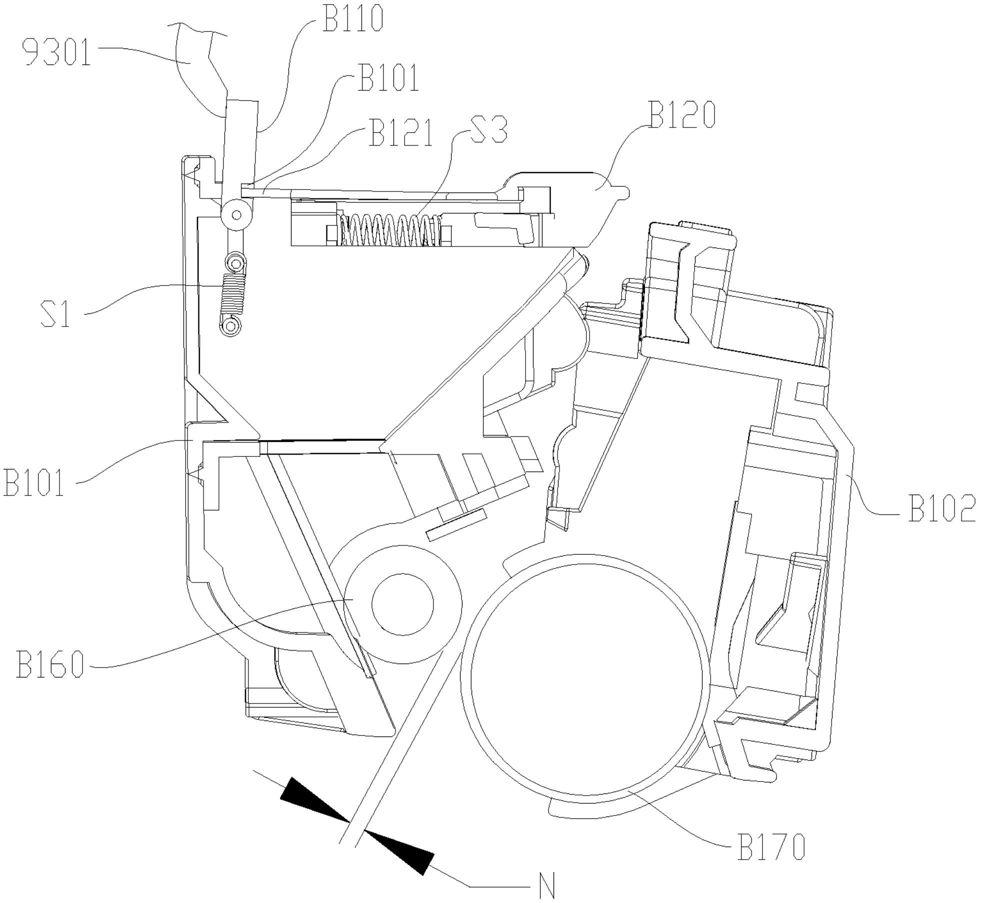
FIG. 15 illustrates a cross-sectional view of a processing cartridge according to various embodiments of the present disclosure.

FIG. 15 illustrates the roller drum separation operation, that is, the developing roller G160 disposed at the first housing G101 and the photo-sensitive drum G170 disposed at the second housing G102 may be separated from each other. At this point, a gap D may be formed between the surfaces of the developing roller G160 and the photo-sensitive drum G170. The force receiving device may further include a third elastic element S3, such as a compression spring, optionally. The third elastic element S3 may be disposed between the second force receiving element G120 and the frame G140 or the first housing G101 of the processing cartridge. When the force F6 applied by the first force applying element 9201 is removed, the third elastic element S3 may be configured to reset the second force receiving element G120.

Furthermore, the trench portion G111 may also be disposed at the second force receiving element G120. Meanwhile, a protruding portion may be disposed at the first force receiving element G110 to match the trench portion G111, thereby stabilizing the first force receiving element G110 at the protruding position and locking the first force receiving element G110.

Exemplary Embodiment Three

The present disclosure further provides another embodiment which may simplify the structure of the electronic image forming device.

The electronic image forming device in the existing technology may include a tray for disposing the processing cartridge and a door cover, where the door cover and the tray are connected with each other. After pushing the tray inside the electronic image forming device, the door cover of the electronic image forming device may be closed. The door cover may drive the tray to move, such that the tray may carry the processing cartridge disposed on the tray to move downwardly (along the direction opposite to the Z axis direction shown in FIG. 16) a certain distance to complete the installation, and also make the processing cartridge in the position to be operated.

Figure 16:
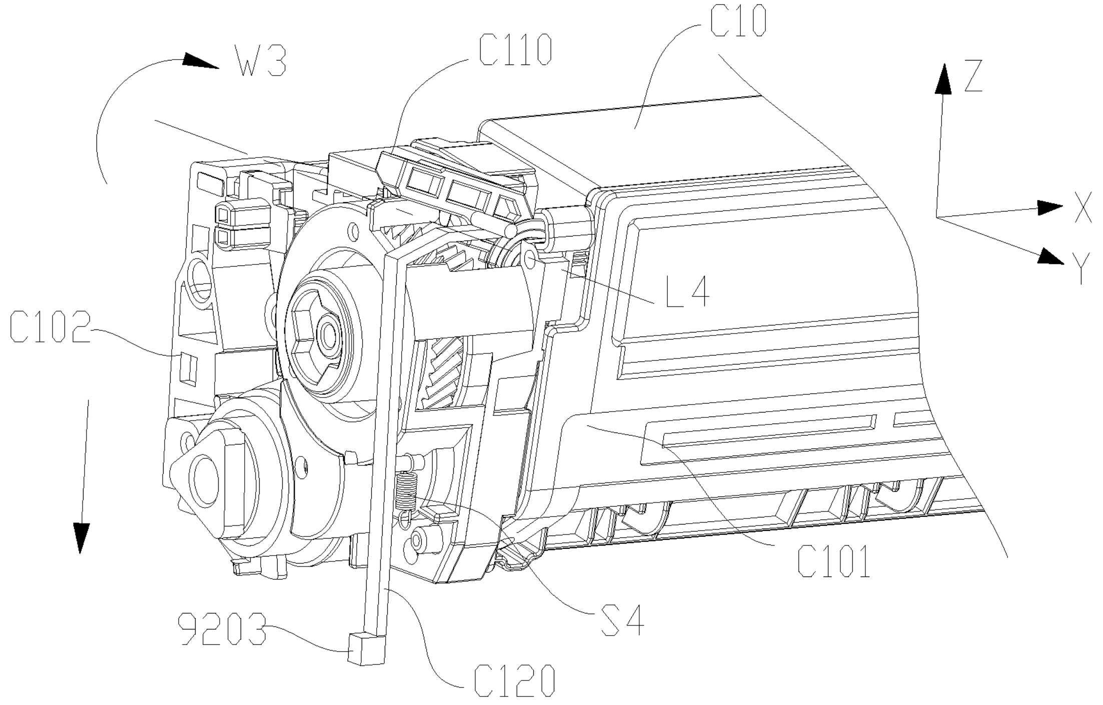
FIG. 16 illustrates a partial view of another processing cartridge according to various embodiments of the present disclosure.

Referring to FIG. 16, a second force receiving element C120 and a first force receiving element C110 may be disposed at a processing cartridge C10 provided by one embodiment. During the process of carrying the processing cartridge downwardly along the Z axis by the tray, the second force receiving element C120 may receive the force from an element 9203 inside the electronic image forming device, which may enable the second force receiving element C120 to move upwardly along the Z axis; and a rotating axis L4 of the first force receiving element C110 may rotate along the direction W3 by the action of the second force receiving element C120, thereby moving the first force receiving element C110 from a retracted position to a position protruding outwardly from the processing cartridge housing. At this point, the first force receiving element C110 may receive the force of the second force applying element 9301 disposed in the electronic image forming device, and the first housing 101 of the processing cartridge may move relative to the second housing 102, thereby separating the developing roller and the photosensitive drum. Meanwhile, a first elastic element may be disposed to be connected with the first force receiving element C110, and the first elastic element may be a tension spring or a spring. After the processing cartridge is lifted up along the direction of the Z axis, the second force receiving element C120 may not be affected by the element 9203 disposed in the electronic image forming device, and the first elastic element may reset the first force receiving element C110. Furthermore, the second force receiving element C120 and the first force receiving element C110 may also be configured as a linked action, where the first force receiving element C110 may be retracted when the second force receiving element is reset. Or, a second elastic element may be additionally configured to be connected with the second force receiving element C120, and the first force receiving element C110 may be reset by an elastic force.

Exemplary Embodiment Four

The force receiving device in one embodiment of the present disclosure may be an improved version of the force receiving device in the second embodiment in combination with the third embodiment. In one embodiment, the installation direction of the processing cartridge may be from left to right in FIG. 17 and FIGS. 19-22. That is, after the processing cartridge is installed in the processing cartridge tray 910 of the electronic image forming device, the tray may carry the processing cartridge to be installed from left to right and to be removed from right to left.

Compared with the force receiving device in the second embodiment, the structure in one embodiment may have the following modifications.

In the second embodiment, as shown in FIG. 13, the first force receiving element G110 may rotate around the axis L3. In one embodiment, in order to further simplify the structure and reduce the cost of the production and assembly process, the rotating axis of the first force receiving element D110 in one embodiment may coincide with the rotating axis L3 of the first housing D101 which may rotate relative to the second housing D102 during the roller drum separation process. Optionally, the first force receiving element D110 may be directly disposed at an existing separation frame D999 in the existing technology to reduce the quantity of elements and save cost.

In the second embodiment, as shown in FIG. 13, the first force receiving element G110 may be connected to the first elastic element S1, and the first elastic element S1 may enable the first force receiving element G110 to be at a preset position without an external force, where the position may be protruding relative to the first housing D101.

Figure 17:
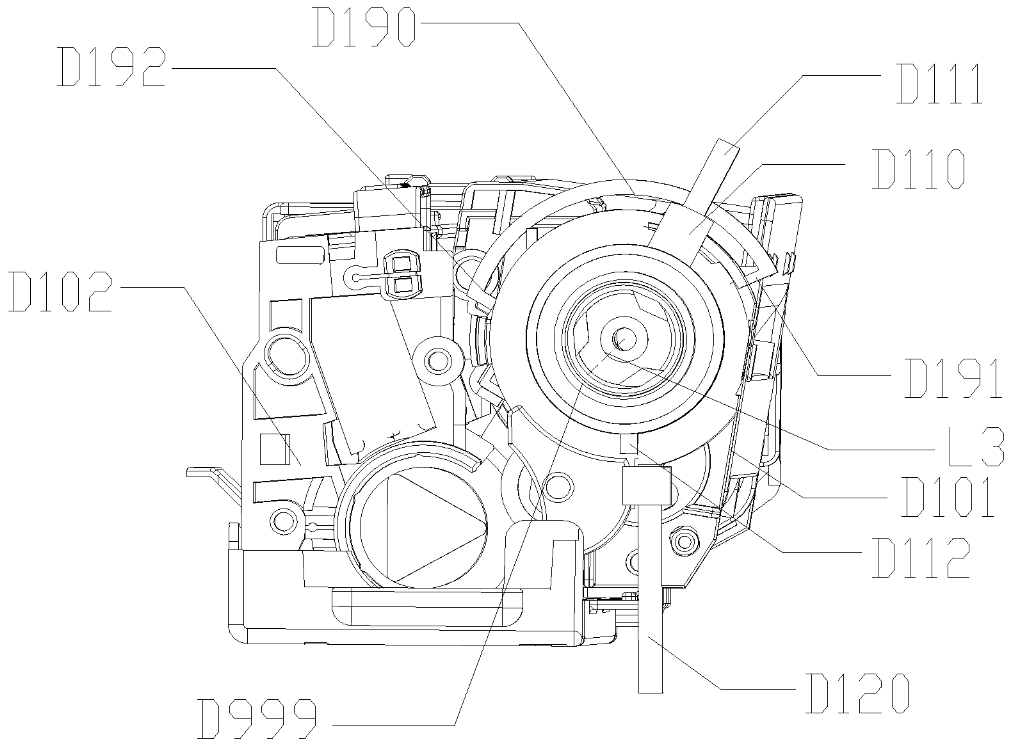
FIG. 17 illustrates a state of a processing cartridge before being installed in an electronic image forming device in exemplary embodiment four.

As shown in FIGS. 17-22, in one embodiment, the first force receiving element D110 may still be connected to the toner cartridge main body through a first elastic element (not shown in FIGS. 17-22), but the preset position may be closer to the first housing D101. As shown in FIG. 17, the preset position of a pushing rod D111, which is the portion of the first force receiving element D110 for being abutted against the electronic image forming device, may be closer to the first housing D101 relative to the vertical direction.

In the second embodiment, as shown in FIGS. 14*a*-14*b*, after receiving an external force, the second force receiving element G120 may act on the first force receiving element G110, such that the force may be received by the first force receiving element G110 to separate the roller and the drum. The second elastic element S2 and the third elastic element S3 may be disposed at the second force receiving element G120.

Figure 18:
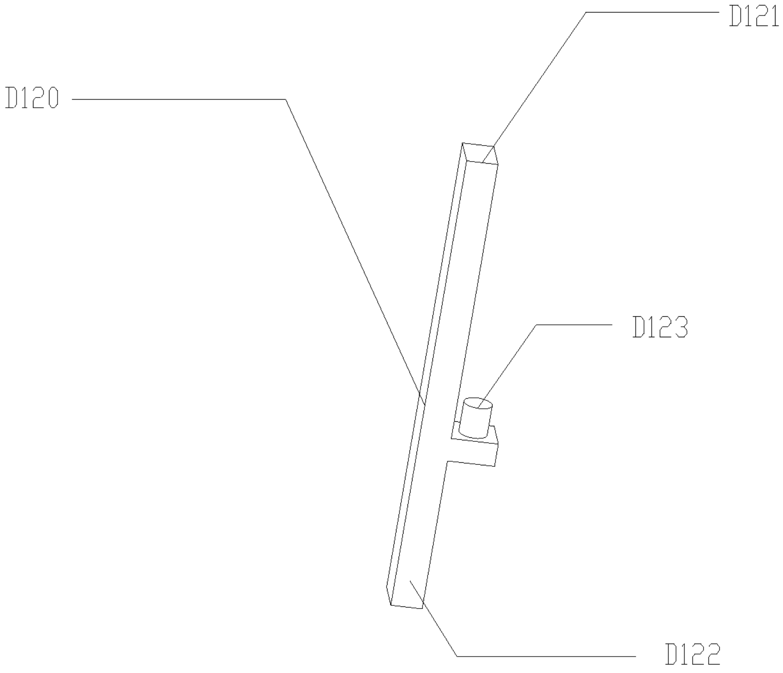
FIG. 18 illustrates a stereoscopic view of a second force receiving element in exemplary embodiment four.

In one embodiment, as shown in FIGS. 17-18, the second force receiving element D120 may not be configured to directly contact the pushing pod D111 of the first force receiving element D110. The first force receiving element D110 may be an annular structure, and the center of the annular structure may be the rotating axis where the first housing D101 moves around the second housing D102 during the roller and drum separation. Two protrusions, which are the pushing rod D111 and an abutting element D112, may be disposed at the first force receiving element D110. The abutting element D112 may be configured to be abutted against an abutting end D121 of the second force receiving element D120, which may achieve the objective of restraining the first force receiving element D110 by the second force receiving element D120. The second force receiving element D120 may no longer receive the external force from the electronic image forming device, buy relay on the gravity of the processing cartridge itself.

It should be understood that the second force receiving element D120 may be similar to the second force receiving element G120 in the second embodiment and may also be disposed at the first housing D101. Meanwhile, the second elastic element S2 and the third elastic element S3 may no longer be disposed at the second force receiving element D120, and the structure may be more explicit with the following description.

FIG. 17 illustrates the state of the processing cartridge before being installed in the electronic image forming device. The viewing angle may be obtained by observing from a sidewall adjacent to the force receiving device in two sidewalls along the length direction of the processing cartridge. As shown in FIG. 17, the first force receiving element D110 may swing freely relative to the rotating axis without being restrained by the second force receiving element D120, and the first force receiving element D110 may be protruding relative to the first housing D101 at this point.

Optionally, an arc-shaped swing restraining element D190 may be further disposed at the processing cartridge. The swing restraining element D190 may include a first end D191 and a second end D192. The first end D191 and the second end D192 may respectively contact the first force receiving element D110 to restrain the swing angle of the first force receiving element D110. Optionally, the swing restraining element D190 may be disposed at the first housing D101.

FIG. 18 illustrates the stereoscopic view of the second force receiving element D120. As shown in FIG. 18, the second force receiving element D120 may include the abutting end D121 which is abutted against the abutting element D112, a pushing end D122 at an opposite end of the abutting end D121, and a contacting end D123 which is in contact with the second elastic element (not shown). One end of the second elastic element may be abutted against the contacting end D123, and the other end may be abutted against the processing cartridge main body. The second elastic element, without an external force, may not generate an elastic force or generate an elastic force that moves the second force receiving element D120 away from the first force receiving element D120.

Figure 19:
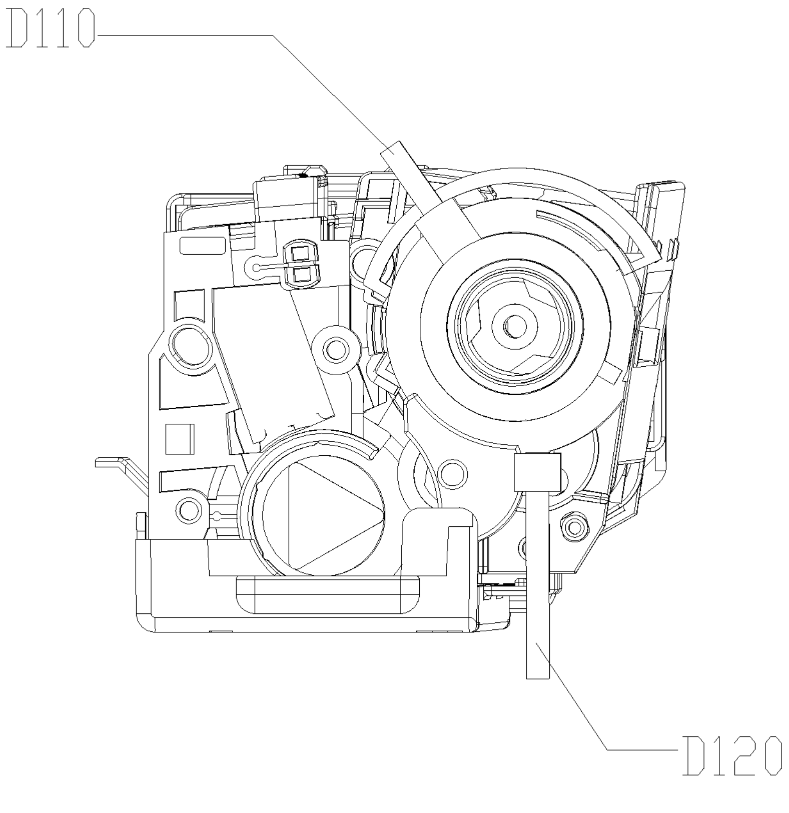
FIG. 19 illustrates a state where the second force receiving element interferes with an electronic image forming device when the processing cartridge is installed in the electronic image forming device in exemplary embodiment four.

FIG. 19 illustrates the state where the second force receiving element interferes with the electronic image forming device when the processing cartridge is installed in the electronic image forming device. At this point, the processing cartridge is installed on the tray along the direction that the first housing D101 is at the front and the second housing D102 is at the rear (e.g., the movement from left to right in FIG. 19). Since the second force receiving element D120 has not been pushed and/or not moved to the position restraining the first force receiving element D110, the first force receiving element D100 may freely swing, relatively. For example, the first force receiving element D110 may swing to the position closer to the first housing D101, thereby smoothly installing the processing cartridge in the electronic image forming device. After the processing cartridge is installed in the electronic image forming device with the tray 910, the first elastic element may push the first force receiving element D110 to be reset to the state in FIG. 17.

Figure 20:
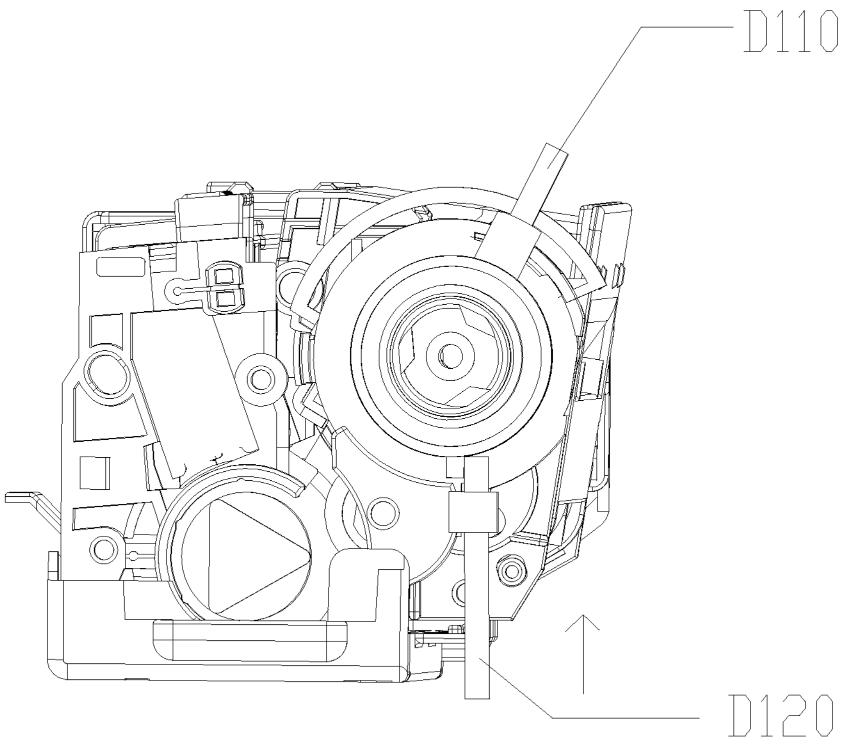
FIG. 20 illustrates a state where the door cover of an electronic image forming device is closed after the processing cartridge is installed in the electronic image forming device in exemplary embodiment four.

FIG. 20 illustrates the state where the door cover of the electronic image forming device is closed after the processing cartridge is installed in the electronic image forming device, where the door cover is closed at this point. At the process of closing the door cover, the tray with the processing cartridge may be lowered along the vertical direction. At this point, the pushing end D122 of the second force receiving element D120 may gradually be abutted against the inside of the electronic image forming device; and under the pressure of the gravity of the processing cartridge, the second force receiving element D120 may move toward the direction of the first force receiving element D110 and compress the second elastic element. When the door cover of the electronic image forming device is completely closed and the tray is lowered to the appropriate position, the second force receiving element D120 may move to the position. At this point, the first force receiving element D110 may be restrained by the second force receiving element D120 as shown in FIG. 20. Therefore, the first force receiving element D110 may not swing freely along the counterclockwise direction shown in FIG. 20, that is, the pushing pod D111 may not move freely along the direction toward the second housing D102. Then, the electronic image forming device may apply a force on the pushing rod D111 along the direction toward the second housing D102, such that the first housing D101 may rotate relative to the second housing D102 to complete the roller and drum separation.

Figure 21:
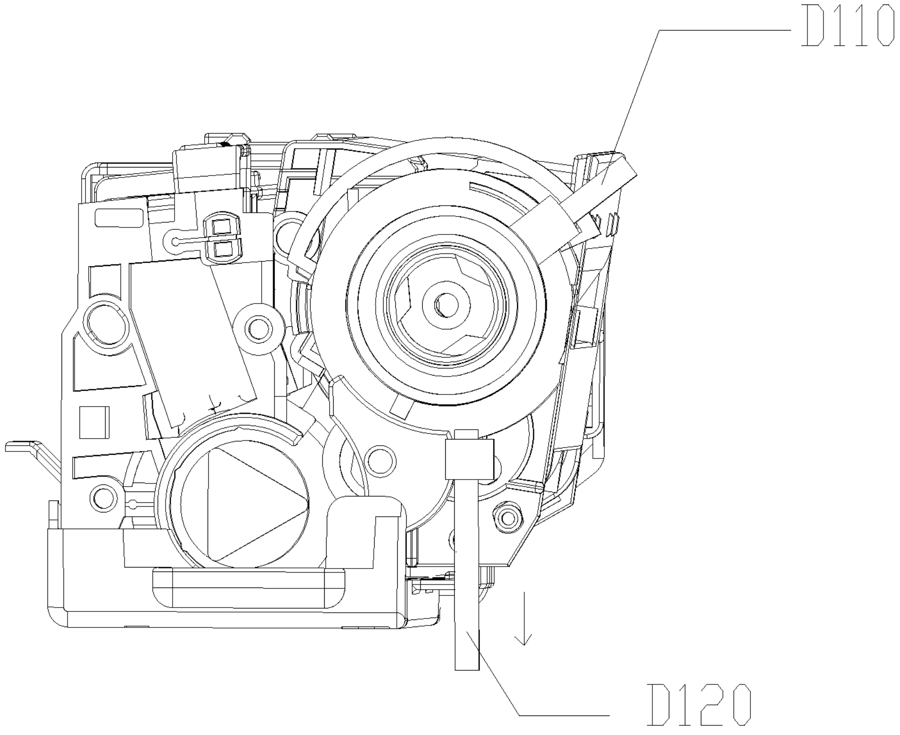
FIG. 21 illustrates a state where a first force receiving element is normally ejected when the processing cartridge tray is removed from the electronic image forming device.
Figure 22:
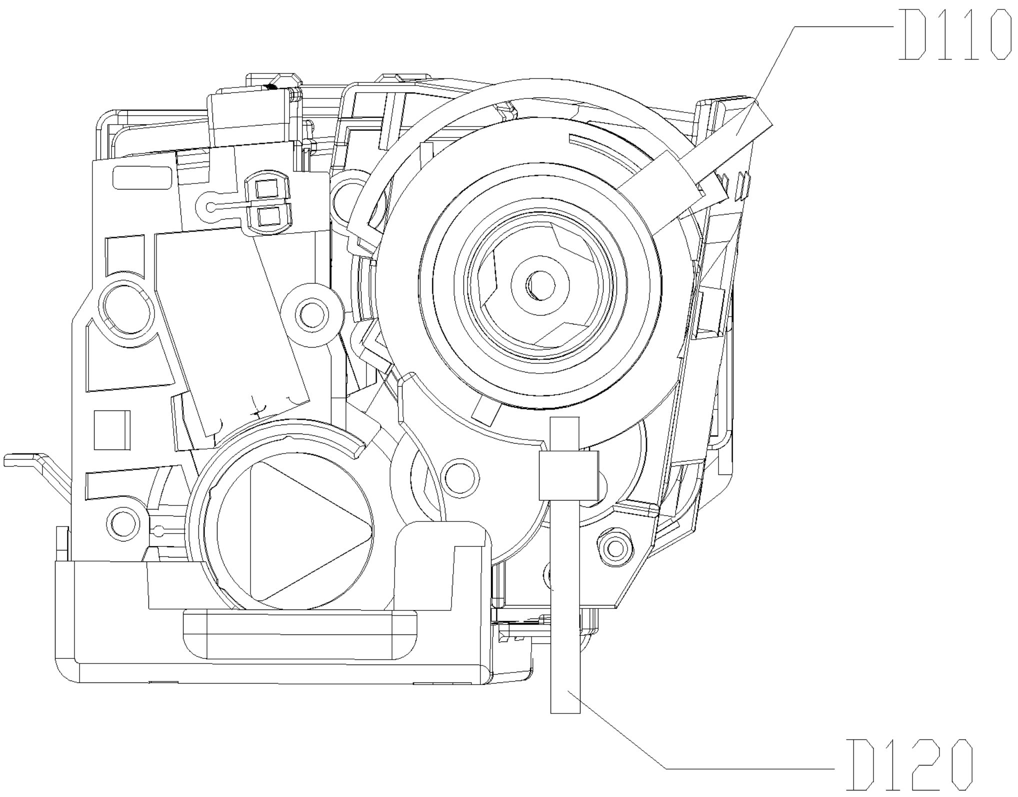
FIG. 22 illustrates a state where a first force receiving element is not normally ejected when the processing cartridge tray is removed from the electronic image forming device.

FIG. 21 illustrates the state that the second force receiving element D120 is normally ejected when the processing cartridge tray is removed from the electronic image forming device with the tray. FIG. 22 illustrates the state that the second force receiving element D120 is not normally ejected when the processing cartridge tray is removed from the electronic image forming device with the tray. In both states, the first force receiving element D110 may always be a protruding state relative to the first housing D101. At this point, the first force receiving element D110 may interfere with the electronic image forming device, the processing cartridge may swing along the clockwise direction (e.g., the direction where the pushing rod D111 moves toward the first housing D101), thereby being removed smoothly. Compared with the first embodiment, in the technical solution provided in various embodiments of the present disclosure, the problem that the first force receiving element D110 may not rotate oppositely along the direction close to the inside of the processing cartridge housing during the process of pulling the processing cartridge tray 910 out of the main body of the electronic image forming device may not occur. That is, the processing cartridge in the first embodiment may not implement the effect of being removed from the electronic image forming device; however, the processing cartridge of the present disclosure may not only implement the entrance into the electronic image forming device but also implement the effect of being removed from the electronic image forming device.

For the structures in the second embodiment or other similar structures, when the electronic image forming device is opened to remove the processing cartridge after the printing is completed or the life of the processing cartridge is reached, if the second force receiving element D120 is not normally pushed by the second elastic element to be reset to the original position without the external force (e.g., not ejected away from the processing cartridge), the first force receiving element D110 may not be able to swing normally during the process of removing the processing cartridge, such that the processing cartridge may be jammed and unable to be removed. However, in one embodiment as shown in FIG. 22, even if the second force receiving element D120 is not completely ejected, the processing cartridge may still be removed from the electronic image forming device with the tray. Meanwhile, when the faulty processing cartridge is re-installed in the electronic image forming device, it is obvious that the processing cartridge, especially the first force receiving element D110, may no longer reach the position shown in FIG. 19 due to the interference, such that the processing cartridge may not be installed in the image forming device. Therefore, such design may implement the function of automatic fault detection. The function may prevent the problem in other cases that the electronic image forming device may not be used because the processing cartridge is not installed or removed due to the malfunction in the electronic image forming device.

Exemplary Embodiment Five

Figure 23:
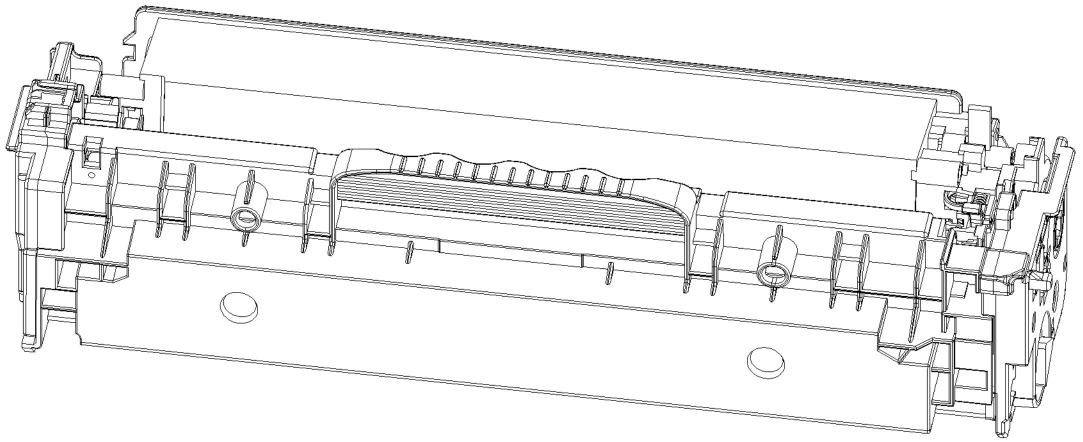
FIG. 23 illustrates a stereoscopic view of a processing cartridge in exemplary embodiment five.
Figure 24:
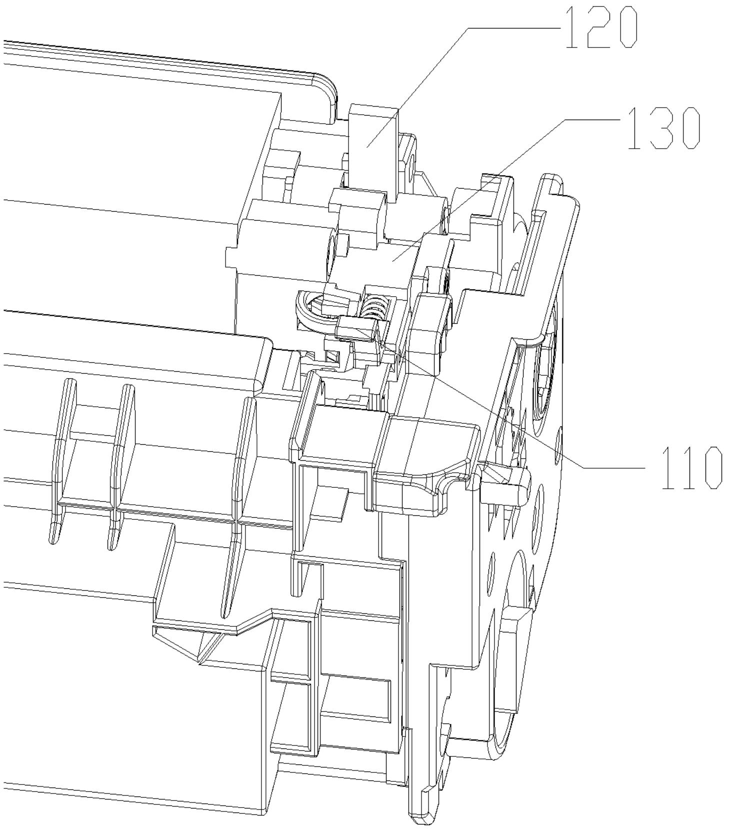
FIG. 24 illustrates a locally enlarged view of FIG. 23.

FIG. 23 illustrates a stereoscopic view of the processing cartridge in exemplary embodiment five, and FIG. 24 illustrates a locally enlarged view of FIG. 23, where FIG. 24 is a right end portion in FIG. 23. In one embodiment, the force receiving device may be located on the right side of the processing cartridge relative to the installation direction of the processing cartridge and also be adjacent to the front of the installation direction. After being installed in the electronic image forming device, the force receiving device may be on the same side of the first force applying device 920 and the second force applying device 930 in the electronic image forming device. As shown in FIG. 24, the processing cartridge may include a second force receiving element H110, a first force receiving element H120, and a support frame H130 that supports the second force receiving element H110 and/or the first force receiving element H120. The second force receiving element H110 may contact and be pushed by the first force applying device 920 of the electronic image forming device, and the first force receiving element H120 may contact and be pushed by the second force applying device 930 of the electronic image forming device.

Figure 25:
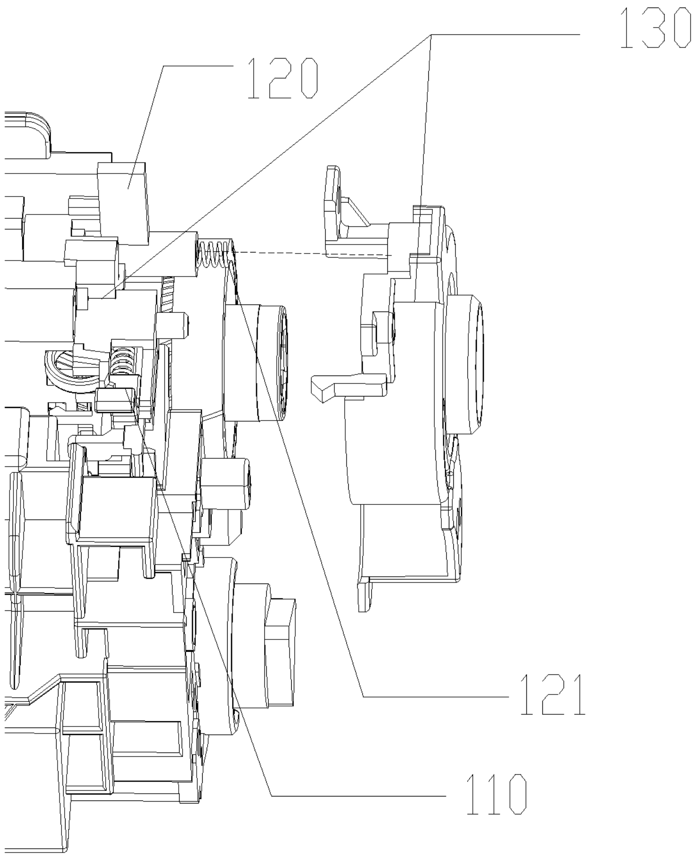
FIG. 25 illustrates an exploded view of a processing cartridge in exemplary embodiment five.
Figure 26:
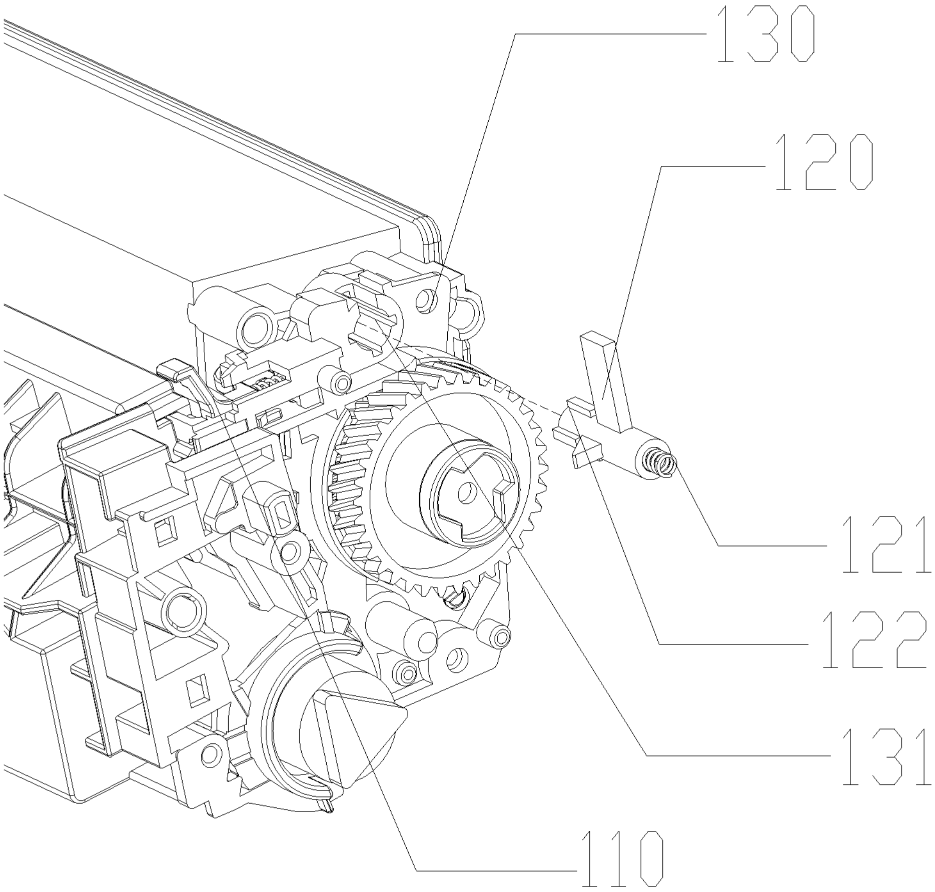
FIG. 26 illustrates another exploded view of a processing cartridge in exemplary embodiment five.

FIGS. 25-26 are exploded views, which may mainly illustrate how the first force receiving element H120 is fixed on the support frame H130. The first force receiving element H120 may include an elastic element H121. Optionally, the elastic element H121 may push the first force receiving element H120 to move away from the right end portion of the processing cartridge, such that the first force receiving element H120 may be at the position away from the right end portion of the processing cartridge without external force, as shown in FIG. 25. Obviously, the elastic element may also be disposed on the side of the first force receiving element H120 adjacent to the left end portion of the processing cartridge and may pull the first force receiving element H120 to move toward the left end portion. The first force receiving element H120 may further include a limiting part H122, such that the first force receiving element H120 may only translate along the length direction of the processing cartridge. Optionally, the limiting part H122 may be a cross protrusion, and the support frame H130 may include a cross trench H131. Through the engagement of the limiting part H122 and the cross trench H131, the first force receiving element H120 may only translate along the length direction of the processing cartridge, as shown in FIG. 26. Obviously, the quantity of the trenches and protrusions may be appropriately increased or decreased, or other existing technology in the mechanical field may be applied to keep the first force receiving element H120 moving only along the length direction of the processing cartridge. Only a preferred solution with a relatively simple process is introduced in one embodiment.

Figure 27:
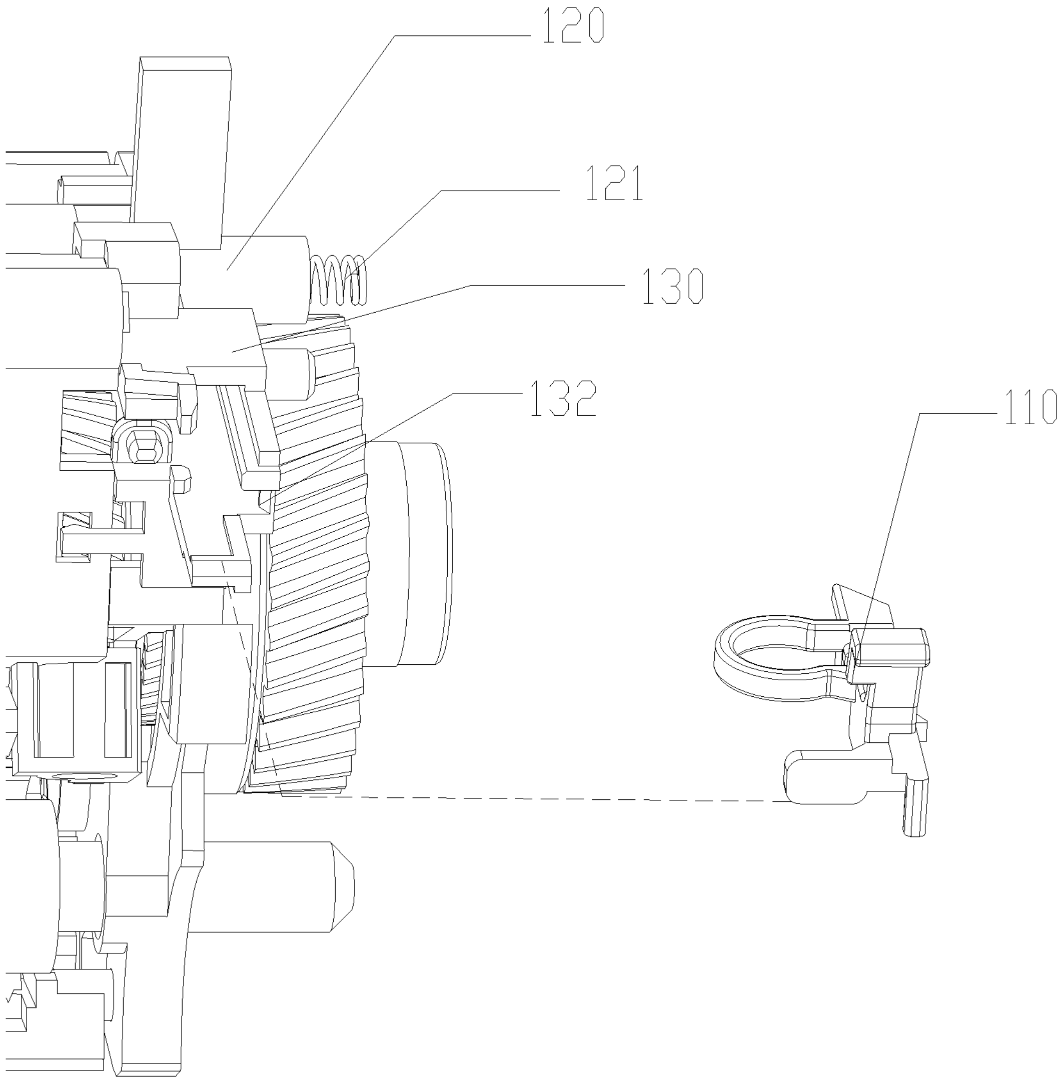
FIG. 27 illustrates another exploded view of a processing cartridge in exemplary embodiment five.

FIG. 27 is an exploded view, which may mainly illustrate how the second force receiving element H110 is fixed on the support frame H130. Through the engagement of the trench H132 and the second force receiving element H110, the second force receiving element H110 may only translate along the length direction of the processing cartridge.

Figure 28:
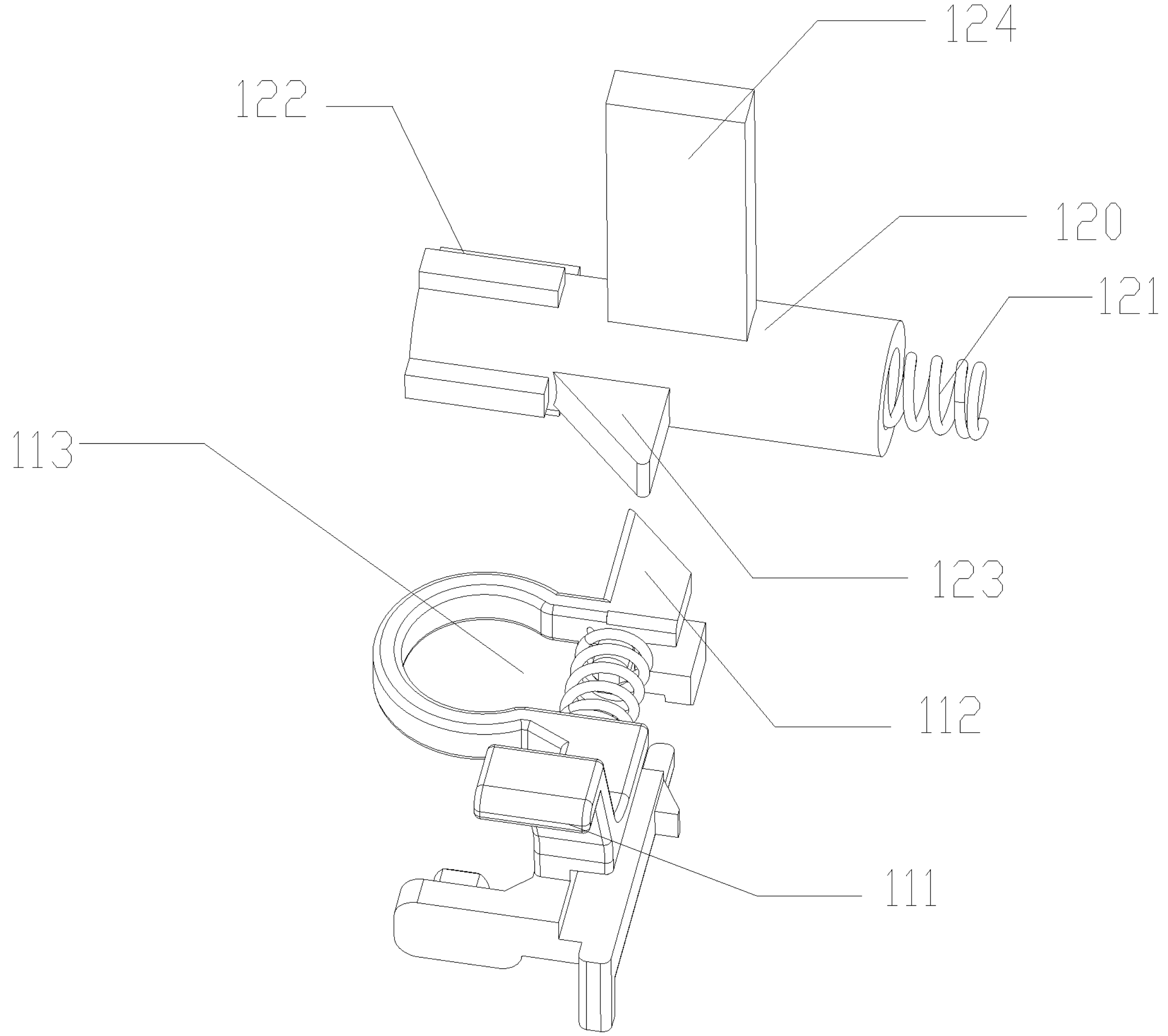
FIG. 28 illustrates a schematic of a main working principle of a force receiving device of a processing cartridge in exemplary embodiment five.
Figure 29:
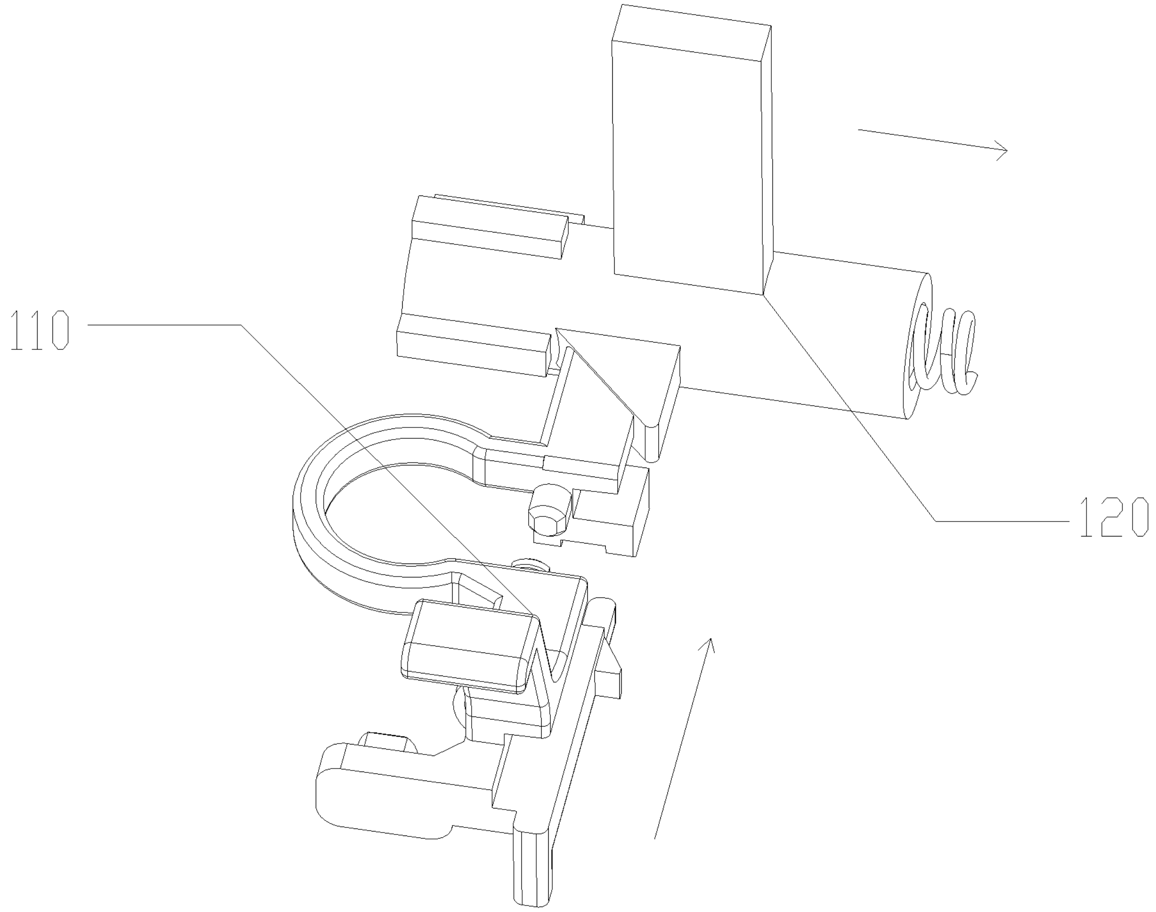
FIG. 29 illustrates another schematic of a main working principle of a force receiving device of a processing cartridge in exemplary embodiment five.

FIGS. 28-29 illustrate schematics of the main working principle of the force receiving device of the processing cartridge. Optionally, the second force receiving element H110 may include a pushing block H112 which is a right triangle. The closer the right triangle to the front of the installation direction of the processing cartridge is, the narrower the width of the right triangle is. The hypotenuse of the pushing block H112 may face the position which is adjacent to the right end of the processing cartridge. The first force receiving element H120 may include a receiving block H123 which is a right triangle. The closer the right triangle to the front of the installation direction of the processing cartridge is, the wider the width of the right triangle is. The hypotenuse of the receiving block H123 may face the position which is adjacent to the left end of the processing cartridge. When the processing cartridge is not installed in the electronic image forming device, or when the processing cartridge is being installed in the electronic image forming device, the pushing block H112 may not push the receiving block H123, as shown in FIG. 28. When the processing cartridge has been installed in the electronic image forming device and after the door cover has been closed, the first force applying device 920 of the electronic image forming device may push a second force receiving element H111 at the second force receiving element H110, such that the entire second force receiving element H110 may translate along the installation direction of the processing cartridge and the hypotenuse of the pushing block H112 may be engaged with the hypotenuse of the receiving block H123, thereby pushing the first force receiving element H120 to move to the right end of the processing cartridge, as shown in FIG. 29. Finally, a first force receiving element H124 of the first force receiving element H120 may be in the position which may be pushed by the second force applying device 930 in the electronic image forming device. When the processing cartridge is used up and removed from the electronic image forming device, the second force receiving element H110 may not be pushed by a first pushing element after the door cover of the electronic image forming device is opened. Therefore, the elastic element H121 may push the first force receiving element H120 to move along the direction away from the right end of the processing cartridge, and also oppositely push the second force receiving element H110 to move toward the opposite direction of the installation direction of the processing cartridge through the abutting between hypotenuses of the receiving block H123 and the pushing block H112, thereby resetting to the state shown in FIG. 28. Optionally, a buffering element H113 may be also disposed at the second force receiving element H110 to prevent jamming during the operating process. Optionally, the buffering element H113 may be a U-shaped structure, and a spring may be disposed at the U-shaped structure to ensure certain space in the process of making the second force receiving element H110 to be pushed and translated under the action of the force.

Obviously, performing the pushing using the hypotenuse may only be a preferred solution in one embodiment, and there are a variety of other manners in the mechanical field of the existing technology, such as using hydraulic control or other various control manners, which may not be described in detail herein.

Figure 30:
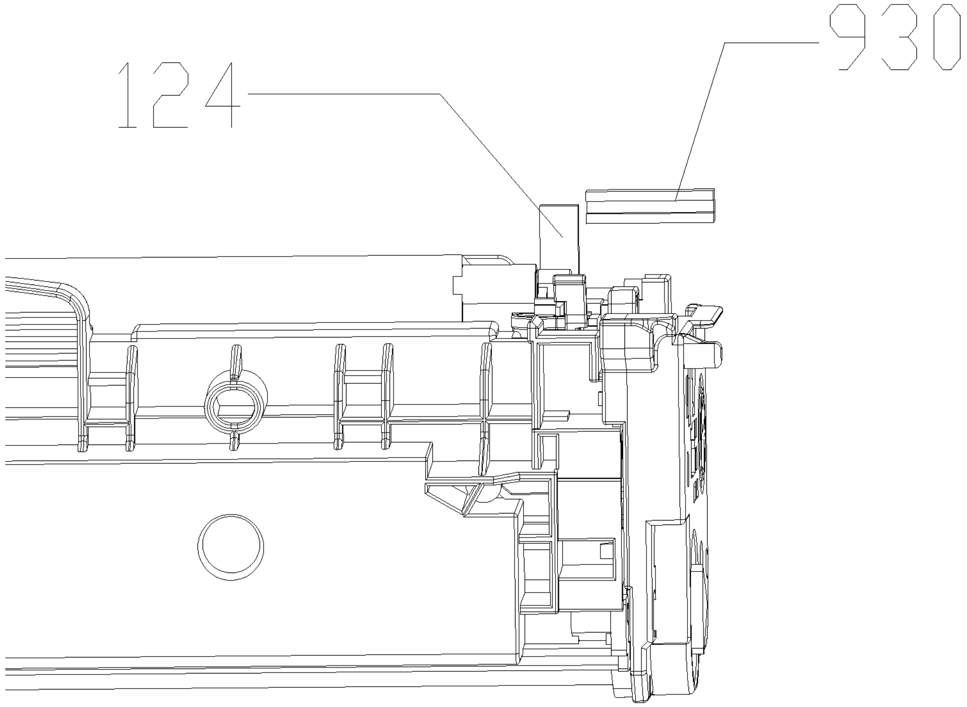
FIG. 30 illustrates a stereoscopic view of a processing cartridge as viewed along a processing cartridge installation direction in exemplary embodiment five.
Figure 31:
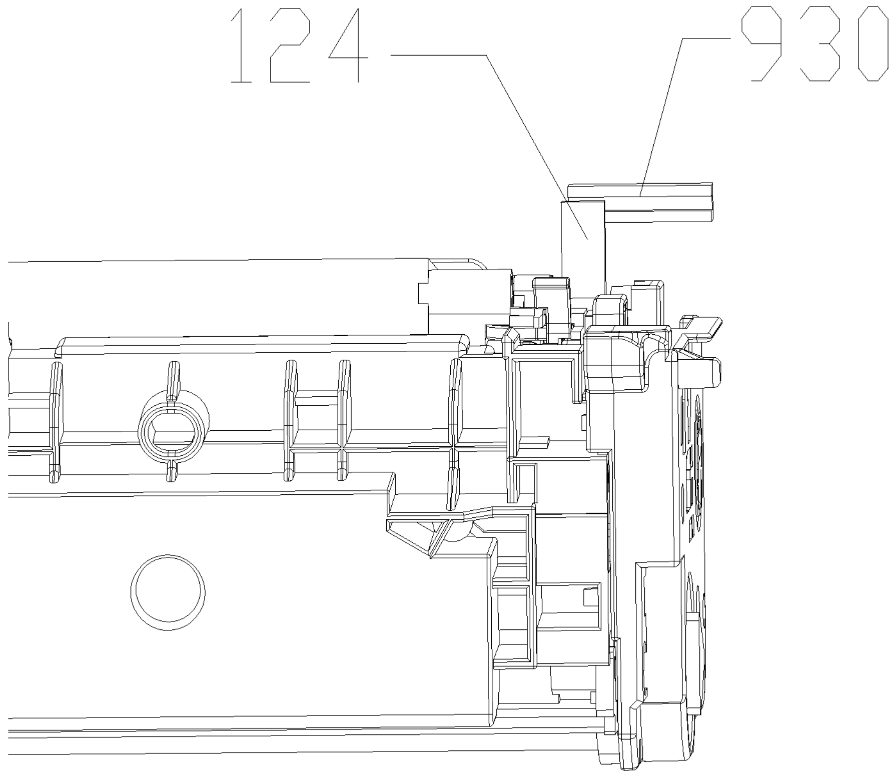
FIG. 31 illustrates another stereoscopic view of a processing cartridge as viewed along a processing cartridge installation direction in exemplary embodiment five.

FIGS. 30-31 illustrates stereoscopic views of the processing cartridge as viewed along the processing cartridge installation direction. FIG. 30 corresponds to the state in FIG. 28, and in the process of installing the processing cartridge in the electronic image forming device, the interference between the first force receiving element H124 and the second force receiving element 930 may be effectively avoided and the interference collision during the installation process of the processing cartridge may be prevented. FIG. 31 corresponds to the state in FIG. 29, and at this point, the processing cartridge has been installed and the door cover of the electronic image forming device has been closed. If the roller drum separation is performed, the second force applying device 930 may push the first force receiving element H124 to move along the opposite direction of the installation direction of the processing cartridge, that is, the roller and the drum may be separated according to the leverage principle.

Exemplary Embodiment Six

After the processing cartridge is installed in the electronic image forming device, the electronic image forming device may inspect the toner cartridge first. During such process, the second force applying device 930 may move a certain distance along the installation direction of the processing cartridge. After the inspection is completed, if the processing cartridge is required to perform the roller drum separation operation, the second force applying device 930 may move along the direction opposite to the installation direction of the processing cartridge and also push the processing cartridge to perform the roller drum separation. A processing cartridge is provided in one embodiment, and the undescribed portions may be the same as the processing cartridge in exemplary embodiment five.

Figure 32:
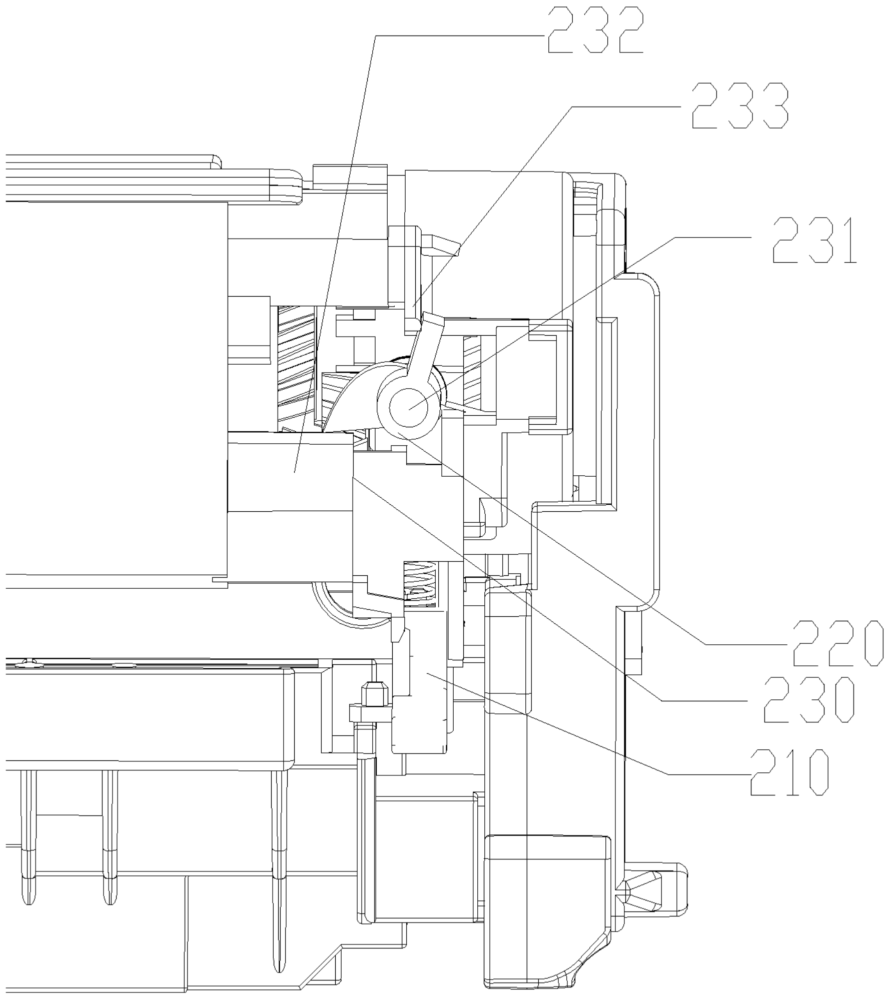
FIG. 32 illustrates a top view of a processing cartridge as viewed along a plane parallel with a processing cartridge installation direction in exemplary embodiment six.

FIG. 32 illustrates a top view of the processing cartridge as viewed along the plane in parallel with the installation direction of the processing cartridge. The processing cartridge in one embodiment may include a second force receiving element K210 which may be similar to the second force receiving element H110 in exemplary embodiment five and only be translated along the installation direction and the opposite direction of the installation direction of the processing cartridge. The processing cartridge may further include a first force receiving element K220. In one embodiment, viewed from the top of the processing cartridge (a plane in parallel with both the length direction of the processing cartridge and the installation direction of the processing cartridge, that is, the viewing angle in FIG. 32), the first force receiving element K220 may rotate clockwise or counterclockwise. For simplicity, the clockwise and/or counterclockwise description of the first force receiving element K220 in one embodiment may both use the viewing angle in FIG. 32 as the standard. The processing cartridge may further include a support frame K230. The support frame K230 may include a protruding support axle K231 which may support the rotation of the first force receiving element K220 and may further optionally include a first limiting block K232 and a second limiting block K233 which limit the movement range of the first force receiving element K220.

Figure 33:
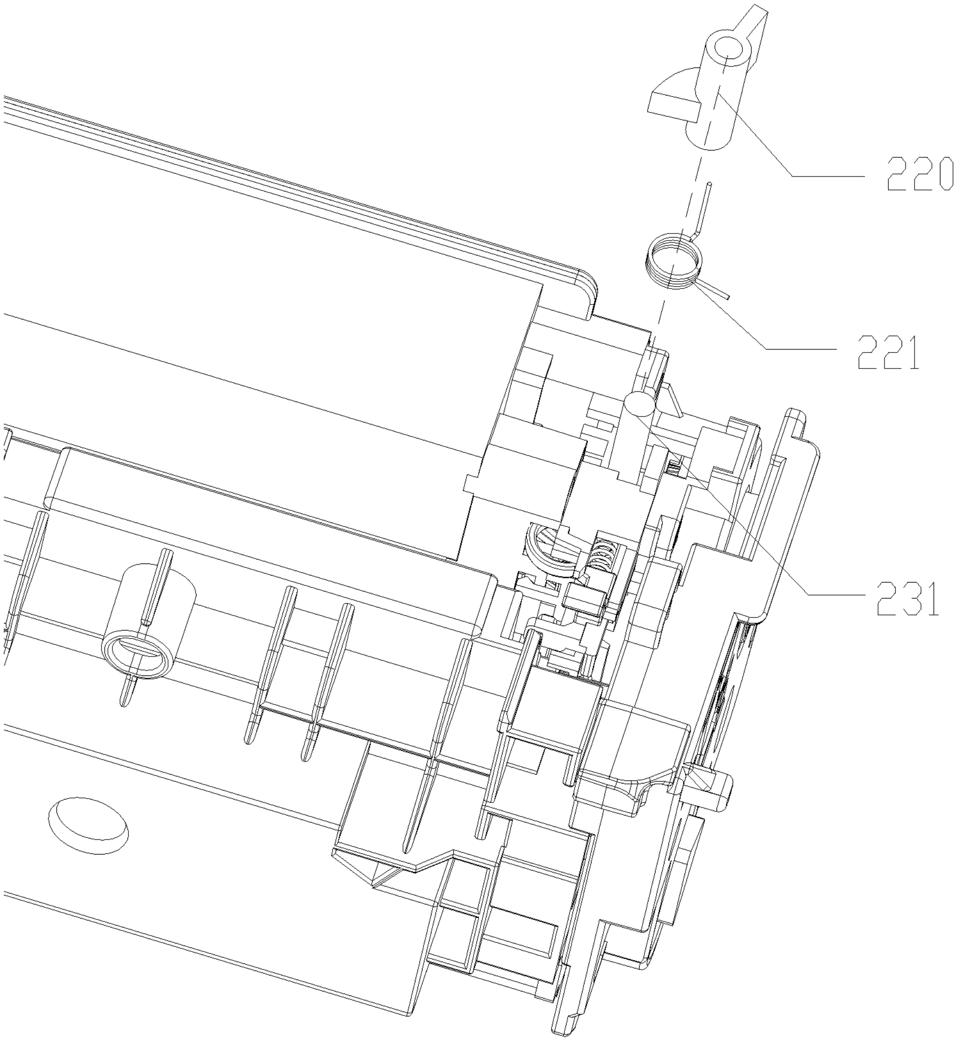
FIG. 33 illustrates an exploded view of a positional relationship between a first force receiving element and a support frame in FIG. 32.

FIG. 33 illustrates an exploded view of the positional relationship between the first force receiving element K220 and the support frame K230. An elastic element K221 may push the first force receiving element K220, such that the first force receiving element K220 may have a tendency to rotate counterclockwise. Optionally, the elastic element K221 may be a torsion spring, where one end of the elastic element K221 may be connected to the first force receiving element K220 and the other end may be connected to the processing cartridge main body or other element disposed at the processing cartridge. The torsion spring K221 and the first force receiving element K220 may both be sleeved on the support axle K231.

FIGS. 34-37 illustrate schematics of the working process of the force receiving device. Similar to the first embodiment, the second force receiving element K210 may include a second force receiving part K211 and a buffering element K213. A pushing block K212 may have a different shape from the pushing block H112 in exemplary embodiment five; however, both pushing blocks may be configured to push the first force receiving element K220. The first force receiving element K220 may include a receiving block K223 which may contact and be pushed by the pushing block K212, and may further include a ring K222 sleeved on the support axle K231 and a first force receiving part K224 which may be in contact with the second force applying device 930.

Figure 34:
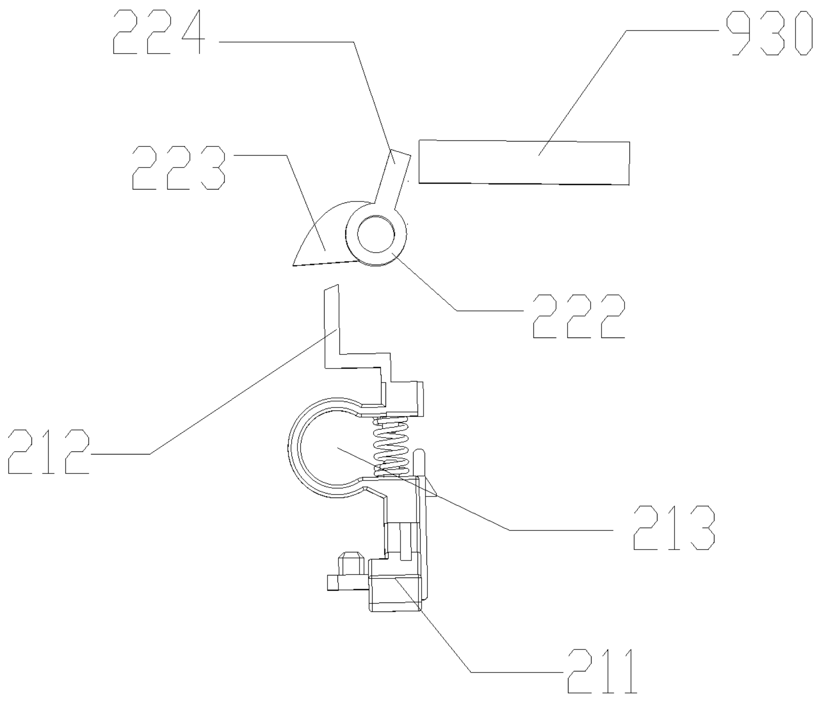
FIG. 34 illustrates a schematic of a working process of a force receiving device in exemplary embodiment six.

FIG. 34 illustrates component states when the processing cartridge is not installed in the electronic image forming device and also when the processing cartridge is installed in the electronic image forming device. At this point, the second force receiving element K210 may not be in contact with the first force receiving element K220, and the first force receiving element K220 may have a tendency to rotate counterclockwise due to the action of the elastic element K221. However, a first limiting block K232 is abutted against the receiving block K223 and a second limiting block K233 is abutted against the first force receiving part K224, such that the first force receiving element K220 may not continue rotating counterclockwise. During the installation process, the first force receiving part K224 may not be in contact with the second force applying device 930, thereby effectively avoiding the interference.

Figure 35:
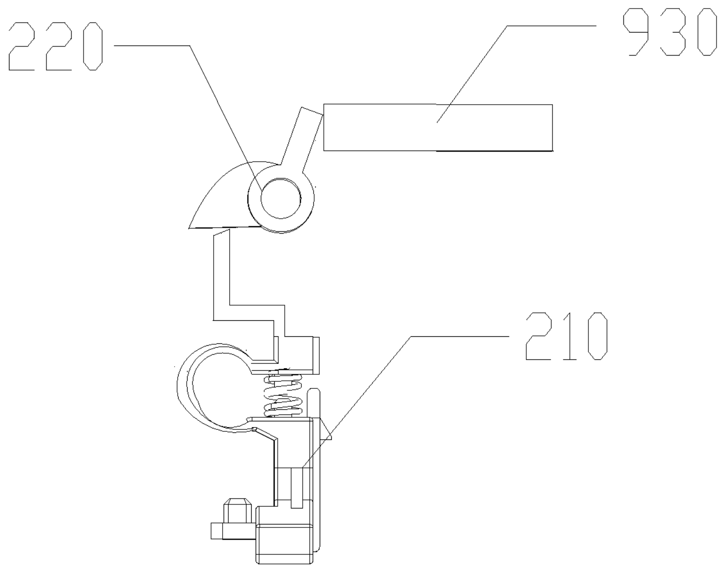
FIG. 35 illustrates another schematic of a working process of a force receiving device in exemplary embodiment six.

FIG. 35 illustrates component states after the door cover of the electronic image forming device is closed. At this point, the second force receiving element K210 may be pushed to translate along the installation direction of the processing cartridge, and also push the first force receiving element K220. However, the position of the second force applying device 930 prevents the first force receiving element K220 from rotating clockwise, such that the first force receiving element K220 may not be completed rotated. At this point, the buffering element K213 at the second force receiving element K210 may function to be deformed, and the spring in the buffering element K213 may be compressed, thereby smoothly closing the door cover of the electronic image forming device.

Figure 36:
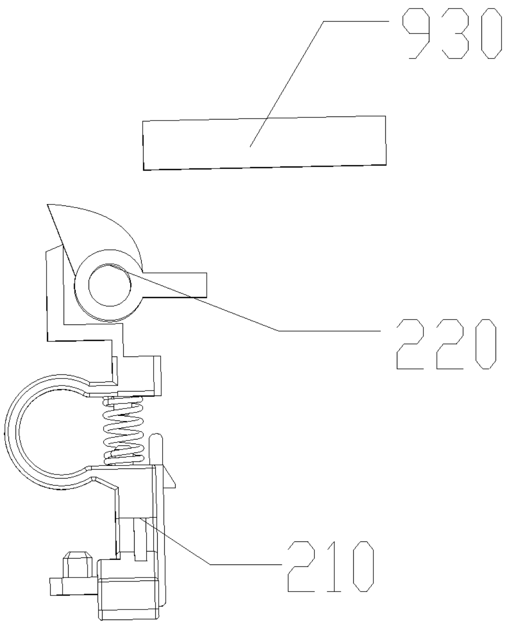
FIG. 36 illustrates another schematic of a working process of a force receiving device in exemplary embodiment six.
Figure 37:
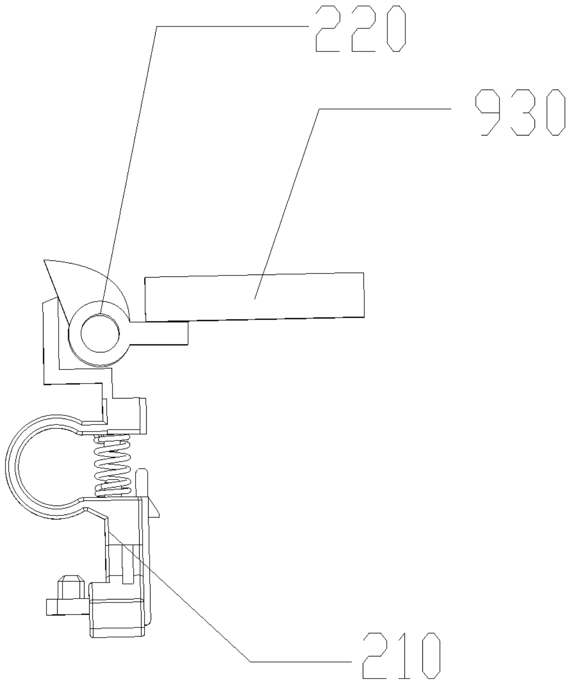
FIG. 37 illustrates another schematic of a working process of a force receiving device in exemplary embodiment six.

FIG. 36 illustrates components states when the inspection is performed by the electronic image forming device. At this point, the second force applying device 930 may move along the installation direction of the processing cartridge, thereby avoiding the position where the first force receiving element K220 rotates clockwise, which may enable the first force receiving element K220 to be rotated to the position in FIG. 36. Next, if the roller drum separation is required, the electronic image forming device may control the second force applying device 930 to move along the direction opposite to the installation direction of the processing cartridge, thereby pushing the first force receiving element K220 (the contacting position may be the first force receiving part K224) to separate the roller and the drum, as shown in FIG. 27.

Figure 38:
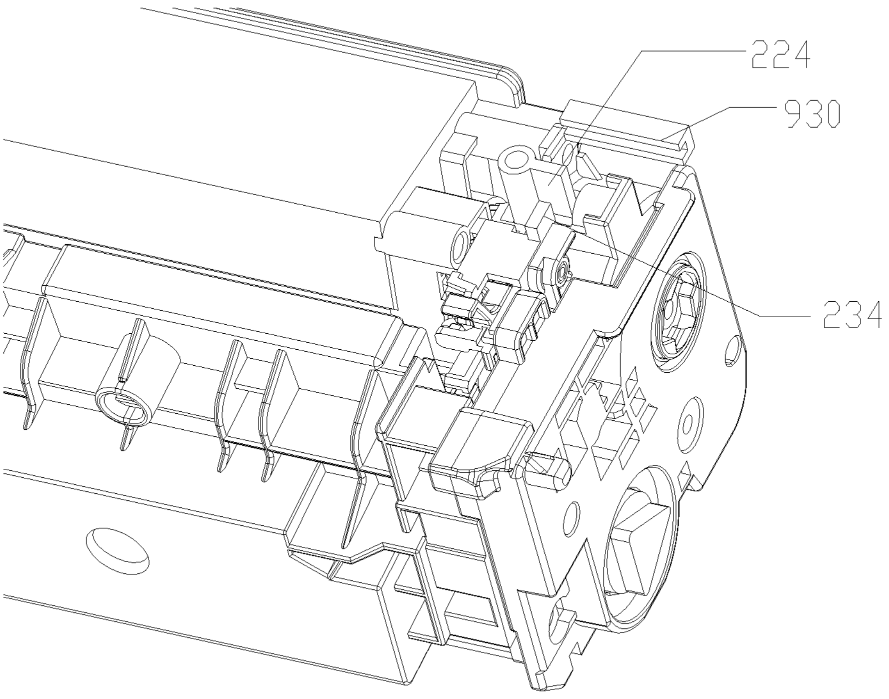
FIG. 38 illustrates a schematic of a positional relationship of a third limiting block and a first force receiving part in exemplary embodiment six.

Optionally, in order to make the position of the first force receiving element K220 as fixed as possible during the roller drum separation process and to reduce the incomplete separation of the roller and the drum caused by the insufficient space, a third limiting block K234 may further be disposed at the support frame K230. The third limiting block K234 may be configured to be abutted against the first force receiving part K224 (shown in FIG. 38) in the states shown in FIGS. 36-37 (e.g., the second force receiving element K210 may push the first force receiving element K220 to an extreme position), such that the applied force during the roller drum separation may be stabilized.

Exemplary Embodiment Seven

A modification may be made based on exemplary embodiment six, that is, the first force receiving element K220 may be rotated counterclockwise. When the processing cartridge is not installed, the first force receiving part K224 may not point toward the front of the installation direction of the processing cartridge in the second embodiment, but toward the rear of the installation direction of the processing cartridge; the pushing block K212 and the receiving block K223 may both be disposed at the left side of the ring K222; and the position of the torsion spring of the elastic element K221 may be adjusted accordingly. That is, the mirror flip may be implemented to enable the first force receiving element K220 to rotate counterclockwise during the installation process.

Optionally, in order to dispose the limiting element of the third limiting block K234 in exemplary embodiment six which may help stabilize the position during the roller drum separation process, a block translated along the length direction of the processing cartridge in the first embodiment may be combined to be abutted against the first force receiving part K224 from the rear of the installation direction; or the third limiting block K234 may be disposed which is retractable relative to the main body of the processing cartridge. Both the translational and retractable blocks may be pushed by the second force receiving element K210 during the movement process to be compressed, extended or translated.

Exemplary Embodiment Eight

A further modification may be made based on exemplary embodiment six according to the actual situation of trial production.

Figure 39:
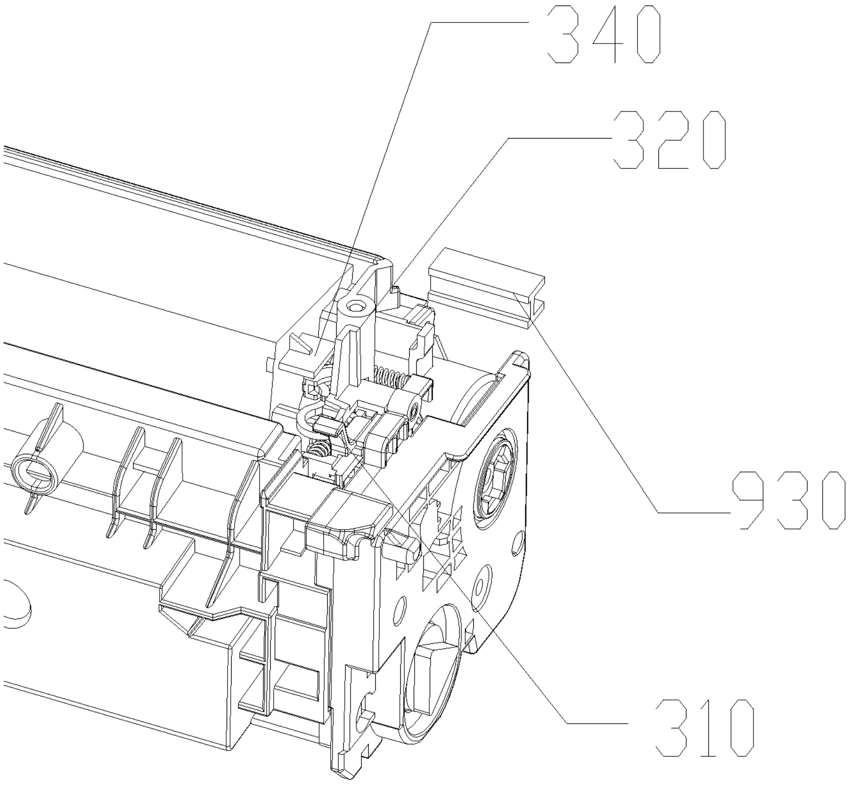
FIG. 39 illustrates a structural schematic of a processing cartridge in exemplary embodiment eight.

FIG. 39 illustrates a structural schematic of the processing cartridge in one embodiment, where only the right portion used for the roller drum separation structure is shown. Similar to exemplary embodiment six, the processing cartridge in one embodiment may include a second force receiving element 310 and a first force receiving element 320 on which the second force applying device 930 acts. A detachment preventing element 340 may be included in one embodiment, and at least a portion of the projection of the detachment preventing element 340 along the length direction of the processing cartridge may coincide with the first force receiving element 320. The detachment preventing element 340 may be configured to prevent the first force receiving element 320 from detaching during the rotation process. Optionally, the detachment preventing element 340 may be at the first housing 1101 and protrude from the first housing 1101 along the direction away from the processing cartridge.

Figure 40:
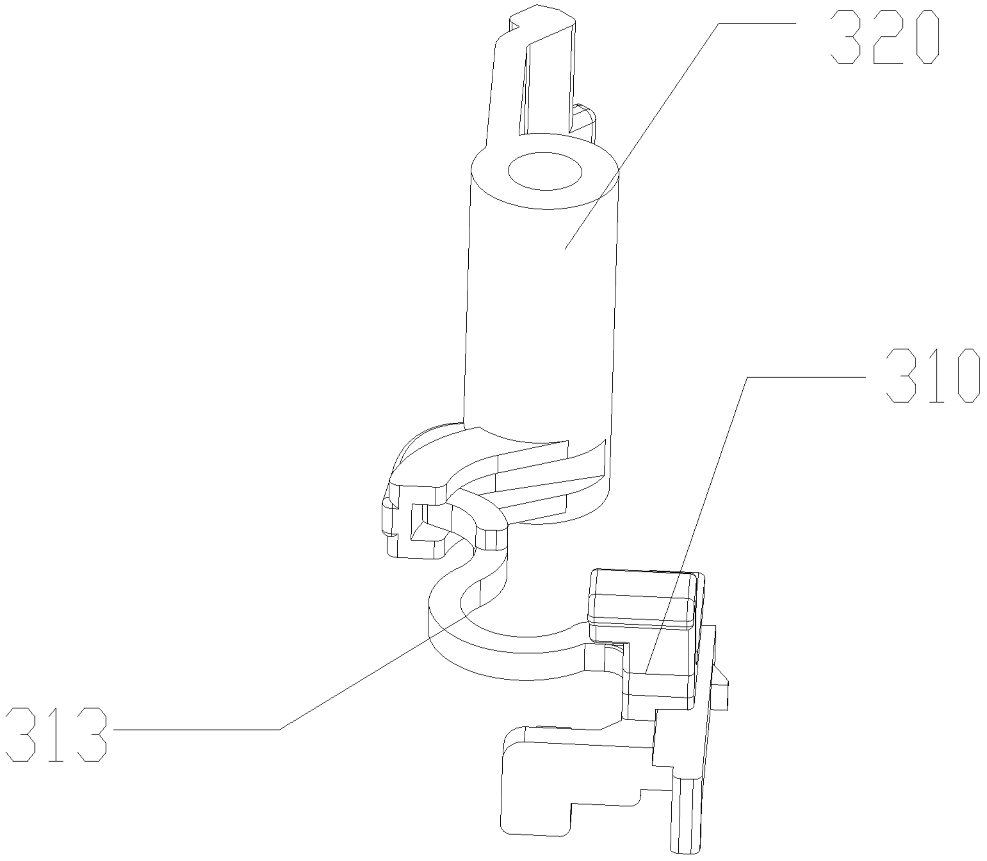
FIG. 40 illustrates a structural schematic of a first force receiving element and a second force receiving element in exemplary embodiment eight.

FIG. 40 illustrates a structural schematic of the first force receiving element and the second force receiving element in one embodiment. As shown in FIG. 40, a new buffering element 313 may be provided in one embodiment. The buffering element 313 may have similar effect of the buffering element 213, except that the shape is slightly changed from an original 'C" type to an "S" type. Such design may enable the buffering element 313 to withstand a larger amount of deformation, thereby enabling the elements to be more stable during operation.

Finally, it should be noted that the above-mentioned embodiments may be merely used to describe the technical solution of the present disclosure, rather than limiting the present disclosure. Although the present disclosure has been described in detail with reference to the above-mentioned embodiments, those skilled in the art should understand that the technical solutions described in the above-mentioned embodiments may still be modified, or certain or all of the technical features may be equivalently replaced. Such modifications or replacements do not make the essence of the corresponding technical solutions outside the scope of the technical solutions of various embodiments of the present disclosure.

Exemplary Embodiment Nine

Figure 41:
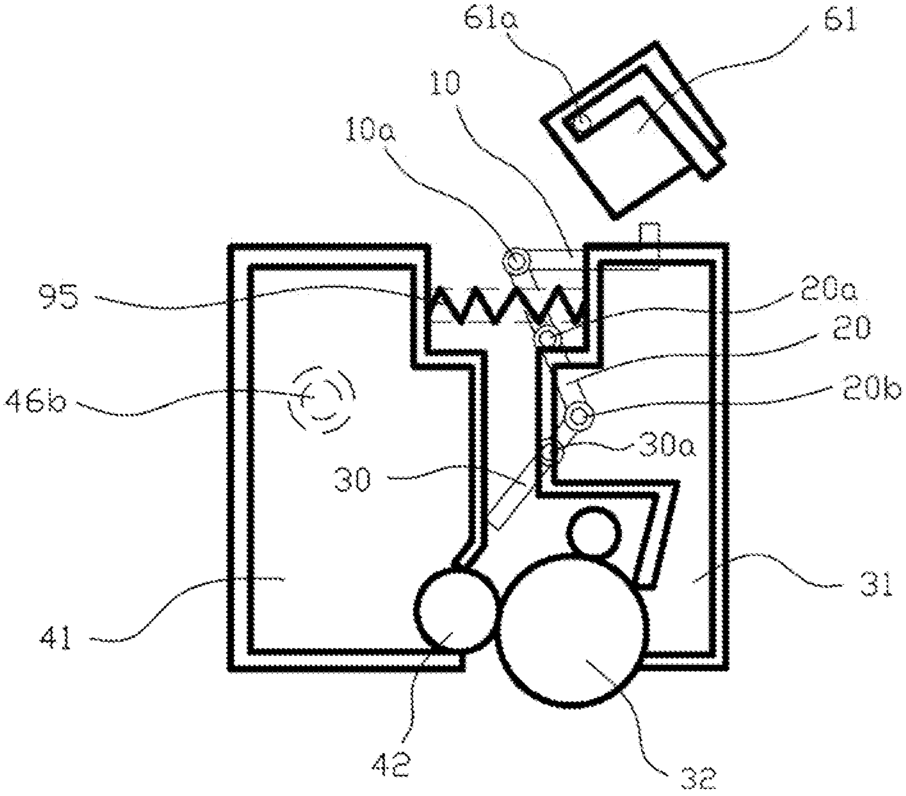
FIG. 41 illustrates a schematic of a processing cartridge when a developing element is in contact with a photosensitive element in exemplary embodiment nine.

Referring to FIG. 41, a developing unit 41 and a photosensitive unit 31 may be disposed on a processing cartridge. The developing unit 41 may be disposed with a developing element 42, and the photosensitive unit 31 may be disposed with a photosensitive element 32. The developing unit 41 may be close to or away from the photosensitive unit 31, such that the developing element 42 may be in contact or not be in contact with (i.e., separation) the photosensitive element 32. As shown in FIG. 41, the developing unit 41 may rotate around a rotating axle 46*b* to achieve the contact or non-contact (i.e., separation) between the developing element 42 and the photosensitive element 32. An elastic element 95 may also be disposed between the developing unit 41 and the photosensitive unit 31. The elastic element 95 may provide an elastic force for the developing unit 41 and the photosensitive unit 31, such that the developing unit 41 may rotate around the rotating axle 46*b*, and the developing element 42 may move close to be in contact with the photosensitive element 32. As shown in FIG. 41, an electronic image-forming device (i.e., a printer, a copier, a fax machine and the like) may be disposed with a force applying element 61; and the force applying element 61 may rotate around its own rotating axle 61*a*.

A control unit may also be disposed on the processing cartridge, and the control unit may include a pushing rod 10, a rotating rod 20, and an ejection rod 30. The pushing rod 10 and the rotating rod 20 may be connected with each other by a hinge 10*a*; the rotating rod 20 may rotate around a rotating axle 20*a*; one end of the ejection rod 30 may be connected to the rotating rod 20 by a hinge 20*b*; the ejection rod 30 may rotate around a rotating axle 30*a*, and the other end of the ejection rod 30 may be abutted against the developing unit 41. The position of the developing unit 41 being abutted against the ejection rod 30 may be located on the other side of the rotating axle 46*b* with respect to the pushing rod 10. The farther the position of the developing unit 41 being abutted against the ejection rod 30 is away from the rotating axle 46*b*, the smaller the force required to separate the developing unit 41 is. The control unit (the pushing rod 10, the rotating rod 20, and the ejection rod 30) may all be disposed on the photosensitive unit 31.

As shown in FIG. 41, when the force applying element 61 on the electronic image-forming device is not in contact with the pushing rod 10 to apply a force to the pushing rod 10, the elastic element 95 may rotate the developing unit 41 around the rotating axle 61*a*, such that the developing unit 41 may move close to the photosensitive unit 31. Therefore, the developing unit 41 may be in contact with the photosensitive unit 31.

Figure 2:
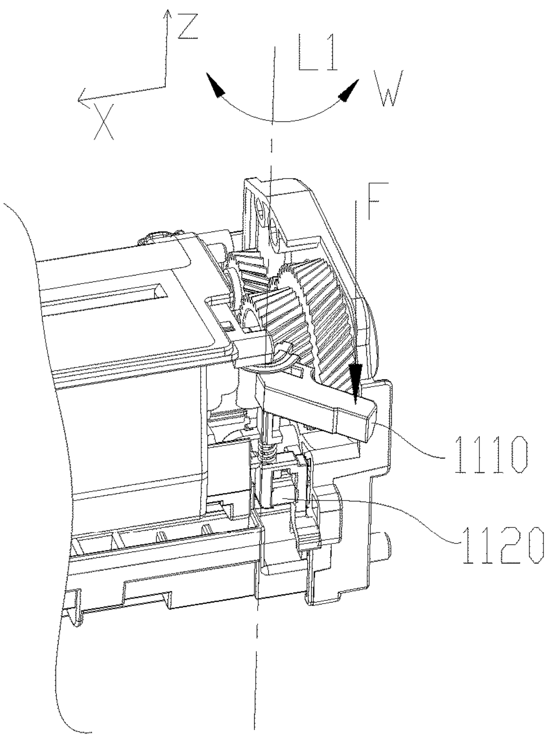
FIG. 2 illustrates a partial structural view of FIG. 1.
Figure 42:
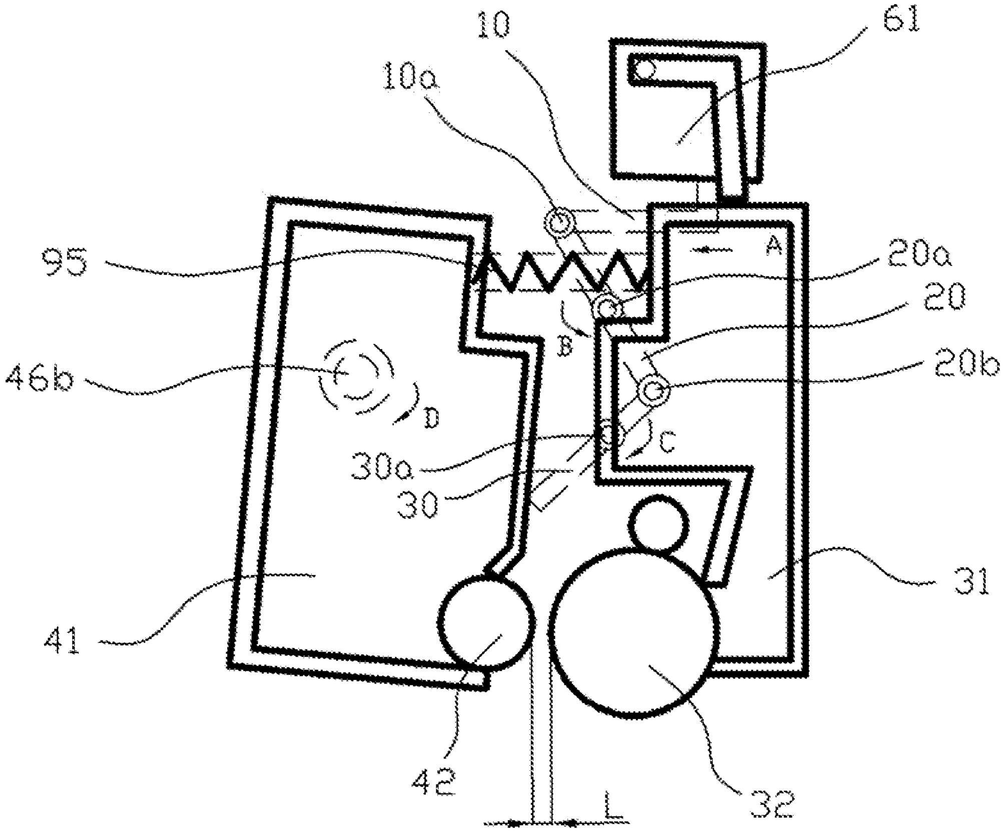
FIG. 42 illustrates a schematic of a processing cartridge when a developing element is separated from a photosensitive element in exemplary embodiment nine.

As shown in FIG. 42, when the force applying element 61 on the electronic image-forming device is abutted against the pushing rod 10 to apply a force to the pushing rod 10, the pushing rod 10 may move along a direction A in FIG. 2, thereby driving the rotating rod 20 to rotate around the rotating axle 20*a* along a direction B in FIG. 2; then the ejection rod 30 may rotate around the rotating axle 30*a* along a direction C shown in FIG. 2 under the action of the rotating rod 20, and finally the ejection rod 30 may push the developing unit 41 to rotate around the rotating axle 61*a*. The rotation of the developing unit 41 may make the developing element 42 to move along a direction away from the photosensitive element 32, and finally the developing element 42 may not be in contact with the photosensitive element 32 (separation) and a distance L may also be formed.

By disposing the control unit on the photosensitive unit 31, the driving force of the force applying element 61 located above the photosensitive element 32 may be converted into the rotational force of the developing unit 41, thereby implementing the separation of the developing element 42 and the photosensitive element 32.

When the force applying element 61 is not abutted against the pushing rod 10 to provide force after rotating around the rotating axle 61*a* (that is, the force applying element 61 rotates from the position shown in FIG. 42 to the position shown in FIG. 41), the developing unit 41 may rotate around the rotating axle 46*b* under the action of the elastic element 95 and be restored to the state shown in FIG. 41; the ejection rod 30 may be pushed by the developing unit 41 to rotate around the rotating axle 30*a* (rotate along the direction opposite to the direction indicated by an arrow C in FIG. 42), and drive the rotating rod 20 to rotate around the rotating axle 20*a* (rotate along the direction opposite to the direction indicated by an arrow B in FIG. 42); finally, the pushing rod 10 may move along the direction opposite to an arrow A in FIG. 42, and finally the developing unit 41 and the control unit may be restored to the state shown in FIG. 41.

Exemplary Embodiment Ten

In addition to using the solution shown in exemplary embodiment nine, the control unit may also adopt the solution in one embodiment. Therefore, the structural features and working manners in one embodiment same as those in exemplary embodiment nine may not be described in detail herein.

Figure 43:
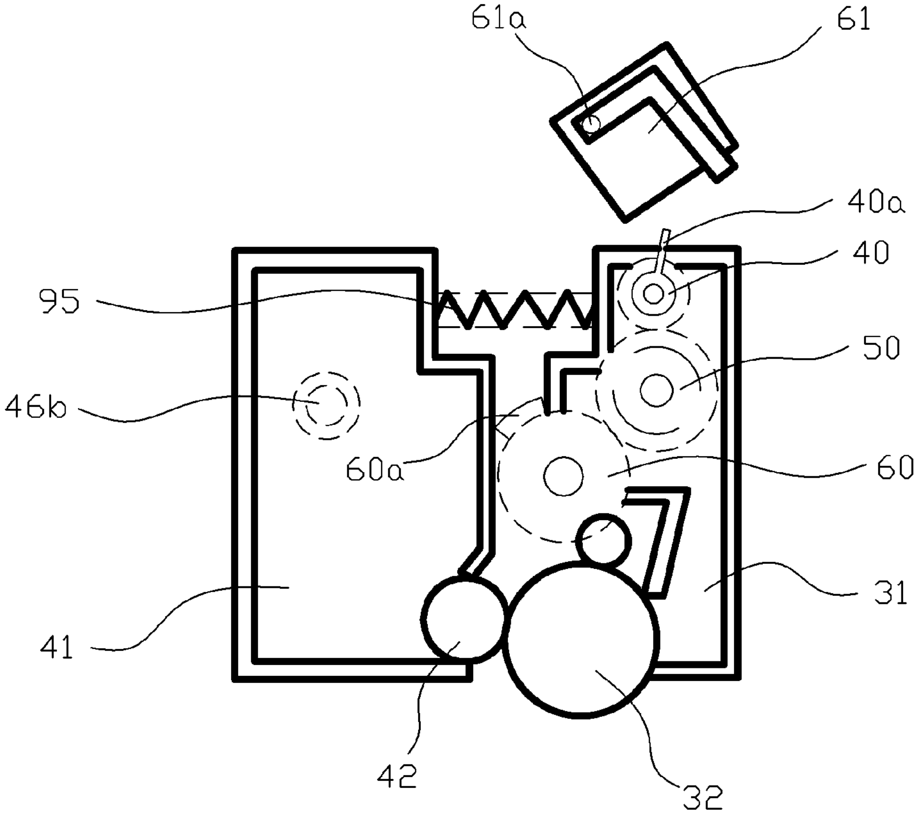
FIG. 43 illustrates a schematic of a processing cartridge when a developing element is in contact with a photosensitive element in exemplary embodiment ten.

As shown in FIG. 43, the control unit may include a first gear element 40, a second gear element 50, and a third gear element 60; the first gear element 40, the second gear element 50, and the third gear element 60 may all be disposed with gears; the first gear element 40, the second gear element 50, and the third gear element 60 may all be disposed on the photosensitive unit 31; the first gear element 40 may be disposed with a swing rod 40*a* which may control the rotation of the first gear element 40; the gear on the second gear element 50 may mesh with the gear on the first gear element 40 to transmit force; the gear on the third gear element 60 may mesh with the gear on the second gear element 50 to transmit force; and the third gear element 60 may be disposed with a cam portion 60 a which may rotate with the third gear element 60.

As shown in FIG. 43, when the force applying element 61 is not abutted against the swing rod 40*a*, the control unit may be in the state shown in FIG. 43, and a cam portion 60*a* may not be abutted against the developing unit 41 or may not provide the developing unit 41 with a force away from the photosensitive unit 31. At this point, the developing unit 41 may move close to the photosensitive unit 31 under the action of the elastic element 95, and the developing element 42 may be in contact with the photosensitive element 32.

Figure 44:
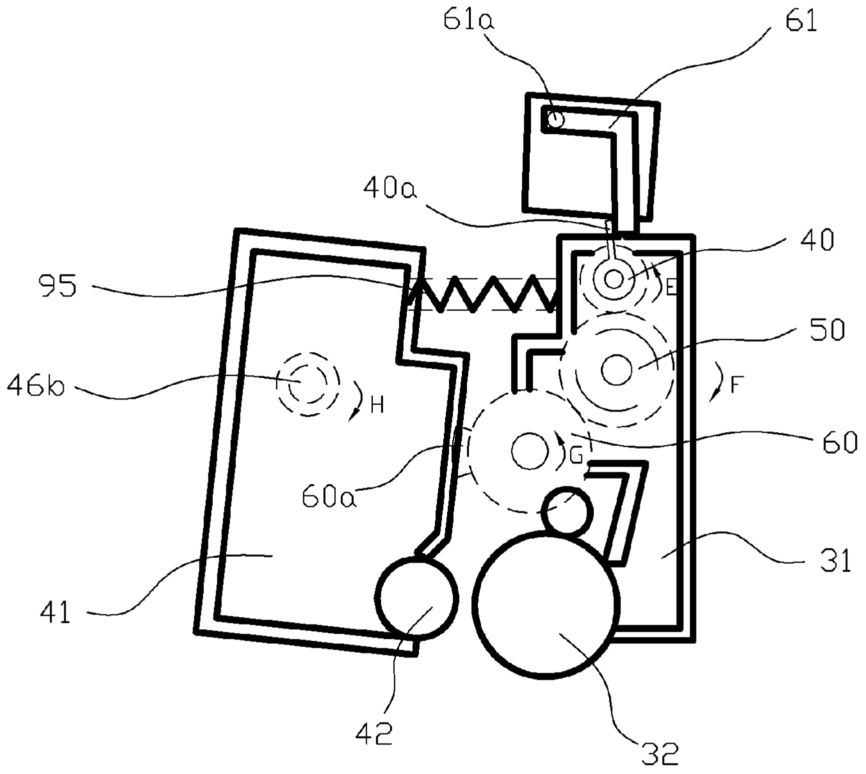
FIG. 44 illustrates a schematic of a processing cartridge when a developing element is separated from a photosensitive element in exemplary embodiment ten.

When the force applying element 61 rotates around the rotating axle 61*a* and is abutted against the swing rod 40*a*, the force applying element 61 may rotate the swing rod 40*a* from the state shown in FIG. 43 to the state shown in FIG. 44, and the first gear element 40 may be driven by the swing rod 40*a* to rotate along a direction E shown in FIG. 44; and the first gear element 40 may drive the second gear element 50 to rotate along a direction F in FIG. 44, and the third gear element 60 may be driven by the second gear element 50 to rotate along a direction G in FIG. 44. Since the cam portion 60*a* can rotate with the third gear element 60 together, the cam portion 60*a* may rotate to the position shown in FIG. 44 and provide the developing unit 41 with a force away from the photosensitive unit 31, such that the developing unit 41 may rotate around the rotating axle 46*b* to the state shown in FIG. 44. At this point, the developing unit 41 may be away from the photosensitive unit 31, and the developing element 42 may be not in contact with the photosensitive element 32 (i.e., separation). It can be seen from FIG. 44 that the position on the developing unit 41 being abutted against the cam portion 60*a* may be located on the other side of the rotating axle 46*b* relative to the swing rod 40*a*; and the force received at such position may make the developing unit 41 rotate around the rotating axle 46*b* along an H direction shown in FIG. 44.

When the force applying element 61 is rotated from the state shown in FIG. 44 to the state shown in FIG. 43, the force applying element 61 may no longer be abutted against the swing rod 40*a*; the developing unit 41 may move close to the photosensitive unit 31 under the action of the elastic element 95 and press the cam portion 60*a*, such that the cam portion 60*a* may rotate along the direction opposite to the G direction in FIG. 44 to the state shown in FIG. 43; at this point, the third gear element 60 may drive the first gear element 40 through the second gear element 50 and restore the swing rod 40*a* to the state shown in FIG. 43.

When the force applying element 61 is rotated from the state shown in FIG. 44 to the state shown in FIG. 43, in order to restore the control unit from the state shown in FIG. 44 to the state shown in FIG. 43, a torsion spring may also be disposed on the first gear element 40, the second gear element 50, or the third gear element 60 in one embodiment. The torsion spring may provide an elastic restoring force for the first gear element 40, the second gear element 50, or the third gear element 60, such that the first gear element 40, the second gear element 50 or the third gear element 60 may be restored from the state shown in FIG. 44 to the state shown in FIG. 43.

Exemplary Embodiment Eleven

The structures, connection relationships and working manners in one embodiment which are same as those in exemplary embodiment nine may not be repeated herein.

Figure 45:
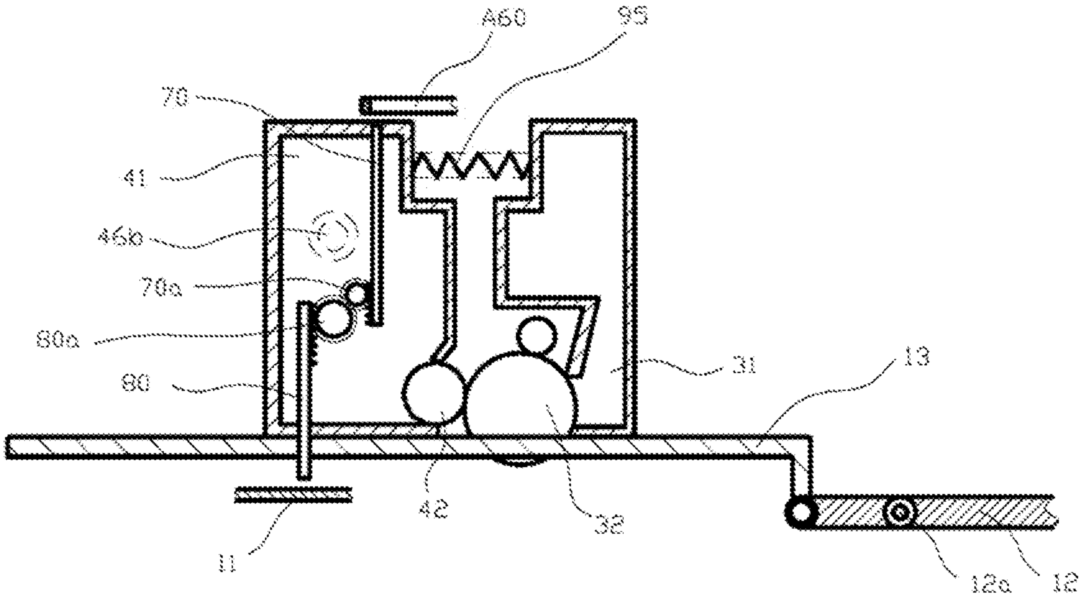
FIG. 45 illustrates a schematic of a processing cartridge when being installed in an image-forming device in exemplary embodiment eleven.

As shown in FIG. 45, a second force applying element A60, a door cover 12, a supporting element 13, and a bottom portion 11 may be disposed on the electronic image-forming device. The second force applying element A60 may be in a "hook" shape (e.g., an L-shape); the door cover 12 and the supporting element 13 may be connected by a hinge, and the door cover 12 may rotate around a rotating axle 12*a* on the electronic image-forming device; the processing cartridge may be supported by the supporting element 13 after being installed on the electronic image-forming device; the bottom portion 11 may be disposed under both the electronic image-forming device and the supporting element 13. As shown in FIG. 45, the control unit may include a first connecting rod 70, a first gear 70*a*, a second connecting rod 80, and a second gear 80*a*. The first connecting rod 70, the first gear 70*a*, the second connecting rod 80, and the second gear 80*a* may all be disposed on the developing unit 41 and located on the axial side of the developing element 42 on the processing cartridge. A rack may be disposed on each of the first connecting rod 70 and the second connecting rod 80; the rack on the first connecting rod 70 may mesh with the first gear 70*a*; and the rack on the second connecting rod 80 may mesh with the second gear 80*a*. The first gear 70*a* may mesh with the second gear 80*a*, and the diameter of the second gear 80*a* may be larger than the diameter of the first gear 70*a*. When the processing cartridge is installed on the electronic image-forming device, the second connecting rod 80 may be located below the first connecting rod 70, and at least a portion of the second connecting rod 80 may extend out of the developing unit 41.

As shown in FIG. 45, after the processing cartridge is installed on the electronic image-forming device, the processing cartridge may be supported by the supporting element 13, and the second connecting rod 80 may pass through the supporting element 13 and extend out downwardly. However, the first connecting rod 80 may not be abutted against the bottom portion 11 to receive the pushing force from the bottom portion 11. At this point, the first connecting rod 70 may not be in contact with the second force applying element A60 to receive the driving force from the second force applying element A60 (no overlapped portion along the horizontal direction). At this point, the developing element 42 and the photosensitive element 32 may be in contact with each other under the action of the elastic element 95.

Figure 6:
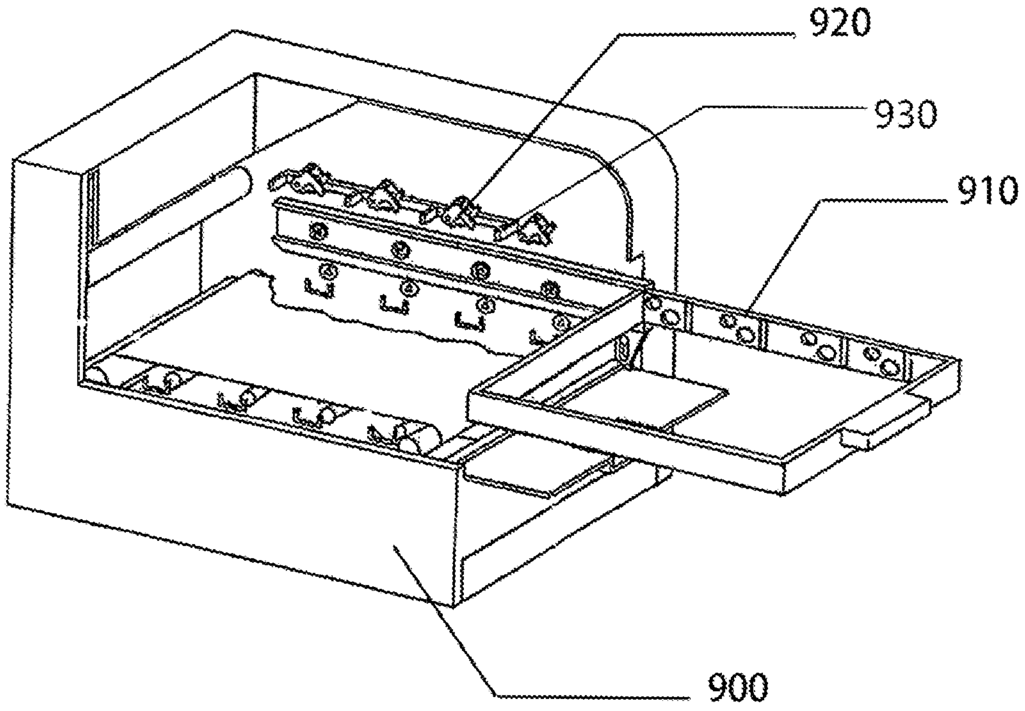
FIG. 6 illustrates a partial structural view of an electronic image forming device.
Figure 46:
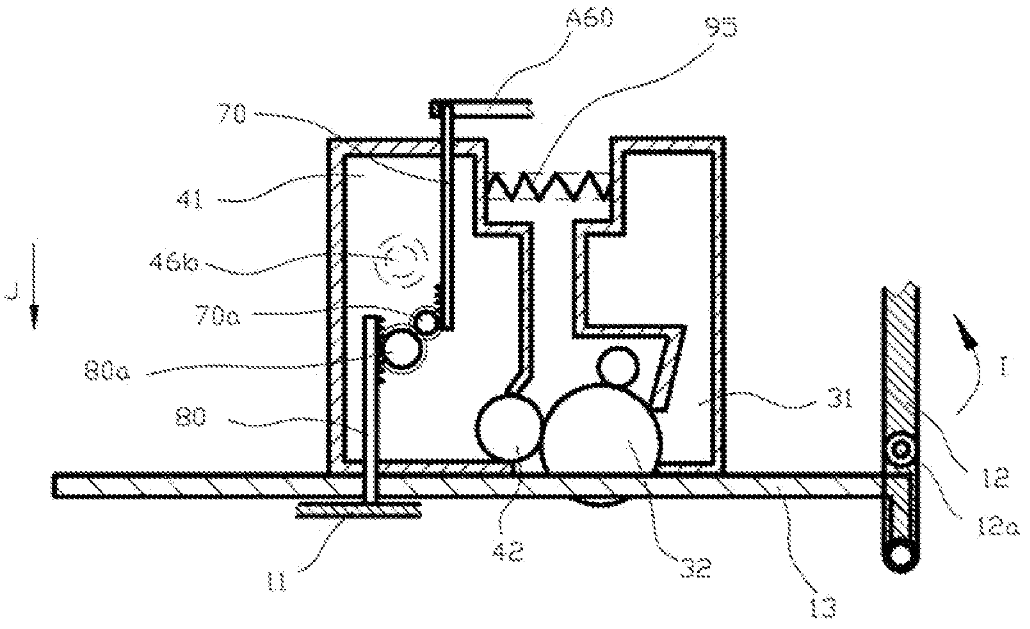
FIG. 46 illustrates a state where a door cover is closed after a processing cartridge is installed in an electronic image-forming device in exemplary embodiment eleven.

As shown in FIG. 46, when the door cover 12 is rotated along the direction of an arrow I in FIG. 6, since the door cover 12 rotates around the rotating axle 12*a*, the door cover 12 may drive the supporting element 13 to move downwardly along a direction J in FIG. 6 (move along the vertical direction) and may also drive the processing cartridge to move along the direction J. During the downward movement of the processing cartridge and the supporting element 13, the second connecting rod 80 may be abutted against the bottom portion 11, and the bottom portion 11 may push the second connecting rod 80 to move along a direction opposite to the direction J in FIG. 6, such that the second gear 80*a* and the first gear 70*a* may be driven to rotate successively, the first connecting rod 70 may be driven to move along the direction opposite to the direction J in FIG. 6, and finally the first connecting rod 70 may extend out of the developing unit 41. Furthermore, since the diameter of the second gear 80*a* is larger than the diameter of the first gear 70*a*, the distance that the first connecting rod 70 moves along the direction opposite to the direction J may be greater than the distance that the second connecting rod 80 moves along the direction opposite to the direction J, and the first connecting rod 70 may be abutted against the second force applying element A60 (having an overlapped portion along the horizontal direction) after extending out of the developing unit 41.

Figure 47:
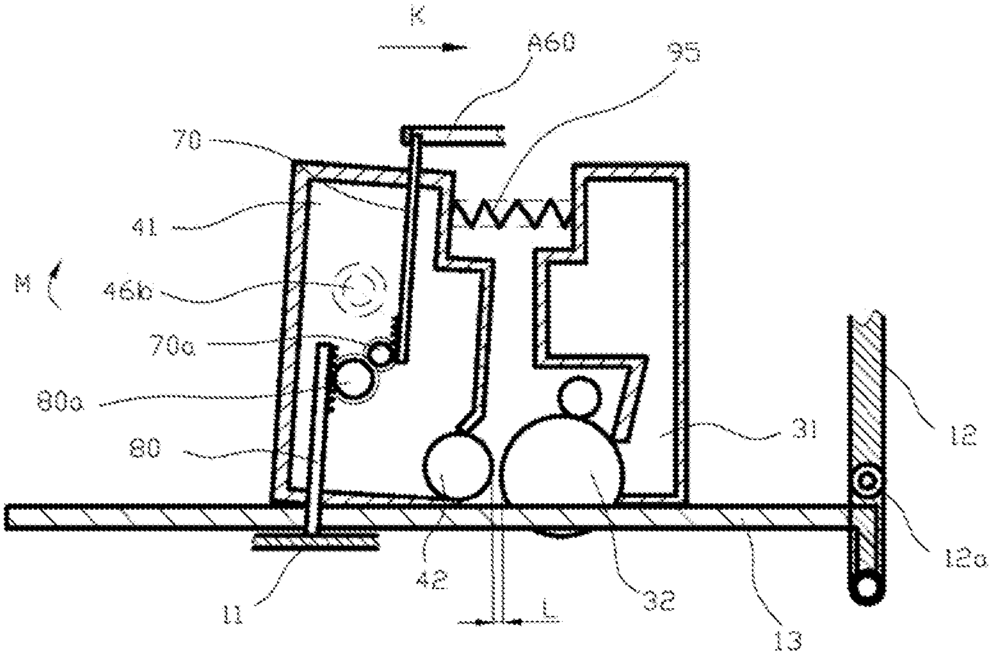
FIG. 47 illustrates a schematic of a processing cartridge when a developing element is separated from a photosensitive element in exemplary embodiment eleven.

As shown in FIG. 47, when the second force applying element A60 on the electronic image-forming device moves along a direction K shown in FIG. 7, the first connecting rod 70 may be driven by the second force applying element A60 to rotate the developing unit 41 around the rotating axle 46*b* along a direction M shown in FIG. 47, such that the developing element 42 may be separated from the photosensitive element 32 (a gap L formed shown in FIG. 47).

When the second force applying element A60 on the electronic image-forming device moves along the direction opposite to the direction K in FIG. 47, the second force applying element A60 may no longer provide a force to the first connecting rod 70, the developing unit 41 may rotate along the direction opposite to the direction M in FIG. 47 under the action of the elastic element 95, such that the developing element 42 may be in contact with the photosensitive element 32.

When the door cover 12 is opened (rotates along the opposite direction to the direction I in FIG. 46), the door cover 12 may rotate around the rotating axle 12*a* and drive the supporting element to move along the direction opposite to the direction J in FIG. 46, at this point, the second connecting rod 80 may be not in contact with the bottom portion 11; the second connecting rod 80 or the first connecting rod 70 may be under the action of a spring (or the first gear 70*a* or the second gear 80*a* may be under the action of a torsion spring), such that the second connecting rod 80 may move away from the inside of the developing unit 41 along the direction J in FIG. 46, the first connecting rod 70 may move close to the inside of the developing unit 41 along the direction J in FIG. 46, and finally the state in FIG. 45 may be restored. At this point, the processing cartridge may be removed from the supporting element 13.

Exemplary Embodiment Twelve

In one embodiment, the structures and connection relationships on the processing cartridge same as those in exemplary embodiment ten and the structures and connection relationships on the electronic image-forming device same as those in exemplary embodiment eleven may not be repeated herein.

Figure 48:
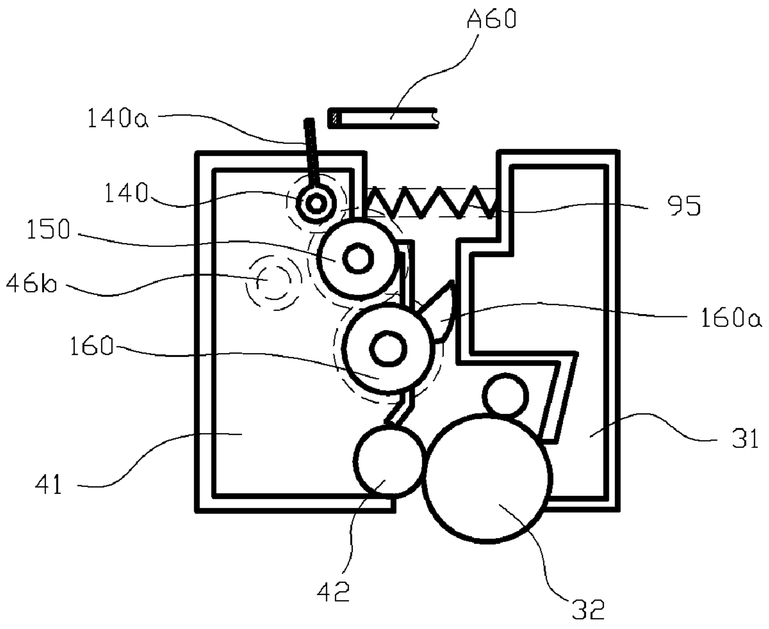
FIG. 48 illustrates a schematic of a processing cartridge when being installed in an image-forming device in exemplary embodiment twelve.

As shown in FIG. 48, after the processing cartridge is installed on the electronic image-forming device, the second force applying element A60 may be located above the developing unit 41 of the processing cartridge. The control unit may include a first gear element 140, a second gear element 150, and a third gear element 160 disposed in the developing unit 41 of the processing cartridge. The first gear element 140, the second gear element 150 and the third gear element 160 may all be disposed with gears. The first gear element 140 may be disposed with a swing rod 140*a* which can control the rotation of the first gear element 140. The gear on the second gear element 150 may mesh with the gear on the first gear element 140 to transmit force; and the gear on the third gear element 160 may mesh with the gear on the second gear element 150 to transmit force. The third gear element 160 may be disposed with a cam portion 160*a* which may follow the third gear element 160 to rotate with the third gear element 160 together.

Figure 49:
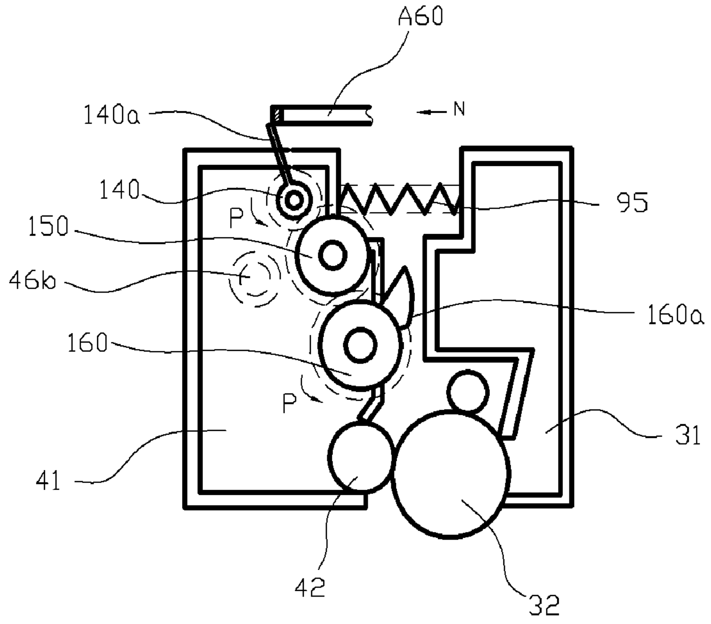
FIGS. 49-50 illustrate schematics of an interference process between a second force applying element and a first gear element in exemplary embodiment twelve.

As shown in FIG. 48, after the processing cartridge is installed on the electronic image-forming device, along the horizontal direction, the swing rod 140*a* may partially overlap the second force applying element A60; and the developing element 42 may be in contact with the photosensitive element 32 at this point. When the second force applying element A60 moves along a direction N shown in FIG. 49, the second force applying element A60 may be abutted against the swing rod 140, the swing rod 140*a* may drive the first gear element 140 to rotate around its axis along a direction P shown in FIG. 49, the second gear element 150 and the third gear element 160 may rotate successively, the cam portion 160*a* may be driven by the third gear element 160 to rotate along the direction of an arrow P in FIG. 49. At this point, the cam portion 160*a* may not be abutted against the photosensitive unit 31, such that the developing element 42 may still be in contact with the photosensitive element 32.

Figure 50:
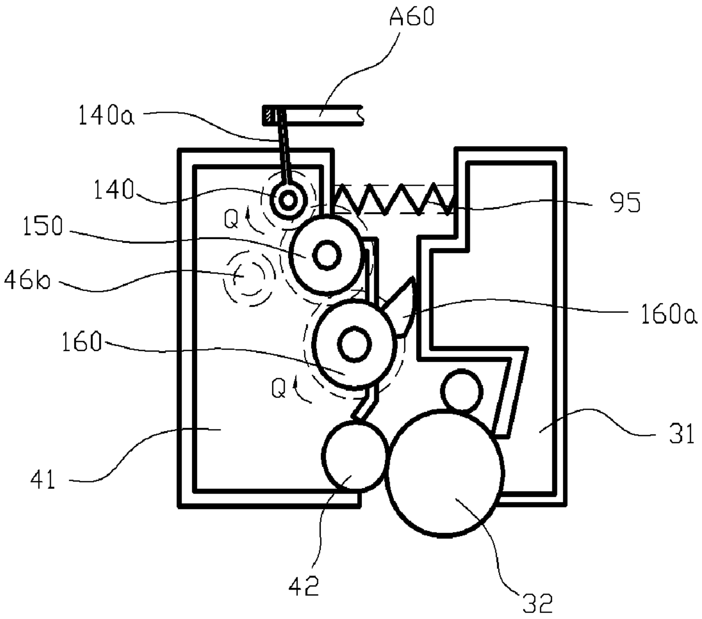

When the swing rod 140*a* rotates and passes a "hook" portion of the second force applying element A60, the second force applying element A60 may not provide a force to the swing rod 140*a*, the first gear element 140 may rotate along a direction Q to the position shown in FIG. 50 under the action of an elastic element (e.g., a torsion spring wound on the first gear element which is not shown in FIG. 10), and at this point, the second gear element 150 and the third gear element 160 may be also driven by the elastic element to rotate successively. At this point, the cam portion 160*a* may not be in contact with the photosensitive unit 31, and the developing element 42 may be in contact with the photosensitive element 32.

Figure 51:
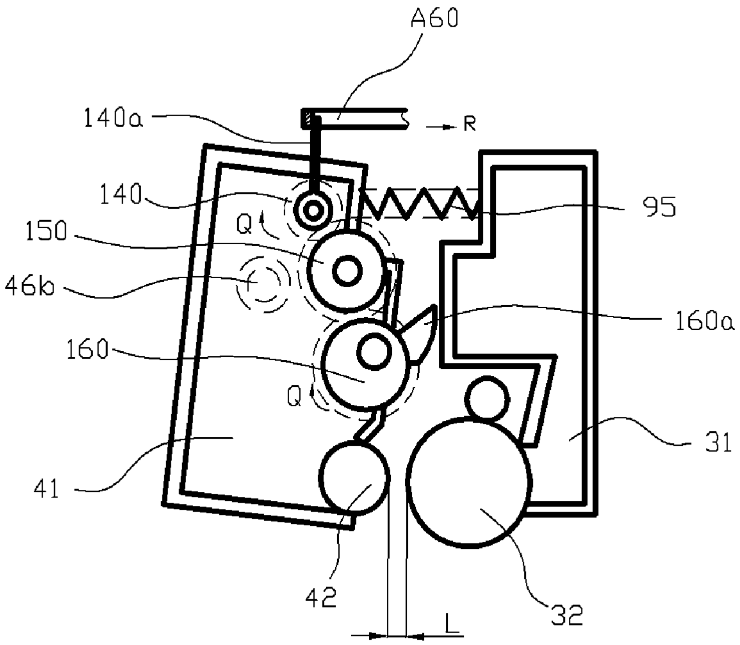
FIG. 51 illustrates a schematic of a processing cartridge when a developing element is separated from a photosensitive element in exemplary embodiment twelve.

When the second force applying element A60 moves along the direction of an arrow R shown in FIG. 51, the second force applying element A60 may drive the swing rod 140*a* to rotate along the direction Q shown in FIG. 51, the second gear element 150 and the third gear element 160 may rotate respectively, and the third gear element may rotate along the direction Q shown in FIG. 51. Therefore, the cam portion 160*a* may press the photosensitive unit 31 and make the developing unit 41 rotate around the rotating axle 46*b*, and the developing element 42 may be not in contact with the photosensitive element 32 (separation) at this point. When the second force applying element A60 continues to move along the direction R, the swing rod 140*a* may be separated from the second force applying element A60, and the developing unit 41 may be restored to the state shown in FIG. 48 under the action of the elastic element 95. At this point, the processing cartridge may be removed from the electronic image-forming device.

In one embodiment, one elastic element may also be disposed on the swing rod 140*a*. When the swing rod 140*a* is separated from the second force applying element A60, the swing rod 140*a* may also be restored to the state shown in FIG. 48 under the action of the one elastic element (e.g., a torsion spring wound on the first gear element which is not shown in FIG. 11).

The rotating axles of the first gear element 140, the second gear element 150 and the third gear element 160 may all be in parallel with the axial direction of the developing element 42.

Exemplary Embodiment Thirteen

In one embodiment, the structures and connection relationships on the processing cartridge same as those in exemplary embodiment nine and the structures and connection relationships on the electronic image-forming device same as those in exemplary embodiment twelve may not be repeated herein.

Figure 52:
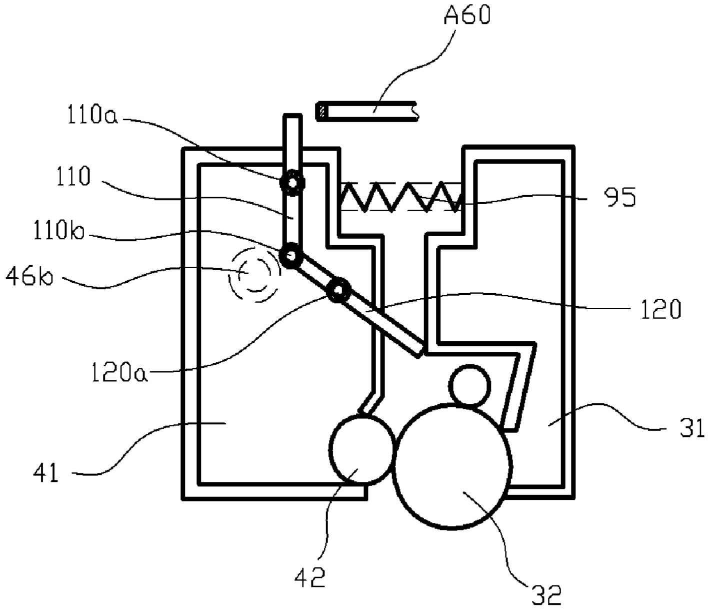
FIGS. 52-54 illustrate schematics of a position change relationship of an ejection rod during the movement of a second force applying element in exemplary embodiment thirteen.

As shown in FIG. 52, the developing unit 42 on the processing cartridge may be disposed with a pushing rod 110 and an ejection rod 120. The pushing rod 110 may be disposed with a rotating axle 110*a*, and the ejection rod 120 may be disposed with a rotating axle 120*a*, and the pushing rod 110 and the ejection rod 120 may be connected through a hinge 110*b*. The pushing rod 110 and the ejection rod 120 may both be disposed on the developing unit 41. One end of the ejection rod 120 may be connected with the pushing rod 110, and the other end of the ejection rod 120 may extend toward the photosensitive unit 31. The pushing rod 110 may extend out of the developing unit 41.

Figure 53:
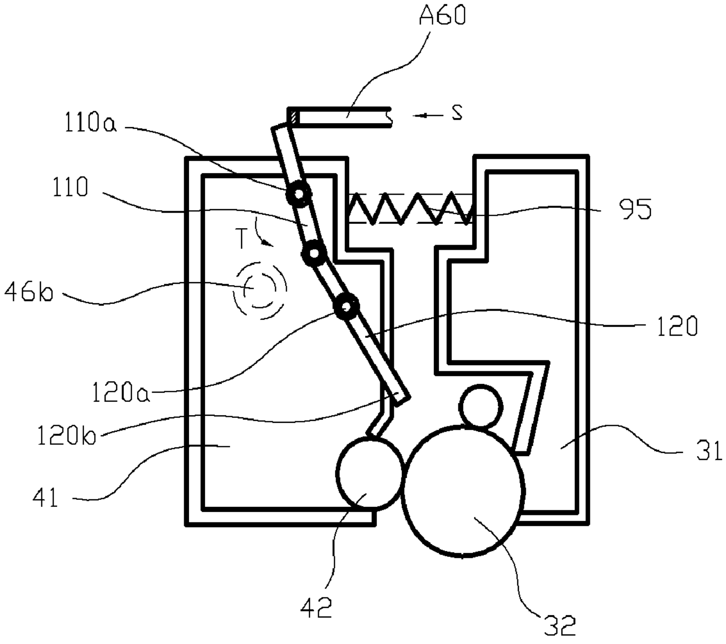

When the second force applying element A60 moves along a direction S shown in FIG. 53, the second force applying element A60 may be abutted against the pushing rod 110 and make the pushing rod 110 rotate around the rotating axle 110*a* along a direction T shown in FIG. 53, the pushing rod 110 may drive the ejection rod 120 to rotate, and the other end 120*b* of the ejection rod 120 may move away from the photosensitive unit 31.

Figure 54:
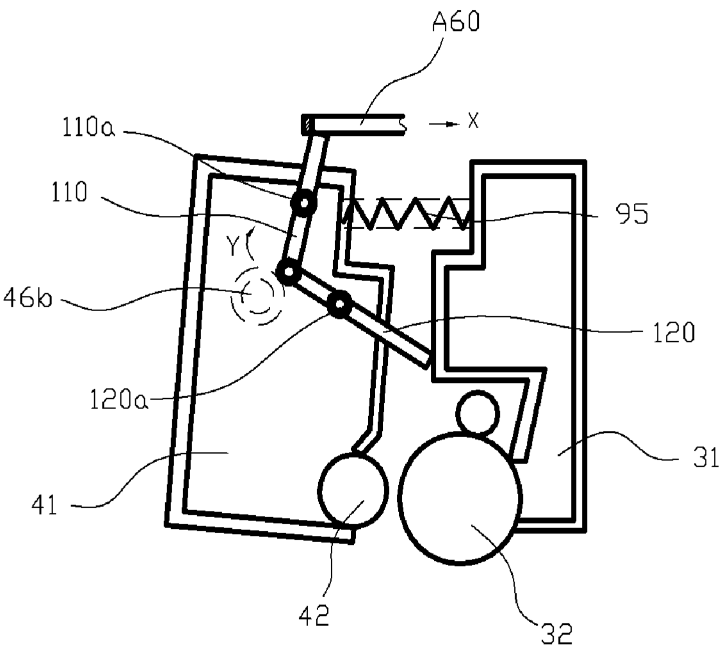

The inner side of the "hook" portion of the second force applying element A60 may be abutted against the pushing rod 110, and when the second force applying element A60 moves along a direction X shown in FIG. 54, the second force applying element A60 may drive the pushing rod 110 to rotate along a direction Y shown in FIG. 54. At his point, the ejection rod 120 may be driven to rotate, and the other end 120*b* of the ejection rod may press the photosensitive unit 31, such that the developing unit 41 may rotate around the rotating axle 46*b*, and the developing element 42 may move away from the photosensitive element 32.

After the second force applying element A60 is separated from the pushing rod 110, the pushing rod 110 may be restored to the state shown in FIG. 52 under the action of an elastic element (e.g., a spring or a torsion spring) or under the action of the elastic element 95.

Exemplary Embodiment Fourteen

In one embodiment, the structures and connection relationships on the processing cartridge same as those in exemplary embodiment twelve and the structures and connection relationships on the electronic image-forming device same as those in exemplary embodiment twelve may not be repeated herein.

Figure 55:
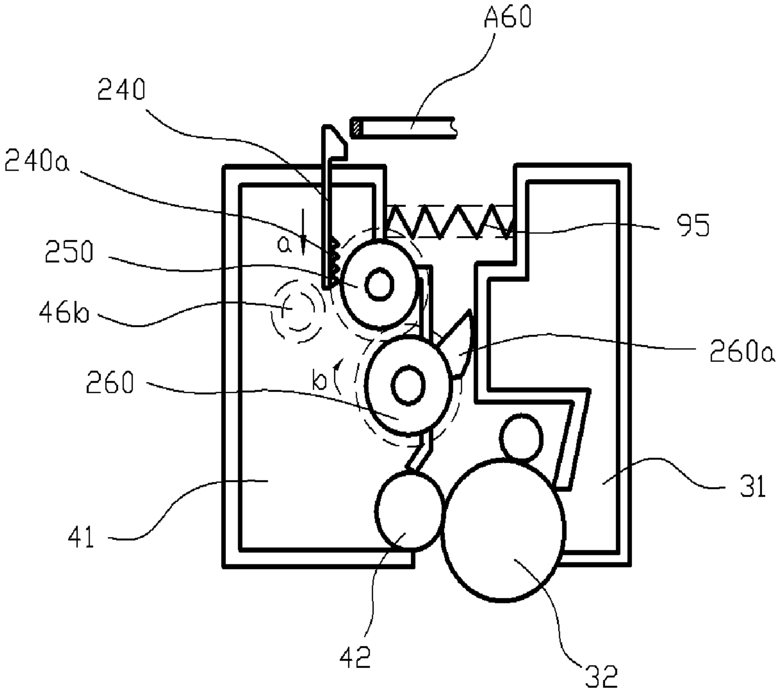
FIG. 55 illustrates a structural schematic of a processing cartridge in exemplary embodiment fourteen.

As shown in FIG. 55, the developing unit 41 of the processing cartridge may be disposed with a first pressing rod 240, a second gear element 250, and a third gear element 260. The first pressing rod 240 may be disposed with a rack portion 240*a* which meshes with the second gear element 250, and the second gear element 250 may mesh with the third gear element 260. The third gear element 260 may be disposed with a cam portion 260*a*; the first pressing rod 240, also provided with an inclined surface, may extend out of the developing unit 41.

When the processing cartridge is installed on the electronic image-forming device, the inclined surface on the first pressing rod 240 may be abutted against the second force applying element A60 on the electronic image-forming device, and the second force applying element A60 may make the first pressing rod 240 move along a direction a in FIG. 55 (the first pressing rod 240 may move into the developing unit 41). Since the rack portion 240*a* on the first pressing rod 240 meshes with the second gear element 250 and also the second gear element 250 meshes with the third gear element 260, the movement of the first pressing rod 240 along the direction a may be transformed into the rotation of the third gear element 260 along a direction b in FIG. 55 through the second gear element 250 and the third gear element 260. Therefore, the cam portion 260*a* on the third gear element 260 may mesh with the photosensitive unit 31, and the developing unit 41 may rotate around the rotating axle 46*b*. In such way, the developing unit 41 may move away from the photosensitive unit 31, such that the developing element 42 may not be in contact with the photosensitive element 32.

When the inclined surface on the first pressing rod 240 on the processing cartridge no longer meshes with the second force applying element A60, the developing unit 42 may move close to the photosensitive unit 31 under the elastic force of the elastic element 95. At this point, the photosensitive unit 31 may be abutted against the cam portion 260*a* and the first pressing rod 240 may be restored to the state shown in FIG. 55 through the third gear element 260, the second gear part 250, and the rack portion 240*a* (i.e., the first pressing rod 240 may move along a direction extending out of the developing unit 41).

In one embodiment, in order to better enable the first pressing rod 240 to extend out of the developing unit 41, an elastic element may also be disposed on the first pressing rod 240. The elastic element may provide an elastic restoring force for the first pressing rod 240, such that the first pressing rod 240 may always be subjected to an elastic restoring force to extend out of the developing unit 41.

Exemplary Embodiment Fifteen

In one embodiment, the structures and connection relationships on the processing cartridge same as those in exemplary embodiment thirteen and the structures and connection relationships on the electronic image-forming device same as those in exemplary embodiment thirteen may not be repeated herein.

Figure 56:
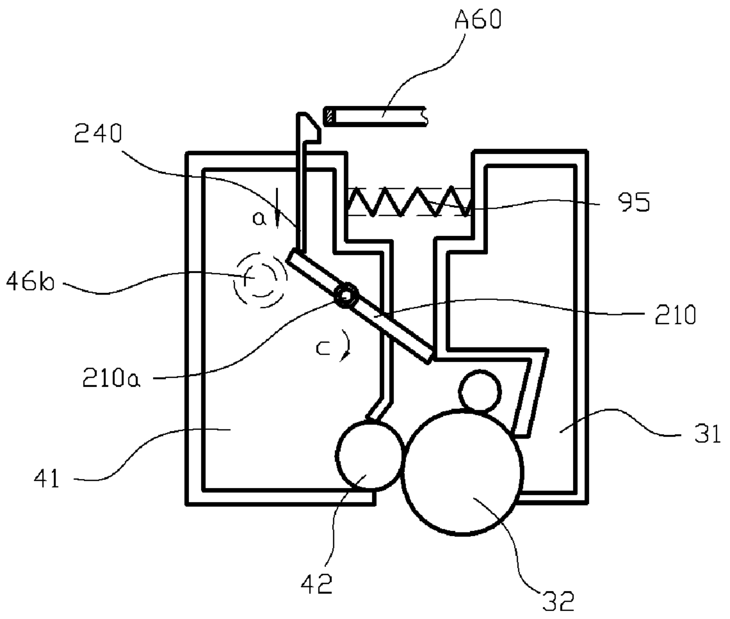
FIG. 56 illustrates a structural schematic of a processing cartridge in exemplary embodiment fifteen.

As shown in FIG. 56, the developing unit 41 of the processing cartridge may be disposed with the first pressing rod 240 and a second ejection rod 210. The first pressing rod 240 may move along the direction a shown in FIG. 56 on the developing unit 41, and the inclined surface may be disposed on the first pressing rod 240. The second ejection rod 210 may rotate around the rotating axle 210*a* disposed on the developing unit along a direction c shown in FIG. 56.

When the processing cartridge is installed on the electronic image-forming device, the inclined surface on the first pressing rod 240 may be abutted against the second force applying element A60 on the electronic image-forming device to move the first pressing rod 240 into the developing unit 41 along the direction a shown in FIG. 56. Therefore, the first pressing rod 240 may be abutted against the second ejection rod 210 to make the second ejection rod 210 rotate around the rotating axle 210*a* along the direction c shown in FIG. 56, such that the second ejection rod 210 may be abutted against the photosensitive unit 31. After being abutted against the photosensitive unit 31, the second ejection rod 210 may make the developing unit 41 rotate around the rotating axle 46*b*, such that the developing unit 41 may move away from the photosensitive unit 31.

When the first pressing rod 240 is no longer in contact with the second force applying element A60, the developing unit 41 may move close to the photosensitive unit 31 under the action of the elastic element 95. Therefore, the second ejection rod 210 may rotate around the rotating axle 210*a* along the direction opposite to the direction c and drive the first pressing rod 240 to move along the direction opposite to the direction a shown in FIG. 56, thereby moving the first pressing rod 240 along the direction away from the developing unit 41.

In one embodiment, in order to better enable the first pressing rod 240 to extend out of the developing unit 41, an elastic element may also be disposed on the first pressing rod 240. The elastic element may provide an elastic restoring force for the first pressing rod 240, such that the first pressing rod 240 may always be subjected to an elastic restoring force to extend out of the developing unit 41.

Exemplary Embodiment Sixteen

FIGS. 57-67 illustrates another embodiment of the present disclosure. The structures of the processing cartridge and the electronic image-forming device in one embodiment may be different from those in the above-mentioned embodiments.

Figure 57:
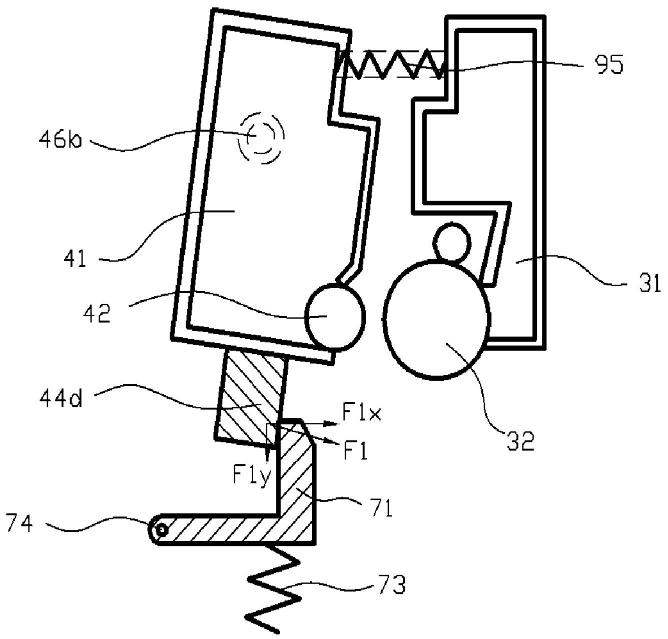
FIG. 57 illustrates a schematic of contact and engagement of a spacing element of an electronic image-forming device and a protrusion of a processing cartridge in the existing technology.

As shown in FIG. 57, the electronic image-forming device is described in the U.S. Pat. No. 9,836,020B2. The electronic image-forming device may be disposed with a spacing element 71 and a spring 73. The spacing element 71 may rotate around a supporting axle 74, and the spring may provide an elastic restoring force to the spacing element 71, such that the spacing element 71 may always maintain an upwardly extending state as shown in FIG. 57. The working manner of the electronic image-forming device has been described in the U.S. Pat. No. 9,836,020B2. The processing cartridge may include the developing unit 41 and the photosensitive unit 31; the photosensitive unit 31 may be disposed with the photosensitive element 32; and the developing unit 41 may be disposed with the developing element 42 and a protrusion 44*d*. When the protrusion 44*d* meshes with the spacing element 71, and the spacing element 71 makes the protrusion drive the developing unit 41 to rotate around the rotating axle 46*b* on the developing unit 41, the developing element 42 may move away from the photosensitive element 32. When the spacing element 71 does not mesh with the protrusion 44*d*, the developing unit 41 may rotate around the rotating axle 46*b* under the action of the elastic element 95, and the developing element 42 may move close to the photosensitive element 32 and finally be in contact with the photosensitive element 32.

As shown in FIG. 57, when the protrusion 44*d* is configured as the structure shown in FIG. 57, the protrusion 44*d* may provide a force F1 to the spacing element 71. The two components of the force F1 are F1*x* and F1*y*, respectively, and Fly may make the spacing element 71 have a tendency to move downwardly as shown in FIG. 57, such that there is a risk of causing the spacing element 71 to de-mesh with the protrusion. The structural arrangement of the processing cartridge and protrusion in one embodiment may be to solve the above-mentioned risk. The solutions in one embodiment may be described as the following.

The First Solution in One Embodiment

FIGS. 58*a*-61*b* illustrate the first solution in one embodiment.

Figure 58A:
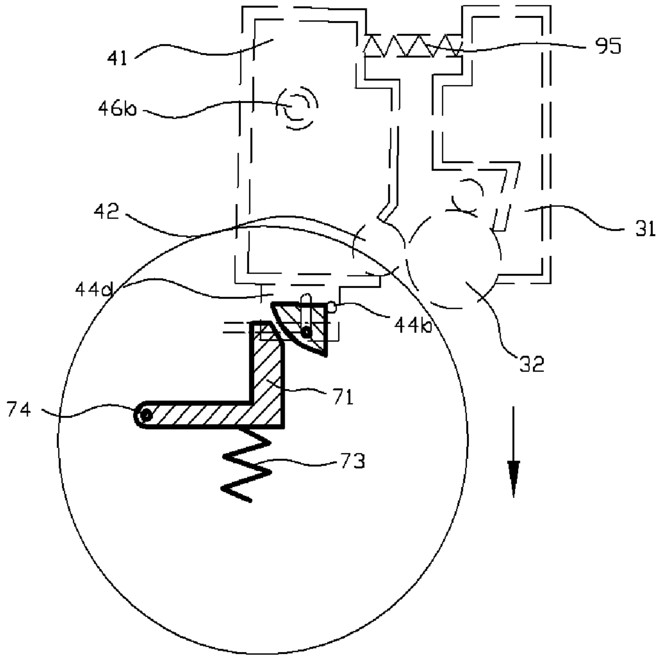
FIG. 58*a* illustrates a schematic when a processing cartridge is installed in an electronic image-forming device in a first solution of exemplary embodiment sixteen.
Figure 58B:
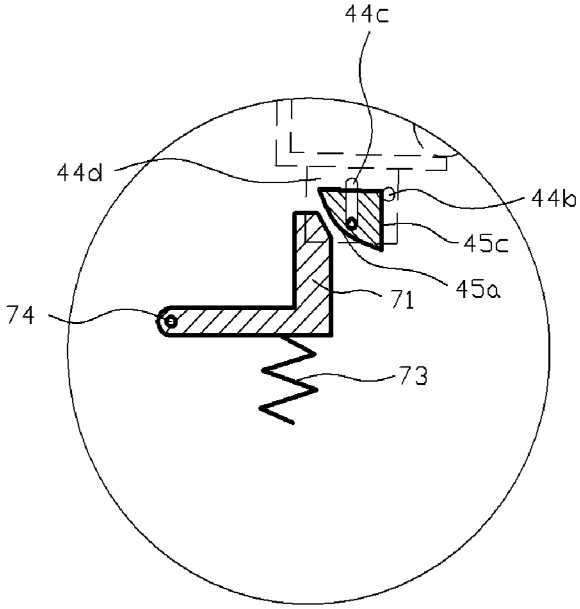
FIG. 58*b* illustrates a local enlarged schematic of FIG. 18*a;*

As shown in FIGS. 58*a* and 58*b*, the protrusion 44*d* and a force receiving element 45 may be disposed on the processing cartridge; a blocking element 44*b* and a sliding trench 44*c* may also be disposed on the protrusion 44*d*; and the force receiving element 45 may be disposed with an inclined surface 45*a*, a rotating axle 45*b*, and a force receiving surface 45*c*.

The rotating axle 45*b* of the force receiving element 45 may be connected to the sliding trench 44*c*, and the rotating axle 45*b* may move up and down in the sliding trench 44*c*. As shown in FIGS. 58*a* and 58*b*, the force receiving element 45 may rotate around the rotating axle 45*b*, and the gravity center of the force receiving element 45 may be away from the rotating axle 45*b* and close to the blocking element 44*b* (having a clockwise rotation tendency). Therefore, the blocking element 44*b* may be abutted against the force receiving surface 45*c* (to prevent the force receiving element 45 from rotating clockwise) and ensure that the force receiving surface 45*c* may be in a vertical state when the processing cartridge is installed in the electronic image-forming device. The inclined surface 45*a* on the force receiving element 45 may be disposed at a lower side along its vertical direction; and the force receiving surface 45*c* may mesh with the spacing element 71 and receive the pushing force from the spacing element 71.

When the processing cartridge is installed in the electronic image-forming device along the direction indicated by an arrow in FIG. 58*a*, the force receiving element 45 may be installed to the right side of the spacing element 71, where the inclined surface 45*a* may be not in contact with the spacing element 71 at this point; and since the force receiving element 45 is under the action of the blocking element 44*b*, the force receiving surface 45*c* may be in a vertical state.

Figure 59A:
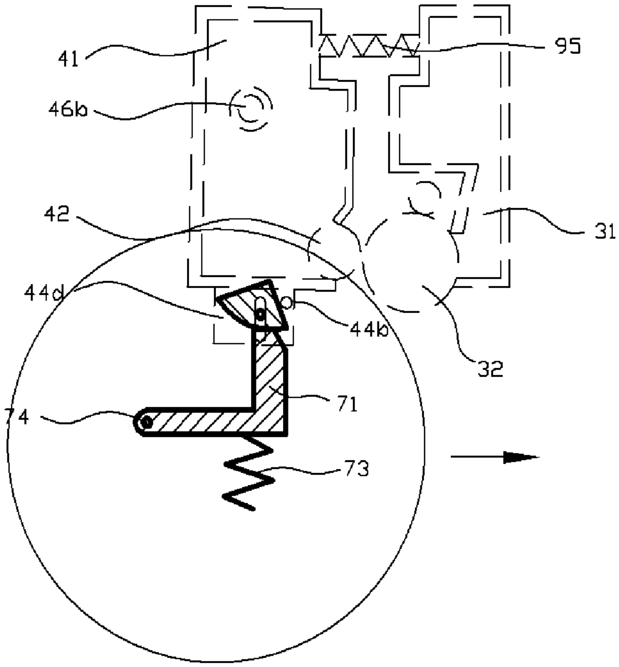
FIGS. 59*a* and 60*a* illustrate schematics of a position change relationship between a spacing element and a force receiving element in a first solution of exemplary embodiment sixteen.
Figure 59B:
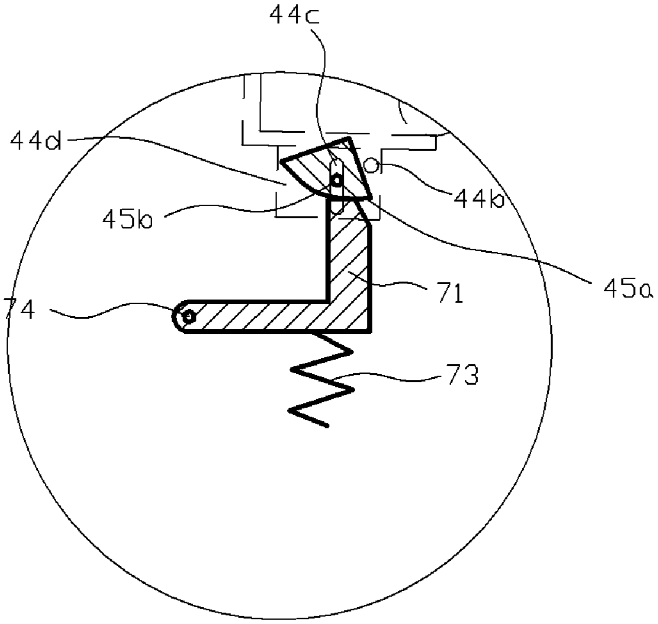
FIGS. 59*b* and 60*b* illustrate local enlarged schematics of FIGS. 59*a* and 60*a*, respectively.

When the spacing element 71 moves along an arrow direction shown in FIGS. 59*a* and 59*b*, the spacing element 71 may be abutted against the inclined surface 45*a* to make the force receiving element 45 rotate around the rotating axle 45*b*, and the rotating axle 45*b* may slide upwardly along the sliding trench 44*c*, such that the blocking element 44*b* may be disengaged to be not in contact with the force receiving surface 45*c*. At this point, although the spacing element 71 is subjected to the gravity from the force receiving element 45, the force receiving element 45 may not overcome the elastic force of the spring 73 due to the limited weight of the force receiving element 45, such that the spacing element 71 may not rotate downwardly.

Figure 60A:
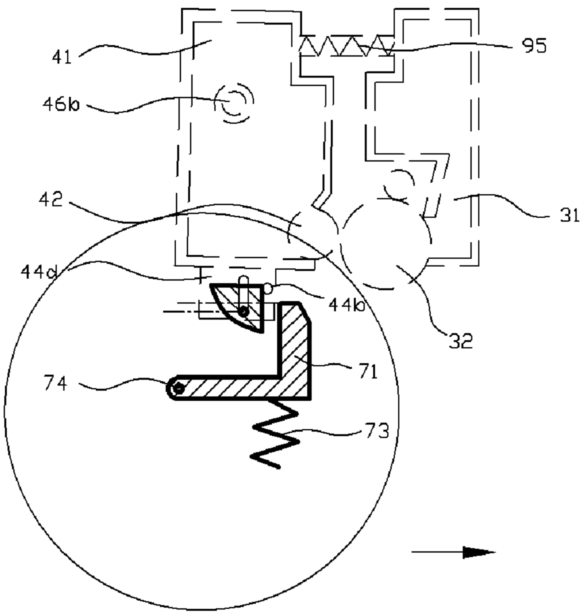
Figure 60B:
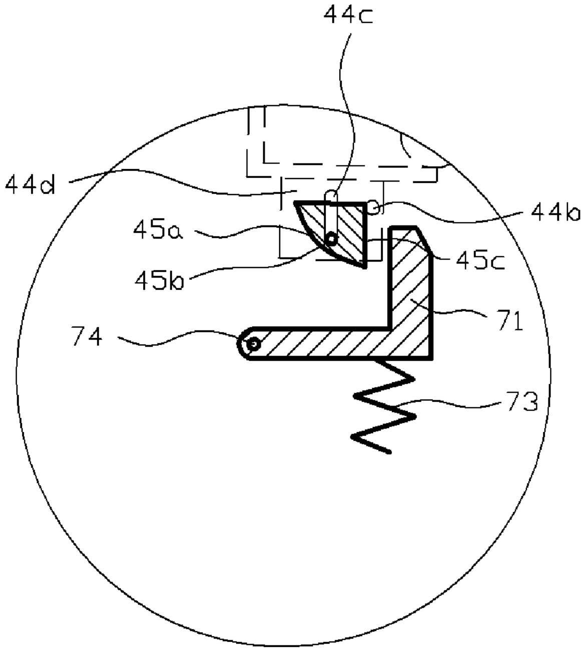

When the spacing element 71 moves to the state shown in FIGS. 60*a* and 60*b*, the spacing element 71 may be on the right side of the force receiving element 45, and at this point, the force receiving element may be restored to the state shown in FIGS. 60*a* and 60*b* under the action of gravity. At this point, the force receiving surface 45*c* may be in a vertical state, the rotating axle 45*b* may be at the lower end in the sliding trench 44*c*, and the force receiving element 45 may be restored to the initial state.

Figure 61A:
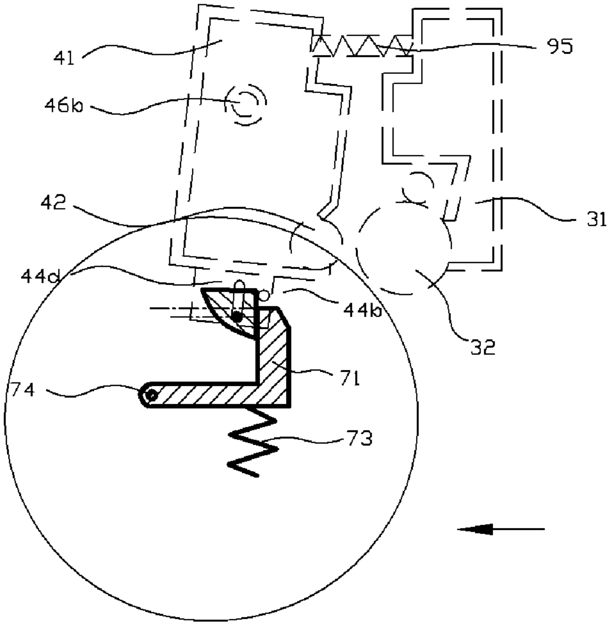
FIG. 61*a* illustrates a schematic of a spacing element pushing a force receiving element in a first solution of exemplary embodiment sixteen.
Figure 61B:
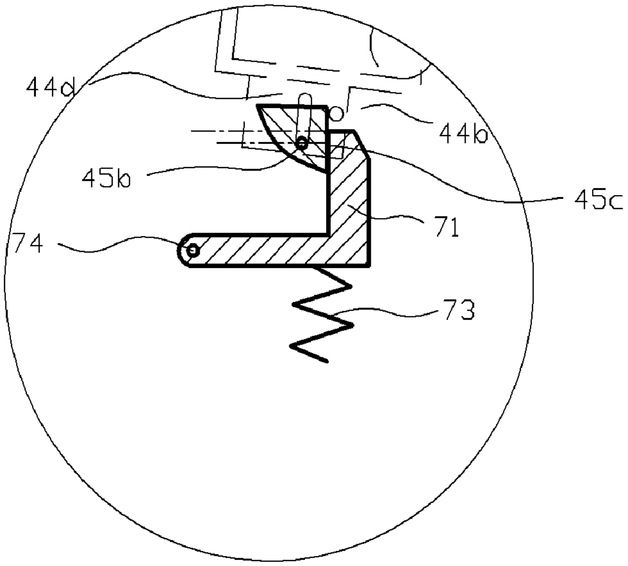
FIG. 61*b* illustrates a local enlarged schematic of FIG. 61*a;*

When the spacing element 71 moves close to the force receiving element 45 along an arrow shown in FIGS. 61*a* and 61*b* and mesh with the force receiving surface 45*c*, the spacing element 71 may provide a force to the force receiving element 45 to make the force receiving element 45 move to the left. Since the height of the rotating axle 45*b* along the vertical direction is lower than the height of the uppermost part of the spacing element 71, when the force receiving element 45 receives the force from the spacing element 71, the force receiving element 45 may not rotate counterclockwise around the rotating axle 45*b* as shown in FIGS. 61*a* and 61*b*. In such way, the rotating axle 45*b* on the force receiving element 45 may push the sliding trench 44*c* to make the protrusion 44*d* move to the left (the rotating axle 45*b* may rotate relative to the sliding trench 44*c*). Therefore, the developing unit 41 may rotate clockwise around the rotating axle 46*b* at this point, thereby moving the developing element 42 away from the photosensitive element 32; and the developing element 42 may rotate from a state which is in contact with the photosensitive element 32 to a state which is not in contact with the photosensitive element 32. Since the force receiving element 45 can rotate around the rotating axle 45*b*, during the process that the spacing element 71 pushes the force receiving element 45, the force receiving surface 45*c* may always be in a vertical state, and the force receiving element 45 may not provide a vertical force on the spacing element 71.

Therefore, the first solution in one embodiment may overcome the defects of the existing technology, which may not only make the structure of the processing cartridge simple, but also may not push the spacing element on the electronic image-forming device to move the spacing element downwardly. In addition, the force receiving surface of the force receiving element may always maintain a vertical state during the process of receiving the force of the spacing element.

The Second Solution in One Embodiment

FIGS. 62*a*-65*b* illustrate the second solution in one embodiment.

Figure 62A:
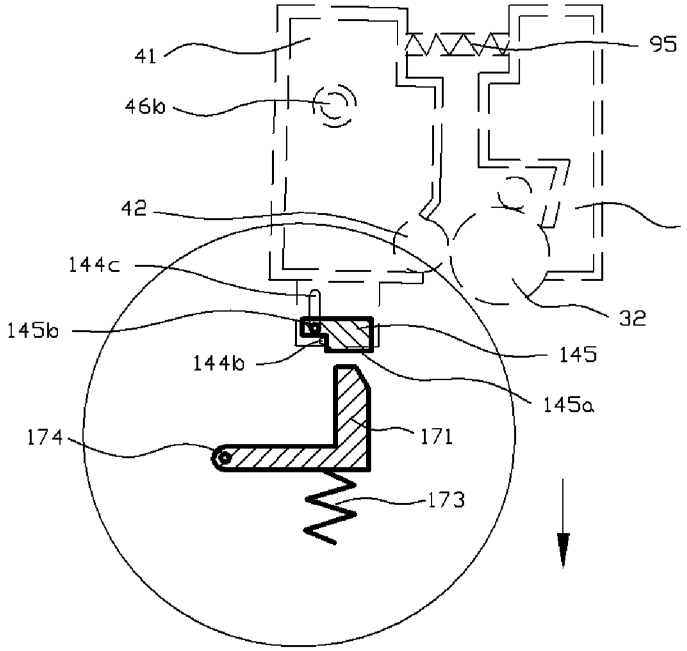
FIG. 62*a* illustrates a schematic when a processing cartridge is installed in an image-forming device in a second solution of exemplary embodiment sixteen.
Figure 62B:
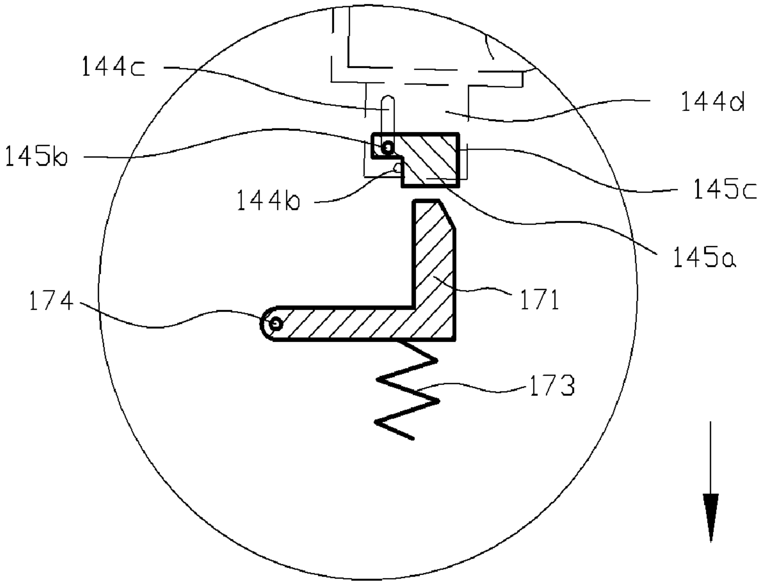
FIG. 62*b* illustrates a local enlarged schematic of FIG. 62*a;*

As shown in FIGS. 62*a* and 62*b*, a protrusion 144*d* may be disposed with a blocking element 144*b* and a sliding trench 144*c*. A force receiving element 145 may be disposed with a bottom surface 145*a*, a rotating axle 145*b*, and a force receiving surface 145*c*. The bottom surface 145*a* may be disposed at the lower side of the force receiving element 145. The rotating axle 145*b* may be connected to the sliding trench 144*c* (in the present solution, the rotating axle 145*b* may be configured to slide or not slide in the sliding trench 144*c*), and the force receiving element 145 may rotate around the rotating axle 145*b*. The force receiving surface 145*c* may be disposed on one side of the force receiving element 145. When the processing cartridge is in the state shown in FIGS. 62*a* and 62*b*, the force receiving surface 145*c* may be in a vertical state. The rotating axle 145 may be disposed at the left end of the force receiving element 145, such that the force receiving element 145 may tend to rotate clockwise, and the blocking element 144*b* may be abutted against the force receiving element 145 to prevent the force receiving element 145 from rotating clockwise.

When the processing cartridge is installed in the electronic image-forming device along the direction of an arrow shown in FIGS. 62*a* and 62*b* and the bottom surface 145*a* is not abutted against a spacing element 171, the force receiving surface 145*c* may not be subject to the force from the outside of the processing cartridge, such that the force receiving surface 145 may be in a vertical state.

Figure 63A:
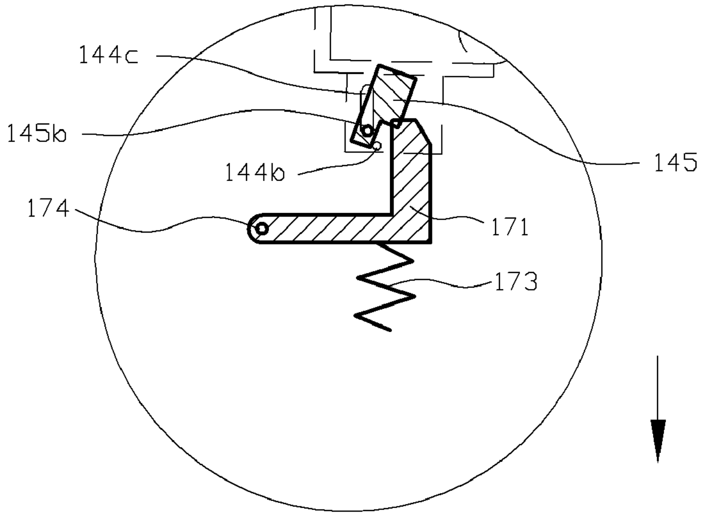
FIG. 63*a* illustrates a schematic of a contact between a force receiving element and a spacing element when a rotating axle cannot slide in a sliding trench in a second solution of exemplary embodiment sixteen.

As shown in FIG. 63*a*, the rotating axle 145*b* may be configured to not slide in the sliding trench 144*c*. When the processing cartridge continues to move downwardly along the direction of an arrow shown in FIG. 63*a* to the final state and cannot continue to move downwardly, the spacing element 171 may be abutted against the bottom surface 145*a*, and the force receiving element 145 may rotate around the rotating axle 145*b* to the state shown in FIG. 63*a*. Since the weight of the force receiving element 145 is relatively small, the force of the force receiving element 145 provided to the spacing element 171 may be less than the elastic force of the spring 173, such that the spacing element 171 may not be pushed downwardly.

Figure 63B:
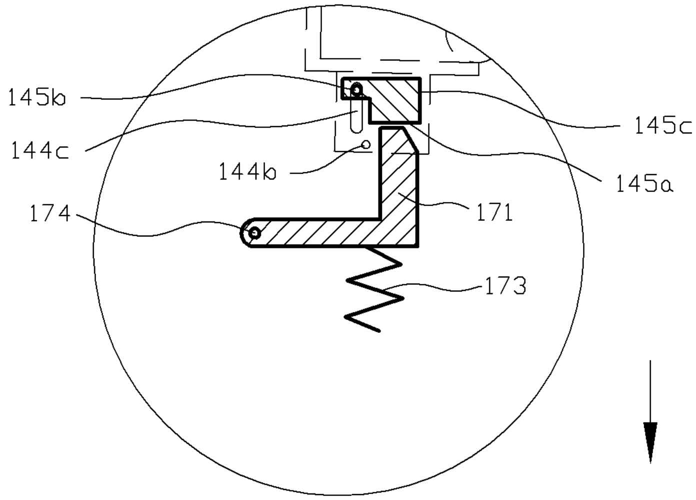
FIG. 63*b* illustrates a schematic of a contact between a force receiving element and a spacing element when a rotating axle can slide in a sliding trench in a second solution of exemplary embodiment sixteen.

As shown in FIG. 63*b*, the rotating axle 145*b* may be configured to slide in the sliding trench 144*c*. When the processing cartridge continues to move downwardly along the direction of an arrow shown in FIG. 63*b* to the final state and cannot continue to move downwardly, the spacing element 171 may be abutted against the bottom surface 145*a*, and the force receiving element 145 may move upwardly under the action of the spacer element 171. At this point, the force receiving surface 145*c* may still maintain a vertical state. Since the weight of the force receiving element 145 is relatively small, the force of the force receiving element 145 provided to the spacing element 171 may be less than the elastic force of the spring 173, such that the spacing element 171 may not be pushed downwardly.

Figure 64A:
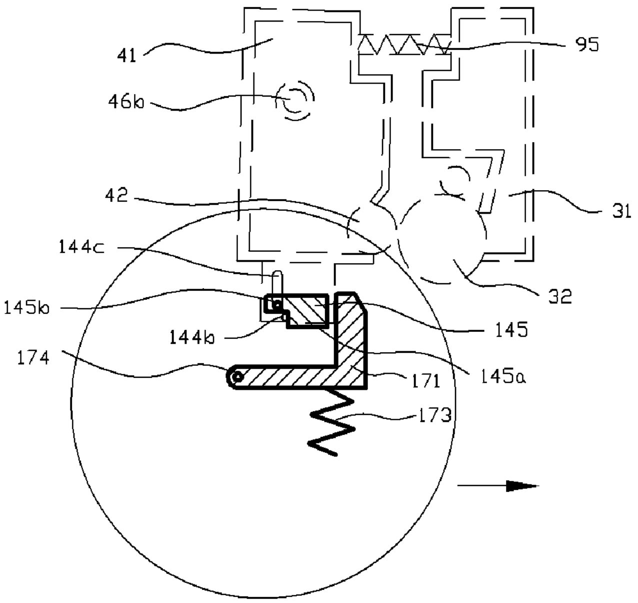
FIGS. 64*a* and 65*a* illustrate schematics of abutting between a force receiving element and a spacing element in a second solution of exemplary embodiment sixteen.
Figure 64B:
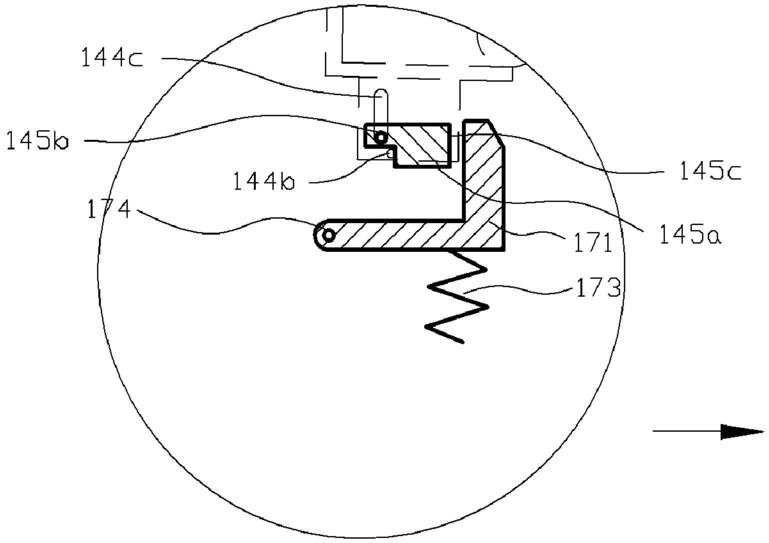
FIGS. 64*b* and 65*b* illustrate local enlarged schematics of FIGS. 64*b* and 65*b*, respectively.

As shown in FIGS. 64*a* and 64*b*, when the spacing element 171 moves to the right along the direction of an arrow shown in FIGS. 64*a* and 64*b* to the state shown in FIGS. 64*a* and 64*b*, the force receiving element 145 may be restored to the state shown in FIGS. 64*a* and 64*b*, and the force receiving surface 145*c* may be in the vertical state at this point.

Figure 65A:
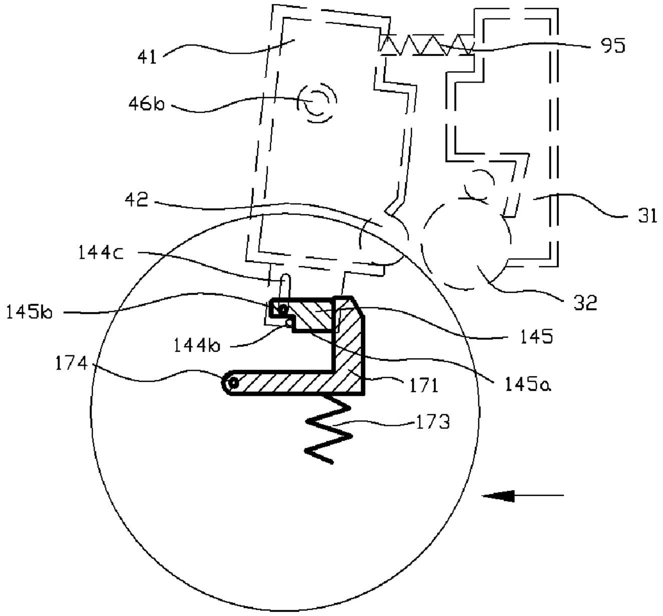
Figure 65B:
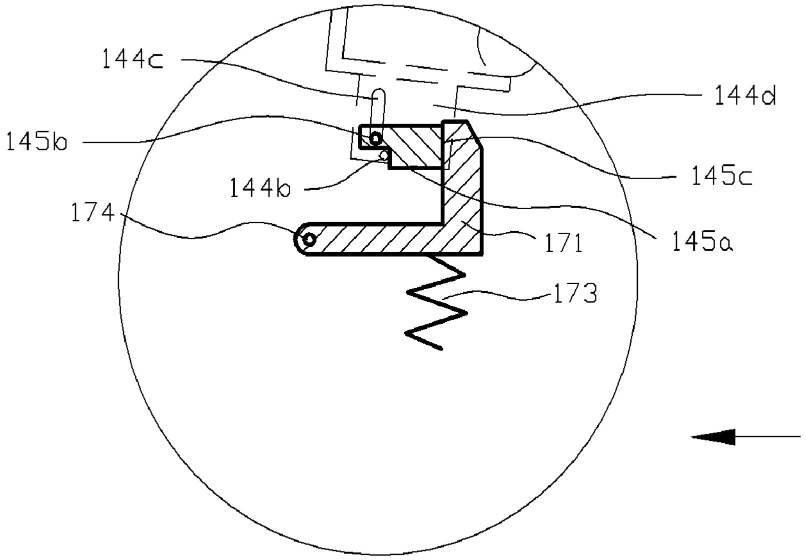

As shown in FIGS. 65*a* and 65*b*, when the spacing element 171 moves to the left along the direction of an arrow shown in FIGS. 65*a* and 65*b*, since the height of the uppermost part of the spacing element 71 along the vertical direction is higher than the height of the rotating axle 145*b* along the vertical direction, the spacing element 171 may provide a force for the force receiving element 145 when the spacing element 171 is abutted against the force receiving surface 145*c*. Therefore, the rotating axle 145*b* on the force receiving element 145 may push the sliding trench 144*c*, and the rotating axle 145*b* may rotate relative to the sliding trench 144*c*. At this point, the developing unit 41 may rotate clockwise around the rotating axle 46*b*, and the developing element 42 may move away from the photosensitive element 32, such that the developing element 42 may rotate from a state which is in contact with the photosensitive element 32 to a state which is not in contact with the photosensitive element 32. Since the force receiving element 145 can rotate around the rotating axle 145*b*, the force receiving surface 145*c* may always maintain the vertical state when the spacing element 171 provides a force for the force receiving element 145, and the force receiving element 45 may not provide a vertical force to the spacing element 71.

The Third Solution in One Embodiment

In the present solution, the structures same as those in the above-mentioned first solution and second solution may not be repeated herein.

Figure 66:
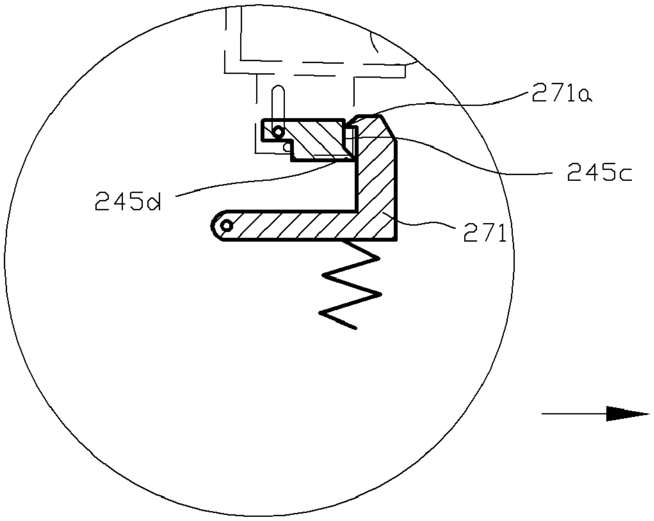
FIGS. 66 and 67 illustrate structural schematics of contact and engagement between a protrusion of a processing cartridge and a spacing element of an image-forming device in a third solution of exemplary embodiment sixteen.
Figure 67:
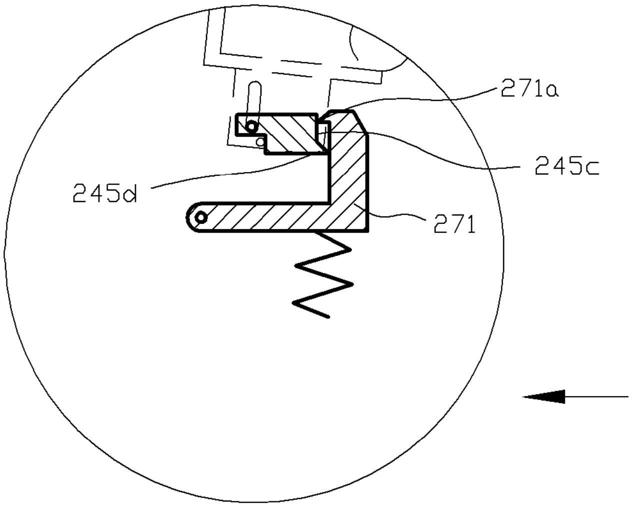

As shown in FIGS. 66 and 67, a spacing element 271 may also be disposed with a bump 271*a*; a force receiving element 245 may also be disposed with a bump 245*d*, and the distance of the bump 271*a* on the spacing element extending from the spacing element 271 may be approximately same as the distance of the bump 245*d* on the force receiving element extending from the force receiving element 245. When the spacing element 271 is abutted against the force receiving surface 245*c*, the bump 271*a* on the spacing element may be abutted against a plane on the force receiving surface 245*c*, and the bump 245*d* on the force receiving element 245 may be abutted against a plane on the spacing element 27, such that when the spacing element 271 provides a force to the force receiving surface 245*c*, the force receiving surface 245*c* may always maintain the vertical state.

Exemplary Embodiment Seventeen

A processing cartridge, where a movable element may not press a protrusion of an electronic image-forming device and may not sink the protrusion during the installation process, is provided in various embodiments of the present disclosure. In the present application, the upper, lower, left and right sides of the processing cartridge may be the orientations when the processing cartridge is installed inside the electronic image-forming device; and the front and the rear may refer to the front and rear of the installation direction of the processing cartridge in the process of installing the electronic image-forming device. In the process of installing the processing cartridge, for example, it may specify that a toner container is at the front and a waste toner container is at the rear.

Figure 68:
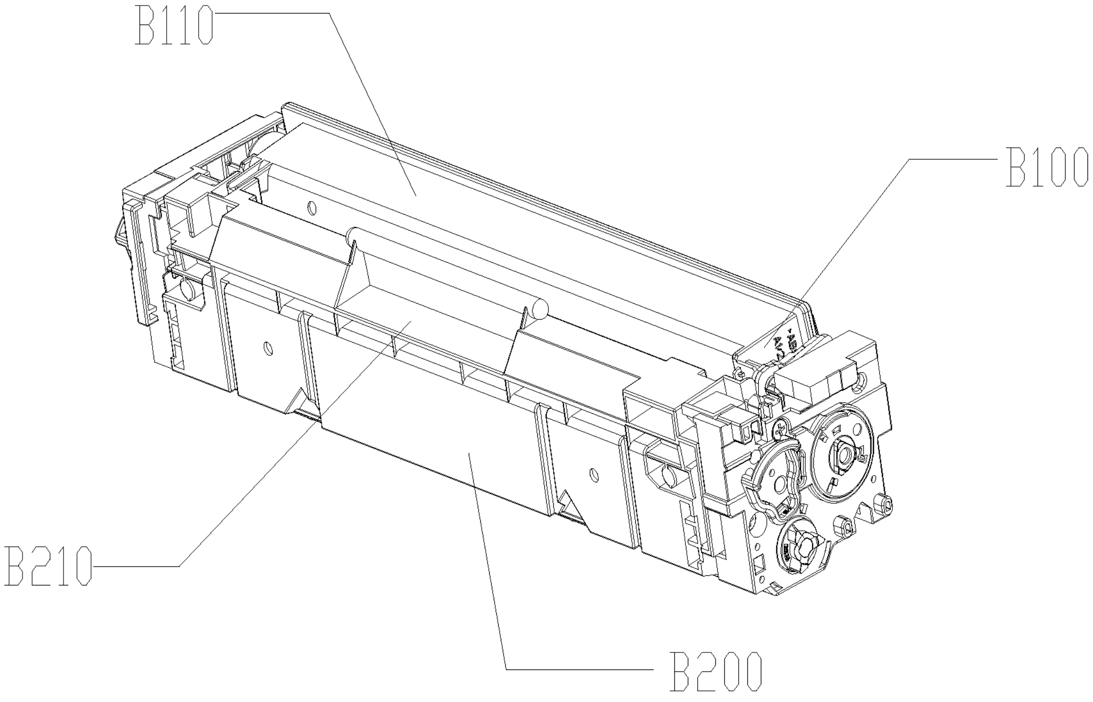
FIG. 68 illustrates a structural top view when a processing cartridge is installed inside an electronic image-forming device in exemplary embodiment seventeen.

FIG. 68 illustrates a structural top view when the processing cartridge is installed inside the electronic image-forming device in exemplary embodiment seventeen. As shown in FIG. 68, the processing may include a waste toner container B100 and a toner container B200. The waste toner container B100 may include a waste toner container upper surface B110 at the upper side of the processing cartridge; similarly, the upper part of the toner container B200 may include a toner container upper surface B210.

Figure 69:
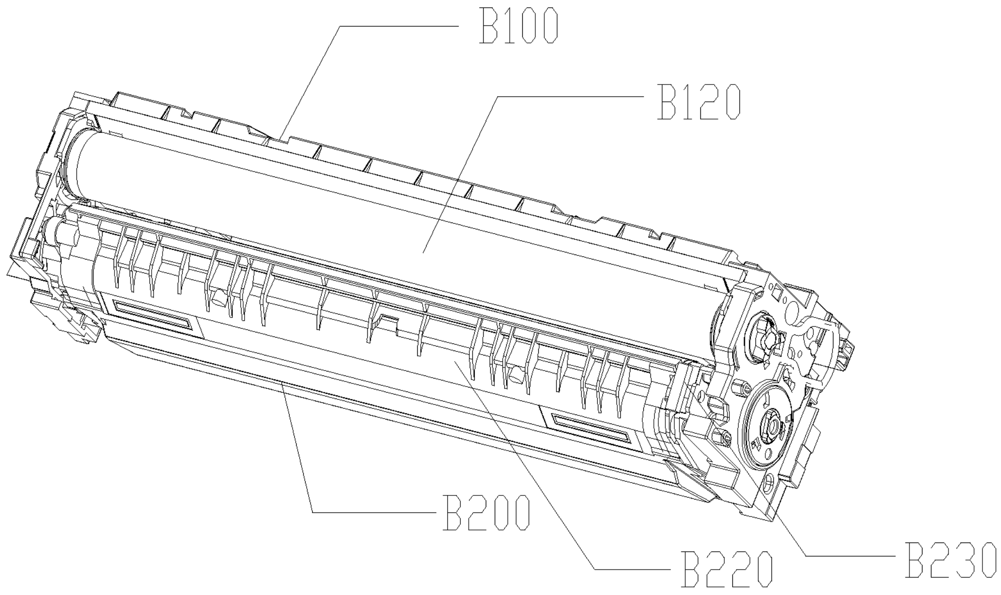
FIG. 69 illustrates a structural bottom view when a processing cartridge is installed inside an electronic image-forming device in exemplary embodiment seventeen.

FIG. 69 illustrates a structural bottom view when the processing cartridge is installed inside the electronic image-forming device in exemplary embodiment seventeen. As shown in FIG. 69, an included photosensitive drum B120 may be below the waste toner container B100; and the lower part of the toner container B200 may include a toner container lower surface B220. The processing cartridge may also include a movable element B230, which may be movably installed on the toner container lower surface B220.

Figure 70:
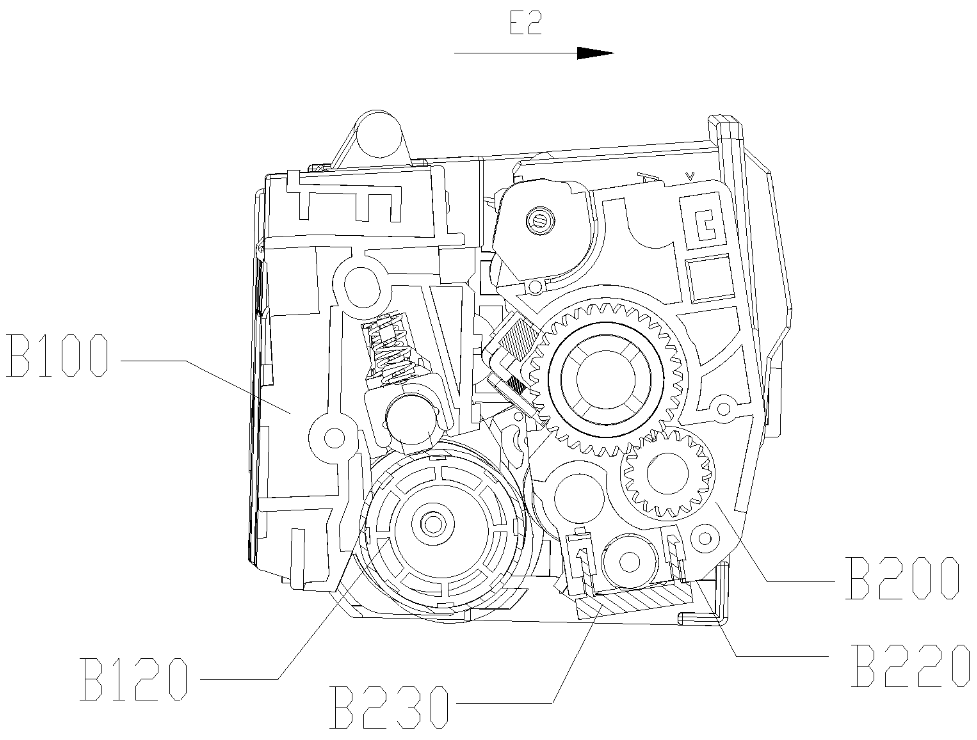
FIG. 70 illustrates a cross-sectional view of a processing cartridge along a plane perpendicular to a length direction of the processing cartridge in exemplary embodiment seventeen.

FIG. 70 illustrates a cross-sectional view of the processing cartridge along a plane perpendicular to a length direction of the processing cartridge in exemplary embodiment seventeen. As shown in FIG. 70, the movable element B230 may be movably connected with the toner container B200. In some implementation solutions, the position of the movable element B230 on the processing cartridge may be closer to the lower side than the toner container lower surface B220, that is, at least a portion of the movable element B230 may protrude relative to the toner container lower surface B220. In such way, when the processing cartridge is installed into the electronic image-forming device along the direction of an arrow E2, the movable element B230 may first touch or be abutted against the protrusion installed inside the electronic image-forming device. By disposing the movable element B230 to replace a fixed element in the existing technology, the movable element B230 may move relative to the protrusion during the process of installing the processing cartridge. Therefore, the protrusion inside the electronic image-forming device may no longer be retracted downwardly along the vertical direction due to the installation of the processing cartridge. In one embodiment, the movable element B230 may be moved by the force of the protrusion. Obviously, the movable element B230 may also be moved by the force of other portions inside the electronic image-forming device.

Figure 71:
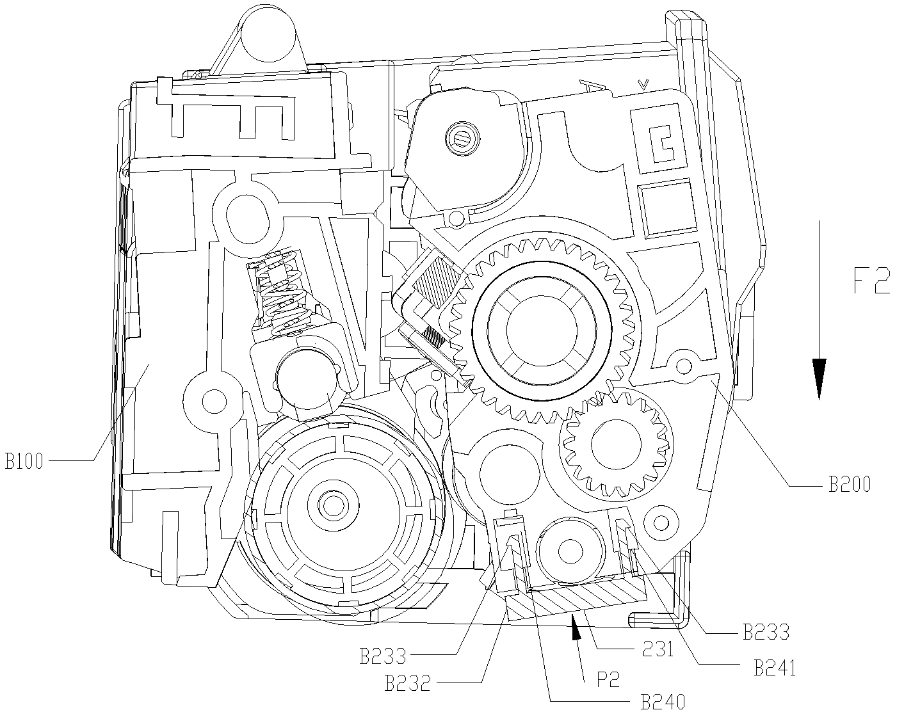
FIGS. 71-72 illustrate cross-sectional schematics of a movable element at two different positions on a processing cartridge in exemplary embodiment seventeen.
Figure 71A:
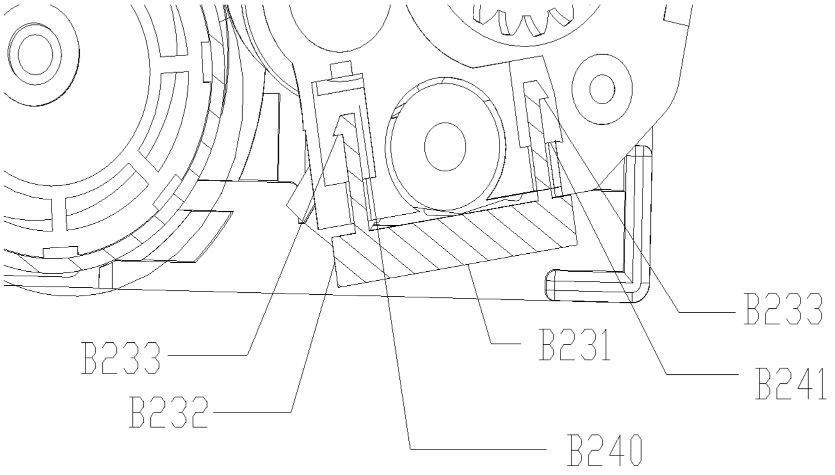
FIGS. 71*a* and 72*a* illustrate enlarged schematics of a movable element in corresponding states of FIGS. 71 and 72.
Figure 72:
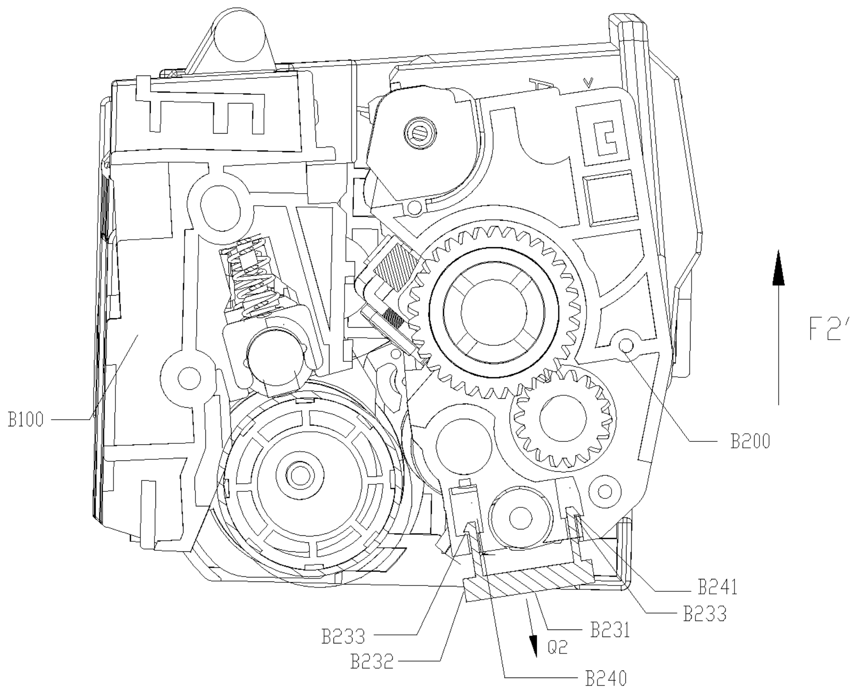
Figure 72A:
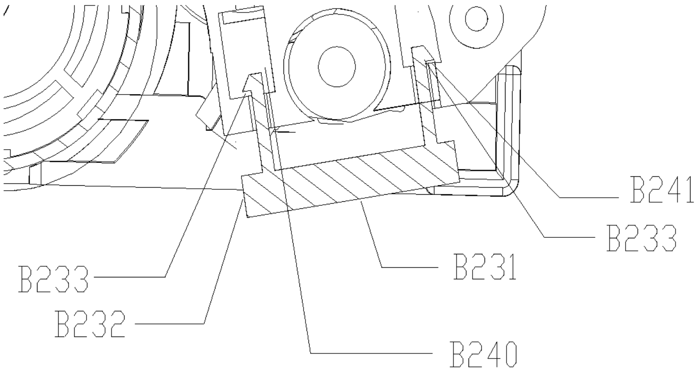

FIGS. 71-72 illustrate cross-sectional schematics of the movable element at two different positions on the processing cartridge in exemplary embodiment seventeen. FIGS. 71*a* and 72*a* illustrate enlarged schematics of the movable element B230 in corresponding states of FIGS. 71 and 72. The matching relationship between the toner container B200 and the movable element B230 may be a clearance fit, such that the movable element B230 may move relatively freely with respect to the toner container B200. In order to prevent the movable element B230 from detaching from the toner container B200, as shown in FIGS. 71 and 71*a*, the inside of the toner container B200 may also include an accommodation container B240, and a portion of the movable element B230 may be located in the accommodation container B240. In one embodiment, the movable element B230 may include an abutting portion B233, and the accommodating container B240 may include a detachment preventing portion B241. Through the interference between the abutting portion B233 and the detachment preventing portion B241, the movable element B230 may not be detached from the toner container B200.

The movable element B230 may have an abutting surface B231 which can be abutted against the electronic image-forming device. When the processing cartridge is installed in the electronic image-forming device, the processing cartridge may be lowered along the direction of an arrow F2 driven by certain mechanisms in the electronic image-forming device (e.g., when the door cover of the electronic image-forming device is closed or opened, a connecting rod mechanism, which is not shown in figures, may be triggered), such that the abutting surface B231 may be abutted against the protrusion of the electronic image-forming device. At this point, the movable element B230 may be retracted inside the processing cartridge along an arrow P2, which is the state described in FIGS. 71 and 71*a* and called a first position at this point. Furthermore, since the movable element B230 and the toner container B200 are in a clearance fit, the resistance generated by the relative movement may be relatively small, such that the movable element B230 may not press the protrusion downwardly at this point. When the processing cartridge is installed in place, the internal movement of the electronic image-forming device may make the protrusion move along the direction opposite to the processing cartridge installation direction, and the protrusion may move away from the position abutting against the abutting surface B231 and move to the side close to a pushing surface B232. At this point, since the movable element B230 and the toner container B200 are in a clearance fit and the protrusion is no longer abutted against the abutting surface B231, the movable element B230 may be subjected to the action of gravity to extend out downwardly relative to the processing cartridge along an arrow Q2. At this point (after the movable element B230 is extended out), the pushing surface B232 may be in contact with the protrusion, and the state at this point (FIGS. 72 and 72*a*) is called a second position. Obviously, when in the second position, since other components in the electronic image-forming device are abutted against the movable element B230 or other components inside the processing cartridge act on the movable element B230, the blocking portion B233 on the movable element B230 may be not in contact with the attachment preventing portion B241. However, compared to the first position, the second position may be closer to the lower side of the processing cartridge; and at least a portion of the front or rear projection of the pushing surface B232 overlaps the front or rear projection of the protrusion (the overlapping of one of the front projections and the rear projections may be regarded as the projection overlapping), which may be regarded as the second position.

When the movable element is in the second position and the electronic image-forming device drives the protrusion to move along the processing cartridge installation direction (the direction of the arrow E2), the protrusion may exert a force on the pushing surface B232 and push the toner container B200 to move relative to the waste toner container B100 to implement the roller drum separation.

Figure 73:
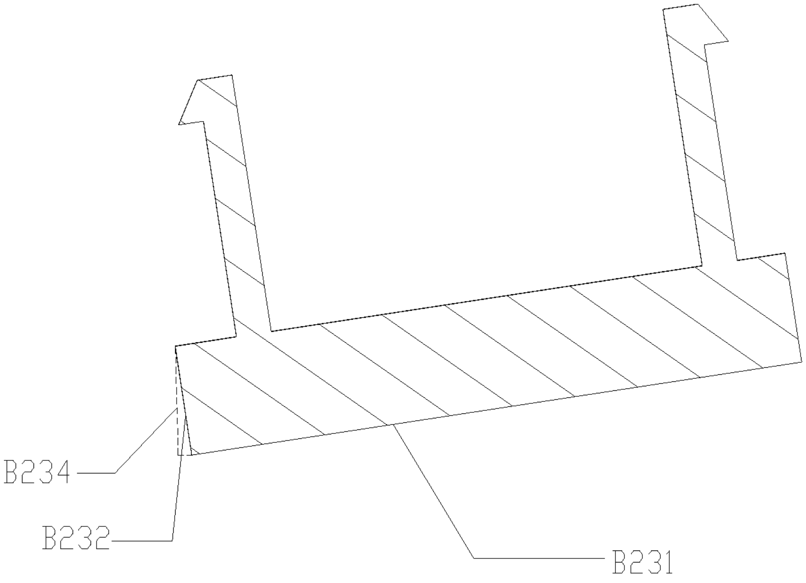
FIG. 73 illustrates a cross-sectional view of an optimized structure of a movable element along a direction perpendicular to a length direction of a processing cartridge in exemplary embodiment seventeen.

FIG. 73 illustrates a cross-sectional view of an optimized structure of the movable element along the direction perpendicular to the length direction of the processing cartridge in exemplary embodiment seventeen. In FIG. 73, the pushing surface may be a new pushing surface B234 with a dotted line, which replaces the above-mentioned pushing surface B232. The new pushing surface B234 may maintain to be perpendicular to the horizontal plane when the processing cartridge is installed in the electronic image-forming device, which may adapt to the contact with an irregularly shaped protrusion. Through such arrangement, the force between the irregularly shaped protrusion and the pushing surface may also be same as that of other protrusions, and the pushing force may be directed in parallel with the horizontal direction, thereby more stably preforming the roller drum separation.

Exemplary Embodiment Eighteen

A processing cartridge, where a movable element may not press a protrusion of an electronic image-forming device and may not retract the protrusion during the installation process, is provided in various embodiments of the present disclosure. In the present application, the upper, lower, left and right sides of the processing cartridge may be the orientations when the processing cartridge is installed inside the electronic image-forming device; and the front and the rear may refer to the front and the rear of the installation direction of the processing cartridge in the process of installing the electronic image-forming device. In the process of installing the processing cartridge, for example, it may specify that a toner container is at the front and a waste toner container is at the rear.

FIGS. 74-77 illustrate working principle schematics of the processing cartridge in different states in exemplary embodiment seventeen. The waste toner container may be omitted and not be shown in FIGS. 74 to 77. The toner container 1200 includes a movable element 1230, a first pushing element, and a second pushing element. The first pushing element may have a tendency to push the movable element 1230 downwardly, thereby making the movable element 1230 have a tendency of extending out downwardly along the vertical direction. For example, the first pushing element may include a first elastic element 1210 and a pushing plate 1240 connected to the first elastic element 1210. The second pushing element may have a tendency of pushing or pulling the movable element 1230 to move away from the waste toner container. For example, the second pushing element may include a second elastic element 1220 which is connected to the movable element 1230. That is, the first pushing element may receive the force of the movable element 1230 along the vertical direction, and the second pushing element may receive the force of the movable element 1230 along the horizontal direction. For example, when the movable element 1230 is in the first position, it can be considered that only the first pushing element may receive the force of the movable element 1230 along the vertical direction; and when the movable element 1230 is in the second position, it can be considered that the first pushing element may receive the force of the movable element 1230 along the vertical direction and the second pushing element may receive the force of the movable element 1230 along the horizontal direction. The toner container 1200 may further include a locking element 1250, which may not interfere with the first pushing element and/or the second pushing element in the movement. The locking element 1250 may act on the movable element 1230 at a specific position, such that the movable element 1230 may no longer move relative to the toner container 1200. In some implementation solutions, the movable element 1230 fixed by the locking element 1250 at the specific position may be regarded as a rigid connection between the movable element 1230 and the toner container 1200.

Figure 74:
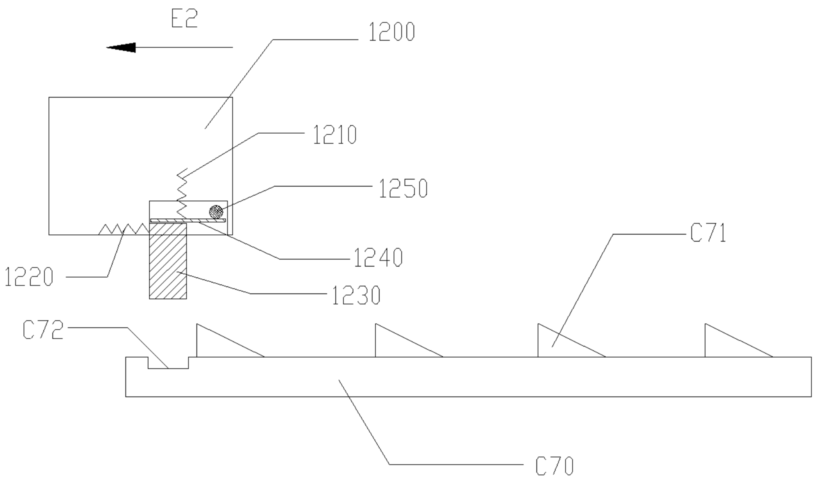
FIGS. 74-77 illustrate working principle schematics of a processing cartridge in different states in exemplary embodiment eighteen.

When the processing cartridge is installed in the electronic image-forming device and the door cover of the electronic image-forming device is not closed, the processing cartridge may be installed along the direction of the arrow E2 from the right to the left to the position in FIG. 74. The toner container 1200 shown in FIG. 74 may be the processing cartridge installed on the innermost side of the electronic image-forming device. When the processing cartridge is installed in the electronic image-forming device and the door cover of the electronic image-forming device is not closed, as shown in FIG. 74, under the action of the first pushing element and the second pushing element, the movable element 1230 may not only extend out along the vertical direction relative to the processing cartridge, but also be located at a position away from the waste toner container.

Figure 75:
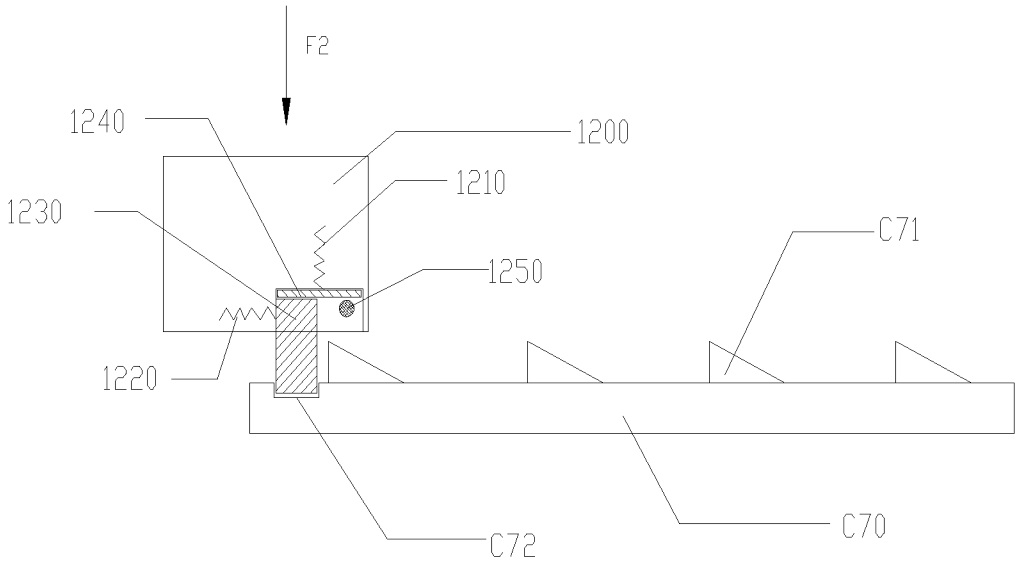

As shown in FIG. 75, when the door cover of the electronic image-forming device is closed, under the action of a connecting rod mechanism (not shown in FIG. 75) in the door cover, the processing cartridge may be lowered along the vertical direction (the direction of the arrow F2). At this point, the movable element 1230 may be in contact with a movable rod C70 with a protrusion C71 inside the electronic image-forming device. In some implementation solutions, the movable element 1230 may be engaged at a trench C72 on the movable rod C70. At this point, the movable rod C70 may press the movable element 1230 to make the movable element 1230 rise for a certain distance along the vertical direction, which is called the first position at this point. That is, when in the first position, the movable element may apply a force along the vertical direction to the first pushing element. The trench C72 in FIG. 75 may only be a possible position and may also be relatively located on the right side of the protrusion C71 in FIG. 75. It should be understood that the protrusion C71 in one embodiment may also extend and retract along the vertical direction, but only the protrusion C71 and the movable rod C70 with the protrusion C71 may be shown in one embodiment.

Figure 76:
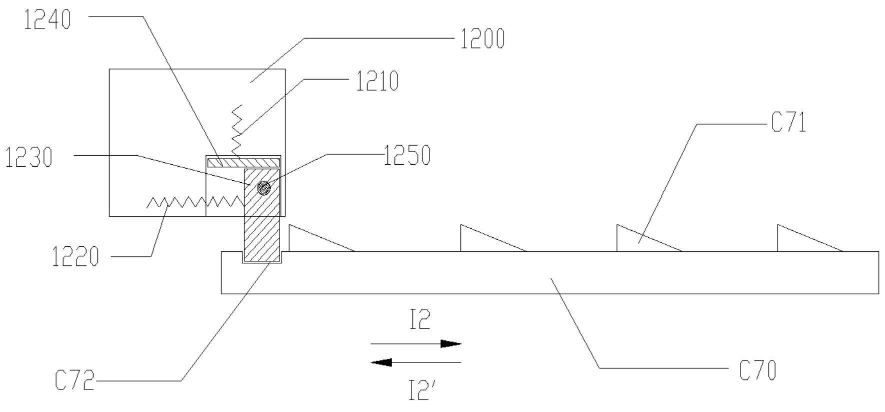

Next, the internal movement of the electronic image-forming device may drive the movable rod C70 to move a short distance along the direction opposite to the installation direction of the processing cartridge to the electronic image-forming device (the direction of an arrow 12) as shown in FIG. 76. At this point, the movable rod C70 may drive the movable element 1230 to move toward the direction of the waste toner container along the direction of the arrow 12 (that is, the direction opposite to the installation direction of the processing cartridge to the electronic image-forming device). When the movement ends, the movable element 1230 may reach the specific position where the locking element 1250 and the movable element 1230 may act. At this point, the movable element 1230 may be fixed relative to the toner container 1200 under the action of the locking element 1250 with further movement, which is called the second position. That is, in the second position, the movable element may apply a force along the vertical direction to the first pushing element and a force along the horizontal direction to the second pushing element. In one embodiment, the movable element 1230 in the first position and the second position may both at a same height. However, it should be understood that the movable element 1230 in the first position may be retracted into the processing cartridge, and the movable element 1230 in the second position may receive the pushing force provided by the electronic image-forming device. Afterwards, regardless of whether the movable rod C70 moves along the installation direction of the processing cartridge to the electronic image-forming device or is restored to such position, the movable element 1230 may no longer move relative to the toner container 1200. Therefore, when the movable rod C70 moves along the installation direction (the direction of an arrow I2') of the processing cartridge to the electronic image-forming device, the toner container 1200 may be pushed to be separated from the waste toner container, thereby completing the roller drum separation.

Figure 77:
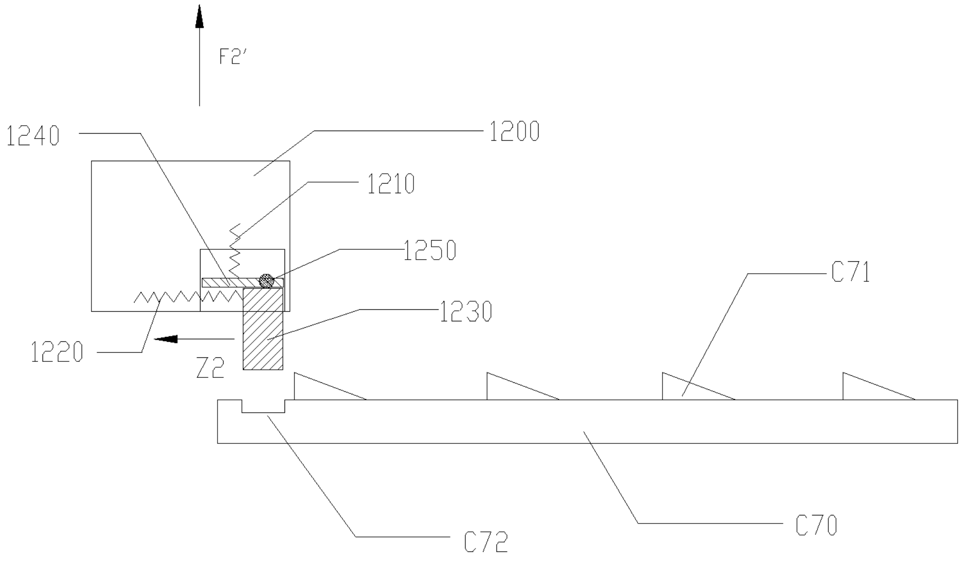

As shown in FIG. 77, when the door cover of the electronic image-forming device is opened without printing, the processing cartridge may rise along the vertical direction (the direction of an arrow F2'). At this point, the movable rod C70 may no longer be in contact with the movable element 1230, the first pushing element may push the movable element 1230 to extend out downwardly along the vertical direction, and the movable element 1230 may no longer be located at the specific position with the locking element 1250, such that the locking element 1250 may no longer fix the movable element 1230 on the toner container 1200. Next, the second pushing element may pull the movable element 1230 to move away from the waste toner container (the direction of an arrow Z2) and the state when the door cover of the electronic image-forming device is not closed in FIG. 74 may be restored. That is, in the process that the movable element 1230 extends out downwardly along the vertical direction, the horizontal direction of the movable element 1230 may be restricted by the locking element 1250; and when the movable element 1230 is fully extended, the movable element 1230 may receive the force of the second pushing element to be restored to the first position at this point.

Figure 78:
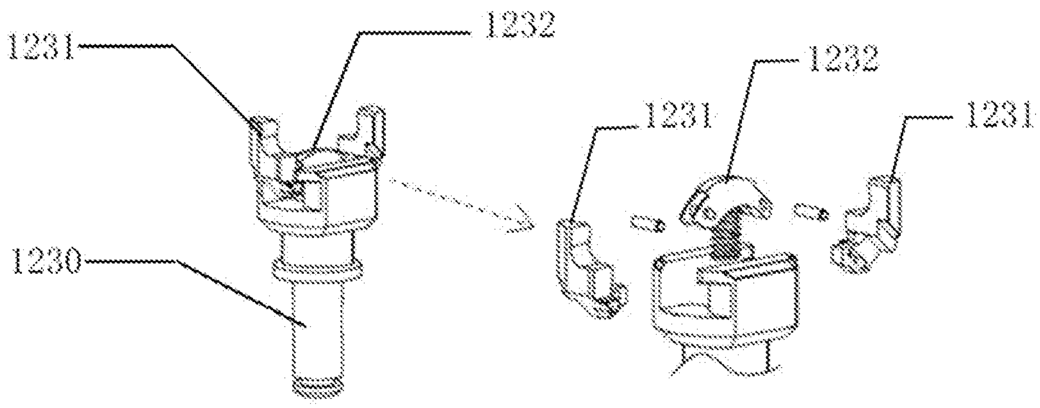
FIG. 78 illustrates a structural view of a movable element in exemplary embodiment eighteen.
Figure 79:
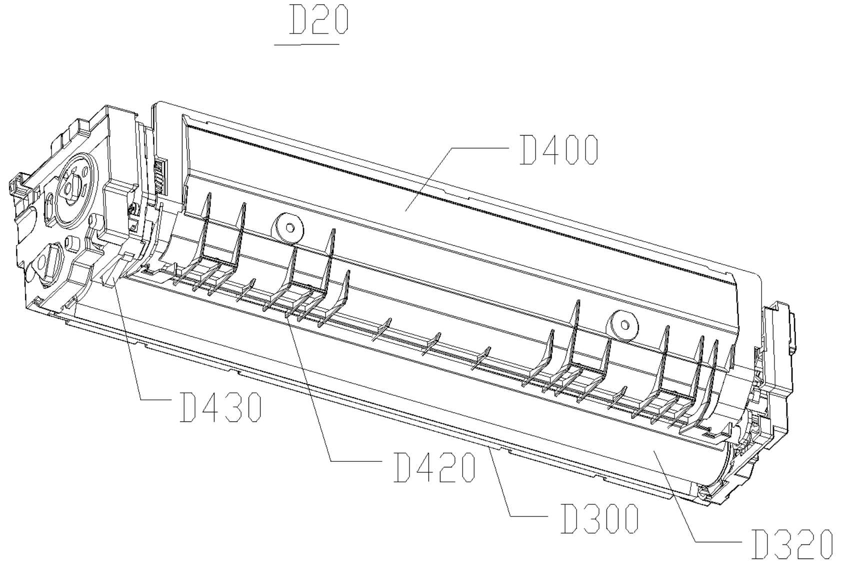
FIG. 79 illustrates a stereoscopic structural schematic of a processing cartridge in exemplary embodiment nineteen.
Figure 80:
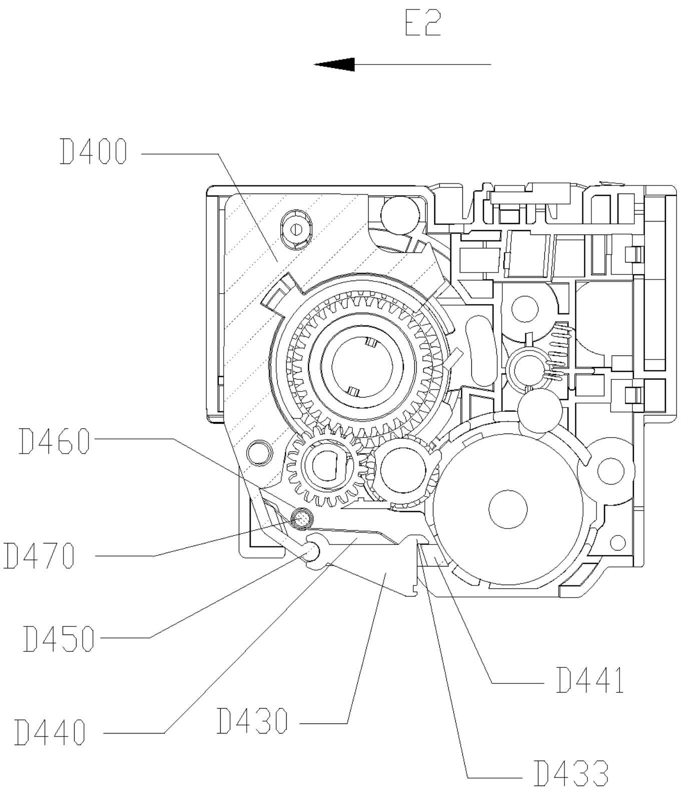
FIG. 80 illustrates a cross-sectional view of a processing cartridge in exemplary embodiment nineteen.
Figure 81:
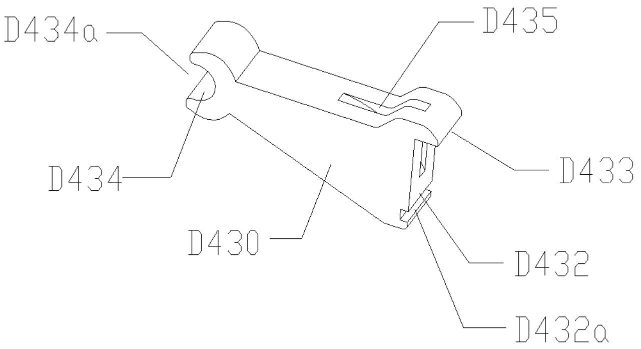
FIG. 81 illustrates a stereoscopic structural schematic of a movable element in exemplary embodiment nineteen.

In other implementation solutions, as shown in FIG. 78, the movable element 1230 may not be used to cooperate with the trench C72, but a hook may be disposed at the free end of the movable element 1230. In some implementation solutions, the hook may include claw teeth 1231 and a pressing portion 1232. As the pressing portion 1232 and the movable rod C70 are pressed and abutted against each other, two claw teeth 1231 may move toward each other, thereby grasping the movable rod C70 tightly.

Obviously, the movable element 1230 extending along the vertical direction in one embodiment may also be fixed with the movable rod C70 after extending along a direction at an acute angle with the vertical direction, which may not be described in detail herein.

Exemplary Embodiment Nineteen

On the basis of exemplary embodiment seventeen, another structure and arrangement of the movable element may be provided in one embodiment. During the installation process of the processing cartridge, the moving may not press the protrusion of the electronic image-forming device and may not make the protrusion be retracted downwardly. In the present application, the upper, lower, left and right sides of the processing cartridge may be the orientations when the processing cartridge is installed inside the electronic image-forming device; and the front and the rear may refer to the front and the rear of the installation direction of the processing cartridge in the process of installing the electronic image-forming device. In the process of installing the processing cartridge, for example, it may specify that a toner container is at the front, and a waste toner container is at the rear.

As shown in FIGS. 79-83*a*, a processing cartridge D20 may include a waste toner container D300 and a toner container D400; and the waste toner container D300 may include a photosensitive drum D320. A lower part of the toner container D400 may include a toner bottom surface D420. The processing cartridge D20 may also include a movable element D430, which is movably connected with the toner container D400. In some implementation solutions, the movable element D430 may be located closer to the lower side of the processing cartridge than the bottom surface D420, and at least a portion of the movable element D430 may protrude relative to the bottom surface D420.

The toner container D400 may also include an accommodation container D440, and a portion of the movable element D430 may be located in the accommodation container D440. The toner container D400 may also include a rotating portion D450. In one embodiment, the rotating portion D450 may have an arc surface with a cylindrical outer peripheral surface, and the movable element D430 may include a rotatable portion D434. In one embodiment, the rotatable portion D434 may have an arc surface with a cylindrical inner peripheral surface, such that the rotatable portion D434 may entirely or partially surround the outer surface of the rotating portion D450, thereby implementing the rotation of the movable element D430 around the rotating portion D450. Furthermore, the structures of the rotatable portion D434 and the rotating portion D450 may be interchangeable.

In some implementation manners, in one embodiment, a portion of the rotating portion D450 may be connected to the toner container D400, and another portion of the rotating portion D450 may be a cylindrical surface for the rotatable part D434 to rotate. The rotatable portion D434 of the movable element D430 may have an opening D434*a* which is used to sleeve on the cylindrical surface of the rotating portion D450 in the form of clamping to install and position the movable element D430.

In some embodiments, the movable element D430 may include an abutting portion D433, and the accommodating container D440 may include a detachment preventing portion D441. Through the interference between the abutting portion D433 and the detachment preventing portion D441, the movable element D430 may not be detached from the toner container D400.

In some embodiments, the processing cartridge may further include an elastic element D460 to restrict the movement of the movable element D430. In one embodiment, the elastic element D460 may be a torsion spring, which is disposed in the toner container D400. During the movement of the movable element D430, the elastic element D460 may provide a pushing constraint to the movable element D430 to help the movable element D430 be restored. In some embodiments, the toner container D400 may be disposed with a positioning protrusion D470, and the elastic element D460 may be installed on the positioning protrusion D470. In one embodiment, the elastic element D460 may be located between the frame of the toner container D400 and the movable element D430, such that one end of the elastic element D460 may be abutted against the movable element D430, and the other end of the elastic element D460 may be abutted against the frame of the processing cartridge. When the elastic element D460 is in its natural state, one end of the elastic element D460 may only be adjoined on the movable element D430, which may not exert a force on the movable element D430 or exert a force directed to the outside of the processing cartridge on the movable element D430. One end of the movable element D430 may be sleeved on the rotating portion D450 through the rotatable portion 434, and the other end of the movable element D430 may be abutted against the detachment preventing portion D441 through the abutting portion D433 under the action of its own gravity or the elastic element D460. In one embodiment, one end of the elastic element D460 may be abutted against inside a trench D435 of the movable element D430. As the movable element D430 rotates, one end of the elastic element D460 and the movable element D430 may have relative displacement adaptively; and under the restriction of two inner walls of the trench D435, it is ensured that the elastic element D460 may not be detached from the movable element D430, thereby providing a stable restraint during the movement of the movable element D430.

Figure 82:
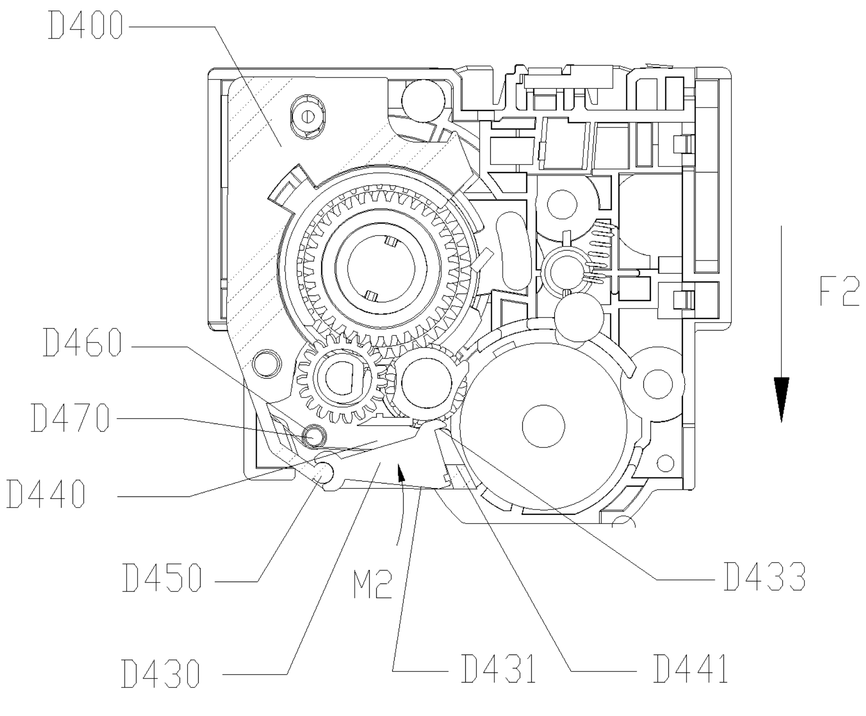
FIGS. 82-83 illustrate cross-sectional schematic of a movable element in two different positions on a processing cartridge in exemplary embodiment nineteen.
Figure 82A:
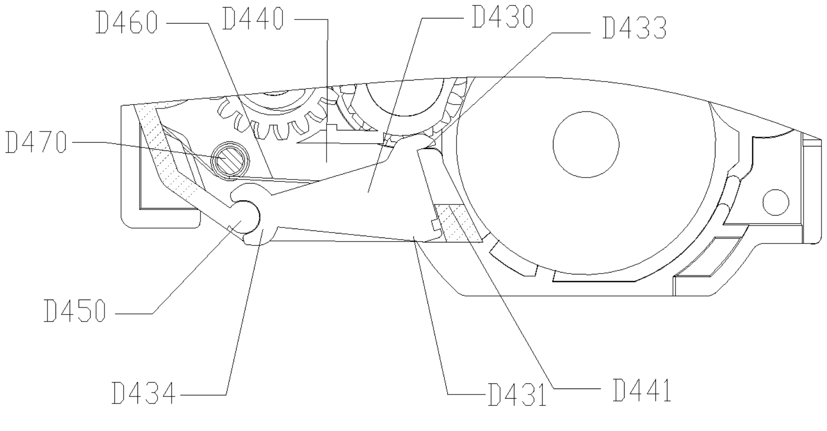
Figure 83:
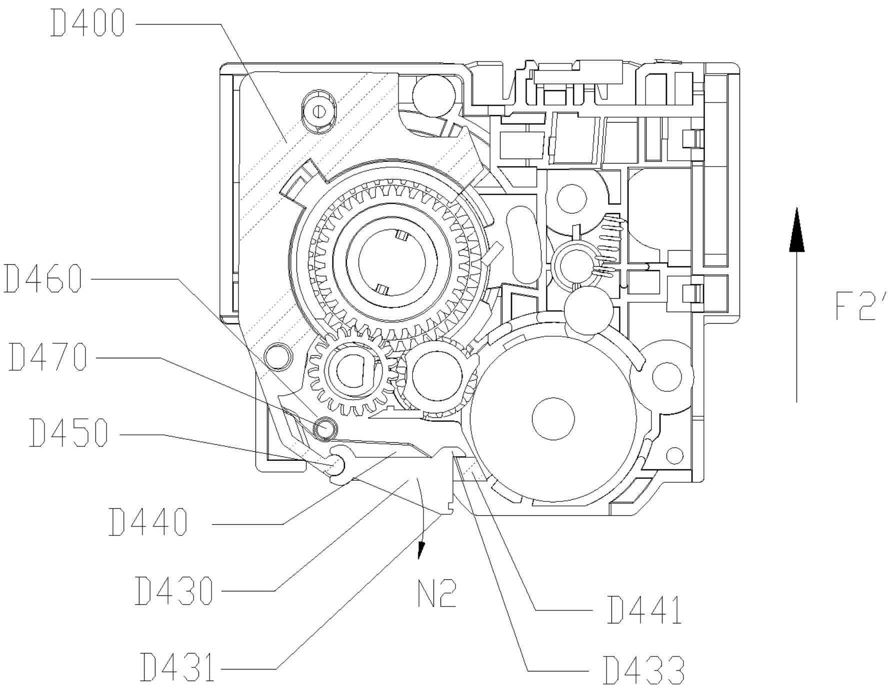
Figure 83A:
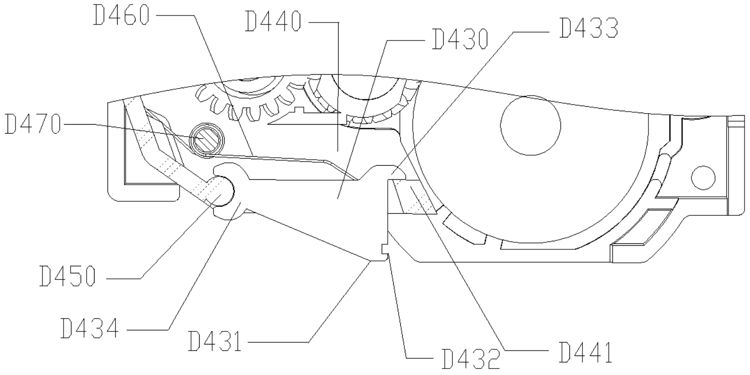

The movable element D430 may have an abutting surface D431 capable of abutting against the electronic image-forming device. When the processing cartridge is installed in the electronic image-forming device along the direction of the arrow E2 and the processing cartridge is lowered along the direction of the arrow F2 for the abutting surface D431 to be abutted against the inside of the electronic image-forming device, especially to be abutted against the protrusion inside the electronic image-forming device, the movable element D430 may be retracted inside the processing cartridge along an arrow M2, which is the state described in FIGS. 82 and 82*a*. Since the movable element D430 and the toner container D400 are in a clearance fit, the resistance generated by the relative movement may be small; and the gravity of the movable element D430 may be sufficiently small, or the pushing force exerted by the elastic element D460 on the movable element D430 may be sufficiently small when the elastic part D460 is disposed, such that, at this point, the movable element D430 may not press the protrusion downwardly and may not make the protrusion be retracted downwardly. At this point, the state in FIGS. 82 and 82*a* may be called the first position. In the first position, when the movable element D430 is retracted upwardly into the processing cartridge by rotating around the rotating portion D450, the abutting portion D433 may not interfere with the detachment preventing portion D441. At this point, the elastic element D460 may receive the force of the movable element D430 which is in a deformed state, and the reaction force (the elastic restoring force) exerted on the movable element D430 may be the pushing force for restoring the movable element D430.

When the processing cartridge is installed in place, the internal movement of the electronic image-forming device may make the protrusion move along the direction opposite to the processing cartridge installation direction, and the protrusion may move away from the position being abutted against the abutting surface D431 and move to the side close to the pushing surface D432. At this point, since there is a clearance fit between the movable element D430 and the toner container D400, and the protrusion is no longer abutted against the abutting surface D431, the movable element D430 may be subjected to the action of gravity and the elastic restoring force of the elastic element D460 to extend out downwardly relative to the processing cartridge along an arrow N2, thereby implementing the restoring operation. At this point (after the movable element D430 extends out), the forcing surface D432 may be in contact with the protrusion. The state at this point (FIGS. 83 and 83*a*) is called the second position. Obviously, when in the second position, it may be that because other components in the electronic image-forming device are abutted against the movable element D430 or other components inside the processing exert a force on the movable element D430, the abutting portion D433 on the movable element D430 may not be in contact with the detachment preventing portion D441. Therefore, in the second position, the force exerted by the elastic element D460 on the movable element D430 may be reduced or till the elastic element D460 restores to the above-mentioned natural state. Compared to the first position, the movable element in the second position may be closer to the lower side of the processing cartridge; and at least a portion of the front or rear projection of the pushing surface B232 overlaps the front or rear projection of the protrusion (the overlapping of one of the front projections and the rear projections may be regarded as the projection overlapping).

When the movable element is in the second position and the electronic image-forming device drives the protrusion to move along the processing cartridge installation direction (the direction of the arrow E2), the protrusion may exert a force on the pushing surface D432 and push the toner container D400 to move relative to the waste toner container D300 to implement the roller drum separation.

In some embodiments, an engaging portion D432*a* may also be added to the pushing surface D432, and the position the engaging portion D432*a* may be used for engaging the protrusion. The structure of the engaging portion D432*a* may not be limited. The engaging portion D432*a* may be a trench structure or a protrusion structure, or a rough surface with a relatively large friction coefficient, which may limit the protrusion from slipping as much as possible when exerting a force on the pushing surface D432. In such way, when the protrusion exerts a force on the pushing surface D432, it is possible to push the toner container D400 to move relative to the waste toner container D300, so that the protrusion may not be detached easily from the pushing surface D432.

In one embodiment, it may ensure that the moving operation of the movable element D430 after each installation may be executed steady; and during the movement between the first position and the second position, the movable element D430 may be provided with a stable restoration and the roller drum separation may be maintained. Moreover, compared to that friction may be at both sides when the movable element moves in the accommodation container, which may result in the swing of the movable element, in exemplary embodiment one, the movable element in one embodiment may move more flexibly and steady in the form of rotation in the accommodation container.

Exemplary Embodiment Twenty

Figure 84:
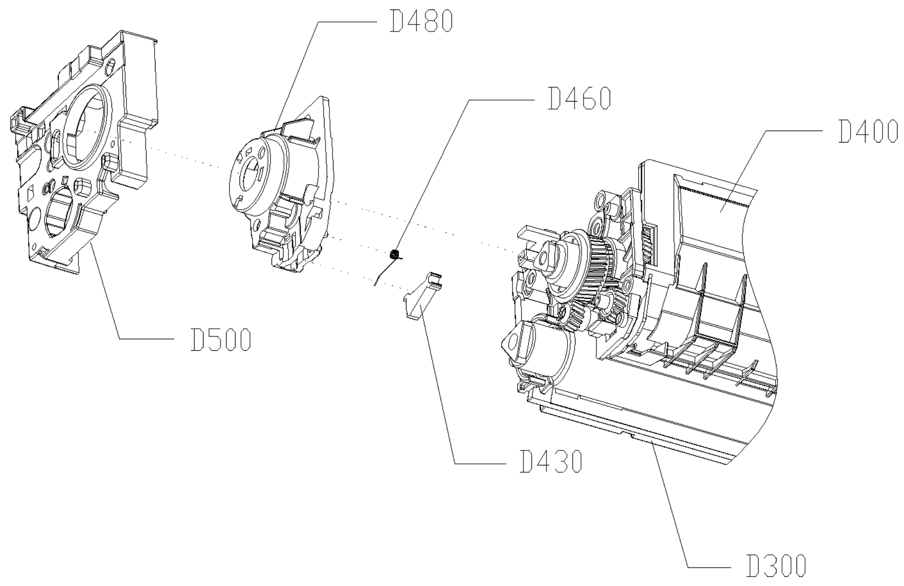
FIG. 84 illustrates a local exposed schematic of a processing cartridge in exemplary embodiment twenty.
Figure 85:
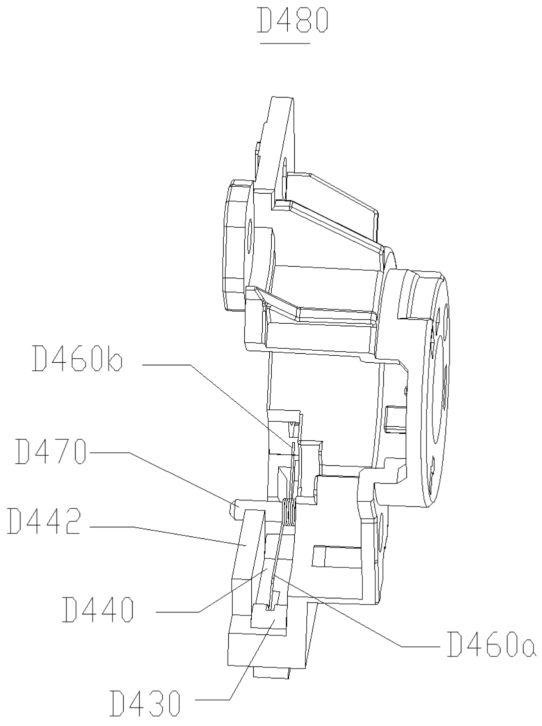
FIG. 85 illustrates a stereoscopic structural schematic of an end cover of a processing cartridge in exemplary embodiment twenty.
Figure 86:
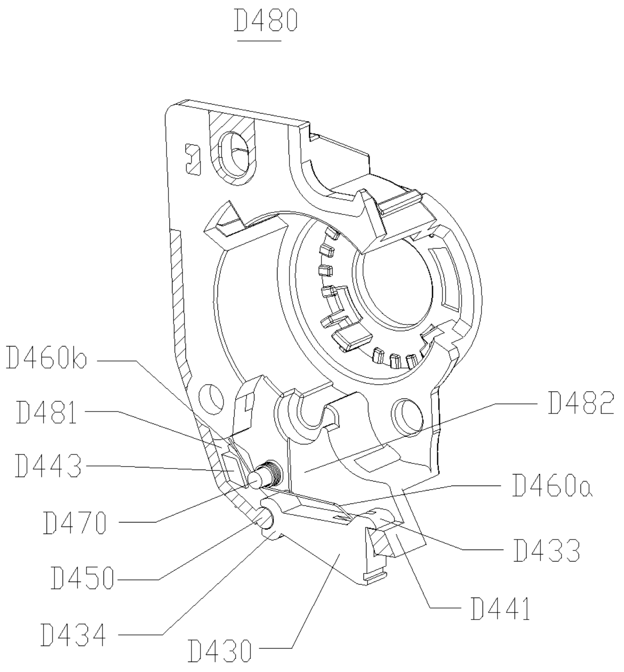
FIG. 86 illustrates a cross-sectional schematic of an end cover of a processing cartridge along a plane perpendicular to a length direction of the processing cartridge in exemplary embodiment twenty.

As shown in FIGS. 84-86, another configuration manner of the movable element may be provided in one embodiment on the basis of exemplary embodiment nineteen. The ends of the toner container D400 and the waste toner container D300 of the processing cartridge may be connected through a protective cover D500. An end cover D480 may be disposed on the end of the toner container D400. In one embodiment, the movable element D430 and the elastic element D460 may be disposed on the end cover D480, and the protective cover D500 may be disposed on the outer side of the end cover D480.

As shown in FIGS. 85 and 86, the end cover D480 may include an inner wall D482 facing the inner side of the processing cartridge. The end cover D480 may be disposed with the accommodation container D440, the rotating portion D450, and the detachment preventing portion D441, which may all be formed by extending out of the inner wall D482. A portion of the movable element D430 may be located in the accommodation container D440. Through the cooperation of the rotatable portion D434 and the rotating portion D450, the movable element D430 may rotatably move in the accommodation container D440. Furthermore, through the interference between the abutting portion D433 and the detachment preventing portion D441, the movable element D430 may not be detached from the end cover D480. The end cover D480 may also be disposed with the positioning protrusion D470, and the elastic element D460 may be installed on the positioning protrusion D470. A first end D460*a* of the elastic element D460 may be abutted against the movable element D430, and a second end D460*b* of the elastic element D460 may be abutted against a frame D481.

In some embodiments, the end cover D480 may be further provided with a first end wall D442 and a second end wall D443, such that the movable element D430 may be located between the first end wall D442 and the inner wall D482, and the second end D460*b* of the elastic element D460 may be located between the second end wall D443 and the inner wall D482, thereby preventing the movable element D430 and the elastic element D460 from being detached from the end cover D480 during the movement.

According to one embodiment, it should be understood that the movable element D430 may be disposed not only on the end cover D480, but also on the protective cover D500 or the waste toner container D300, as long as the movable element D430 may transmit the received pushing force, which is provided by the electronic image-forming device, to the toner container D400 of the processing cartridge, thereby enabling the relative movement between the toner container D400 and the waste toner container D300.

Exemplary Embodiment Twenty One

Figure 87:
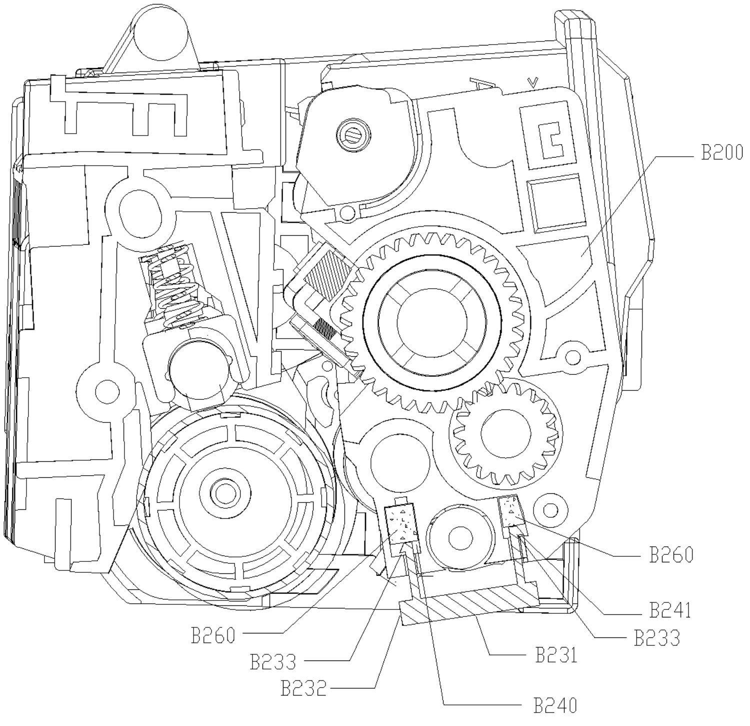
FIG. 87 illustrates a cross-sectional schematic of a processing cartridge along a plane perpendicular to a length direction of the processing cartridge in exemplary embodiment twenty one.

As shown in FIG. 87, another configuration manner of the movable element may be provided in one embodiment on the basis of exemplary embodiment seventeen. The processing cartridge may also include an elastic element B260, which is located between the frame of the toner container B200 and the movable element B230, and the elastic element B260 may provide a pushing constraint on the movable element B230 during the movement of the movable element B230 to help the movable element be restored. In one embodiment, the elastic element B260 may be disposed in the accommodation container B240. One end of the elastic element B260 may be abutted against the movable element B230, and the other end may be abutted against the frame of the processing cartridge. When the elastic element B260 is in a natural state, one end of the elastic element B260 may only touch the movable element B230, and no force may be exerted on the movable element B230 or a force directed to the outside of the processing cartridge may be exerted on the movable element B230. In some embodiments, the elastic element B260 may be a sponge, which may be respectively abutted against two abutting portions B233 of the movable element B230.

When the processing cartridge is installed in the electronic image-forming device and the abutting surface B231 of the movable element B230 is abutted against the inside of the electronic image-forming device, especially against the protrusion inside the electronic image-forming device, the movable element B230 may be retracted inside the processing cartridge. Since the movable element B230 and the toner container B200 are in a clearance fit, the resistance generated by the relative movement may be small; and the gravity of the movable element B230 may be sufficiently small, or the pushing force exerted by the elastic element B260 on the movable element B230 may be sufficiently small when the elastic element B260 is disposed, such that, at this point, the movable element B230 may not push the protrusion downwardly and may not make the protrusion be retracted downwardly. At this point, the movable element B230 may be in the first position.

When the processing cartridge is installed in place, the internal movement of the electronic image-forming device may make the protrusion move along the direction opposite to the processing cartridge installation direction, and the protrusion may move away from the position being abutted against the abutting surface B231 and move to the side close to the pushing surface B232. At this point, since there is a clearance fit between the movable element B230 and the toner container B200, and the protrusion is no longer abutted against the abutting surface B231, the movable element B230 may be subjected to the action of gravity and the elastic restoring force of the elastic element B260 to extend out downwardly, thereby implementing the restoring operation. At this point, the movable element B230 may be in the second position. In the second position, the force exerted by the elastic element B260 on the movable element B230 may be reduced or till the elastic element B260 restores to the above-mentioned natural state.

When the movable element is in the second position and the electronic image-forming device drives the protrusion to move along the processing cartridge installation direction, the protrusion may exert a force on the pushing surface B232 and push the toner container to move relative to the waste toner container, thereby implementing the roller drum separation.

Figure 88:
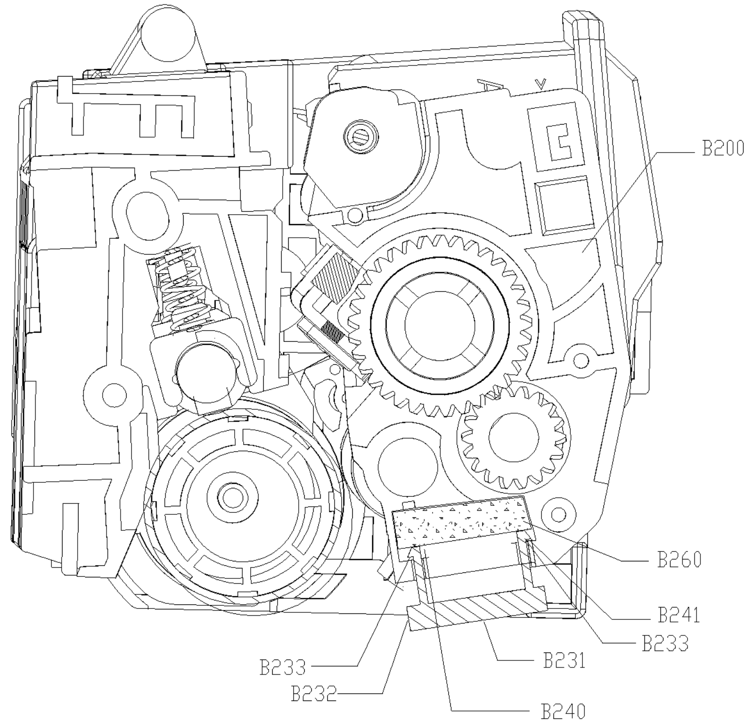
FIG. 88 illustrates a cross-sectional schematic of an optimized structure of a movable element along a direction perpendicular to a length direction of a processing cartridge in exemplary embodiment twenty one.

Furthermore, as shown in FIG. 88, an optimized structure of the elastic element B260 may be provided. The elastic element B260 may be a single piece sponge which is located in the accommodating container B240 and directly abutted against two abutting portions B233 of the movable element 230.

The remaining structures may be same as those in exemplary embodiment seventeen. In one embodiment, it may ensure that the moving operation of the movable element B230 after each installation may be executed steady; and during the movement between the first position and the second position, the movable element B230 may be provided with a stable restoration.

Finally, it should be noted that the above-mentioned embodiments may be merely used to describe the technical solution of the present disclosure, rather than limiting the present disclosure. Although the present disclosure has been described in detail with reference to the above-mentioned embodiments, those skilled in the art should understand that the technical solutions described in the above-mentioned embodiments may still be modified, or certain or all of the technical features may be equivalently replaced. Such modifications or replacements do not make the essence of the corresponding technical solutions outside the scope of the technical solutions of various embodiments of the present disclosure.

What is claimed is:

1. A processing cartridge, detachably installed in an electronic image forming device, where a protrusion capable of extending and retracting along a vertical direction is disposed inside the electronic image forming device, the processing cartridge comprising:

a toner container and a waste toner container; and a movable element disposed at the lower side of the processing cartridge, wherein the processing cartridge further comprises a detachment preventing portion; the movable element is disposed with an abutting portion; and the abutting portion is capable of being abutted against the detachment preventing portion to prevent the movable element being disengaged;

wherein the processing cartridge further comprises an elastic element disposed above the movable element; and the elastic element is configured to move the movable element toward the lower side of the processing cartridge; and wherein the processing cartridge is disposed with an end cover and a protective cover, the end cover is disposed on an end of the toner container and the protective cover is disposed on an outer side of the end cover, and the movable element is disposed on the end cover.

2. The processing cartridge according to claim 1, wherein: the processing cartridge further comprises an accommodation container, a part of the movable element is located in the accommodation container, and the movable element is configured to rotatably move in the accommodation container.

3. The processing cartridge according to claim 1, wherein: the movable element has a first position and a second position; and the movable element in the second position is closer to the lower side of the processing cartridge than the movable element in the first position.

4. The processing cartridge according to claim 3, wherein: the processing cartridge further comprises an accommodation container, the elastic element is disposed inside the accommodation container, and the movable element, relying on an elastic force of the elastic element, moves from the first position to the second position.

5. The processing cartridge according to claim 1, wherein: the processing cartridge is disposed with a rotating portion; and one end of the movable element is rotatably connected with the rotating portion.

6. The processing cartridge according to claim 5, wherein: the other end of the movable element is abutted against the elastic element, and the elastic element exerts a force on the movable element, such that the abutting portion being abutted against the detachment preventing portion.

7. The processing cartridge according to claim 1, wherein: the movable element has a pushing surface; and when the movable element is in the second position, the pushing surface is abutted against the protrusion of the electronic image forming device to receive a pushing force, such that the toner container moves relative to the waste toner container.

8. The processing cartridge according to claim 6, wherein: the movable element is disposed with a trench, and one end of the elastic element is abutted against inside the trench.

9. The processing cartridge according to claim 7, wherein the pushing surface is perpendicular to a horizontal plane.

10. The processing cartridge according to claim 7, wherein the pushing surface is disposed with an engaging portion; and the engaging portion is a trench structure or a protrusion structure.

11. The processing cartridge according to claim 1, wherein:

the movable element is capable of moving relative to the protrusion during a process of installing the processing cartridge, and the movable element does not compress the protrusion downwards to cause it to retract downwards.

12. The processing cartridge according to claim 11, wherein during the process of installing the processing cartridge, the movable element receives a force from the electronic image-forming device, such that the movable element retracts into the processing cartridge to the first position.

13. The processing cartridge according to claim 12, wherein after the installation of the processing cartridge is completed, the movable element moves from the first position to the second position.

14. The processing cartridge according to claim 13, wherein:

when in the second position, the movable element receives a pushing force from the electronic image-forming device, such that the toner container of the processing cartridge moves relative to the waste toner container of the processing cartridge and implementing the roller drum separation.

15. The processing cartridge according to claim 14, wherein:

after the installation of the processing cartridge is completed, the movable element, at least relying on an elastic force of the elastic element, moves toward the lower side of the processing cartridge from the first position to the second position.

16. The processing cartridge according to claim 12, wherein:

the movable element has a pushing surface; the pushing surface is capable of receiving a pushing force from the protrusion of the electronic image forming device; and the pushing surface is perpendicular to a horizontal plane or has a trench structure.

* * * * *